(12) United States Patent
Steven et al.

(10) Patent No.: US 9,514,428 B2
(45) Date of Patent: *Dec. 6, 2016

(54) MANAGING ENERGY ASSETS ASSOCIATED WITH TRANSPORT OPERATIONS

(71) Applicant: VIRIDITY ENERGY, INC., Philadelphia, PA (US)

(72) Inventors: Alain P. Steven, Lansdale, PA (US); Duncan K. Devore, Perkomenville, PA (US); Craig Stewart, Penllyn, PA (US)

(73) Assignee: Viridity Energy, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/354,875

(22) PCT Filed: Oct. 29, 2012

(86) PCT No.: PCT/US2012/062439
§ 371 (c)(1),
(2) Date: Apr. 28, 2014

(87) PCT Pub. No.: WO2013/063581
PCT Pub. Date: May 2, 2013

(65) Prior Publication Data
US 2014/0304025 A1    Oct. 9, 2014

Related U.S. Application Data

(63) Continuation-in-part of application No. 13/451,497, filed on Apr. 19, 2012, now Pat. No. 8,892,264.

(60) Provisional application No. 61/552,982, filed on Oct. 28, 2011.

(51) Int. Cl.
*G06F 19/00* (2011.01)
*G06Q 10/06* (2012.01)
(Continued)

(52) U.S. Cl.
CPC ........ *G06Q 10/06314* (2013.01); *G06Q 10/06* (2013.01); *G06Q 50/06* (2013.01);
(Continued)

(58) Field of Classification Search
CPC .... G06Q 10/10; G05B 13/02; G06F 2217/78
See application file for complete search history.

(56) References Cited

U.S. PATENT DOCUMENTS

2008/0211230 A1* 9/2008 Gurin .................. B60L 11/1861
290/2
2009/0192655 A1* 7/2009 Ichikawa ............ B60L 11/1811
700/291

(Continued)

*Primary Examiner* — Michael D Masinick
(74) *Attorney, Agent, or Firm* — The H.T. Than Law Group

(57) ABSTRACT

Apparatus, systems, and methods are described that can be used to generate an operating schedule for a controller of an energy storage asset that is in communication with a transport vehicle, based on an optimization process. The operating schedule is generated based on an operation characteristic of the energy storage asset, an energy-generating capacity of the transport vehicle in communication with the energy storage asset based on a motion of the transport vehicle, and a price associated with a market (including a regulation market and/or an energy market). Operation of the energy storage asset according to the generated operating schedule facilitates derivation of energy-related revenue, over a time period T. The energy-related revenue available to the energy customer over the time period T is based at least in part on the regulation market and/or the energy market.

9 Claims, 14 Drawing Sheets

(51) Int. Cl.
*G06Q 50/06* (2012.01)
*H02J 3/00* (2006.01)
*H02J 3/28* (2006.01)
*H02J 13/00* (2006.01)
*G06Q 40/04* (2012.01)

(52) U.S. Cl.
CPC ............ *H02J 3/008* (2013.01); *H02J 3/28* (2013.01); *H02J 13/0006* (2013.01); *G05B 2219/2642* (2013.01); *G06Q 40/04* (2013.01); *H02J 13/0062* (2013.01); *H02J 13/0075* (2013.01); *H02J 13/0079* (2013.01); *H02J 2003/007* (2013.01); *Y02B 70/3216* (2013.01); *Y02B 90/2638* (2013.01); *Y02B 90/2653* (2013.01); *Y02E 60/722* (2013.01); *Y02E 60/76* (2013.01); *Y04S 10/14* (2013.01); *Y04S 10/54* (2013.01); *Y04S 10/58* (2013.01); *Y04S 20/221* (2013.01); *Y04S 20/224* (2013.01); *Y04S 40/124* (2013.01); *Y04S 40/126* (2013.01); *Y04S 40/22* (2013.01); *Y04S 50/10* (2013.01)

(56) References Cited

U.S. PATENT DOCUMENTS

| | | | |
|---|---|---|---|
| 2011/0215640 A1* | 9/2011 | Donnelly | H02J 1/10 307/21 |
| 2012/0173444 A1* | 7/2012 | Zik | G06Q 10/10 705/317 |
| 2014/0304025 A1* | 10/2014 | Steven | G06Q 10/06314 705/7.24 |

* cited by examiner

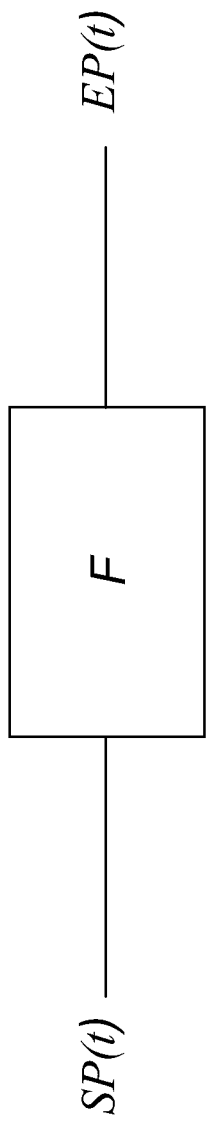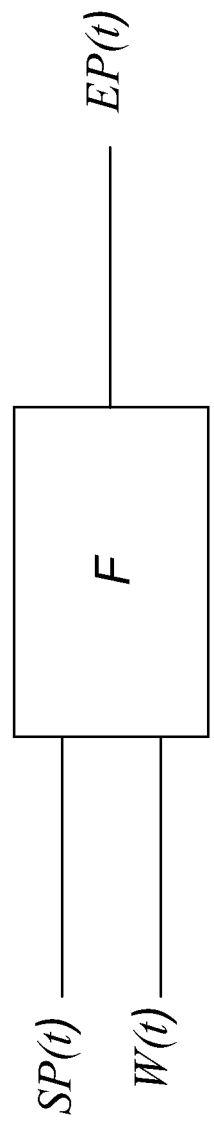

MANAGING ENERGY ASSETS ASSOCIATED WITH TRANSPORT OPERATIONS

CROSS-REFERENCES TO RELATED APPLICATIONS

This application is a U.S. National Phase application of PCT/US2012/062439, filed on Oct. 29, 2012, which claims priority to and benefit of U.S. Provisional Application No. 61/552,982, filed on Oct. 28, 2011, entitled "METHODS, APPARATUS, AND SYSTEMS FOR DETERMINING CHARGE/DISCHARGE SCHEDULES FOR ENERGY STORAGE ASSETS ASSOCIATED WITH TRANSPORTATION OPERATIONS TO FACILITATE REVENUE GENERATION FROM WHOLESALE ELECTRICITY MARKETS," the entire disclosure of which is incorporated herein by reference in its entirety, including drawings.

U.S. National Phase application of PCT/US2012/062439 also claims priority to and benefit of U.S. Non-provisional application Ser. No. 13/451,497, filed on Apr. 19, 2012.

The entire disclosure of these applications is incorporated herein by reference in its entirety, including drawings.

BACKGROUND

In various regions across the United States, "regional transmission operators" (RTOs) or "independent system operators" (ISOs) generally are responsible for obtaining electricity from electricity generators (e.g., operators of coal-fired plants, gas plants, nuclear plants, hydroelectric plants, renewable resources, etc.), and then transmitting the electricity provided by generators over particular geographic regions (e.g., New England, the greater New York area, the mid-Atlantic states) via an electricity transmission infrastructure (also commonly referred to as the electricity "grid"). RTOs generally are responsible for regional planning of grid expansion and/or ordering deployment of new electricity transmission infrastructure by transmission owners.

The Federal Energy Regulation Commission (FERC) presently requires that, in addition to generally managing the operation of the electricity grid in a given geographic area, RTOs/ISOs need to manage the price of electricity generated and consumed on the grid via "wholesale electricity markets." To this end, RTOs/ISOs establish pricing auctions to provide and support wholesale electricity markets. These pricing auctions, in addition to setting wholesale prices as a function of time, also foster sufficient electricity production for the grid at various locations to ensure that the grid is capable of delivering adequate electricity to respective locations of demand for electricity on the grid. Thus, some of the key objectives of the RTOs/ISOs in overseeing wholesale electricity markets include providing for efficient, economic and reliable operation of the grid.

In general, a given RTO/ISO supports a wholesale electricity market by allowing competing electricity generators to offer their electricity production output to the RTO/ISO. Retail electricity suppliers, also commonly referred to as "utilities," in turn supply electricity to end-users/consumers, or "energy customers" of the retail electricity suppliers, and are billed by the RTO/ISO for their purchases. With respect to the wholesale electricity market, the retail electricity suppliers make bids for the electricity production output offered by the electricity generators that, once accepted, establish market prices. The retail electricity suppliers in turn typically re-price the electricity they purchase from electricity generators on the wholesale market to sell to their retail electricity customers.

One significant issue facing RTOs/ISOs relates to various limitations that exist in connection with the grid that may impede a sufficient flow of electricity on the grid under certain circumstances. In particular, there may be time-dependent and/or geographically-dependent limitations on the grid's ability to support transmission of electricity, based on one or more of: 1) an available overall supply of electricity from electricity generators; 2) overall demand from retail electricity suppliers; 3) general conditions on the grid itself (e.g., aging, failing or dated equipment); and 4) "location-specific" or "congestion" issues, e.g., respective geographic locations on the grid of electricity generators, electricity consumers, particular demand conditions, and/or particular grid-related conditions that in some manner impede the transmission of available electricity to one or more portions of the grid). In some circumstances, a grid limitation may be caused by a particular branch of the grid reaching a thermal limit, or a failure of a generator or transformer on a branch of the grid; these limitations generally are referred to as "security constraints" (i.e., particular grid infrastructure cannot be overloaded without jeopardizing the grid). As such, the electricity grid is sometimes referred to as a "security constrained system."

In view of the foregoing, RTOs/ISOs may employ a process known as "security constrained economic dispatch" for establishing wholesale electricity prices on a wholesale electricity market. Pursuant to this process, an RTO/ISO managing a particular geographic region of an electricity grid determines particular locations on the grid, or "nodes," at which there is a possibility for security constraints to limit electricity transmission. Wholesale electricity prices as a function of time are then established independently for each node (i.e., on a geographically-dependent, or "locational" basis) by accepting bids from energy generators in sequence from the lowest priced offer to the highest priced offer, up to an amount of electricity needed to satisfy electricity demand conditions (e.g., bids from retail electricity suppliers) at the node, so as to develop a supply and demand equilibrium price. In this manner, the wholesale electricity price at a particular node reflects the highest-priced accepted generation offer needed to provide an adequate amount of electricity to that node, taking into consideration various security constraints that may be present at the node. This location-based approach to wholesale electricity prices, which takes into consideration security constraints on the grid, commonly is referred to as "locational marginal pricing," and the wholesale electricity price at a given node is commonly referred to a Locational Marginal Price (LMP). Thus, the wholesale electricity price generally varies at different locations on the grid, based at least in part on security constraints.

While electricity generators and retail electricity suppliers make up a significant constituency of the participants in wholesale electricity markets, applicable market rules in some wholesale electricity markets also permit electricity consumers/end-users (e.g., energy customers of retail electricity suppliers) and others to participate in wholesale electricity markets so as to earn energy-related revenue and offset their energy-related expenditures. In particular, market rules now permit energy users (or their market representatives) to make offers to curtail or otherwise alter their electricity use, or to sell self-generated or stored electricity, to the wholesale market. If such an offer by an energy customer to provide an "electricity-related product or service" is accepted on the applicable wholesale market, the customer endeavors to appropriately control its various energy assets so as to make available to the grid the offered product/service, in return for payment pursuant to the terms of the offer. The concept of an energy customer providing an electricity-related product or service (e.g., electricity use curtailment) on a wholesale electricity market in exchange for payment to the energy customer by the RTO/ISO, commonly is referred to as "demand response" (DR).

Some of the currently more active wholesale electricity sub-markets in which energy customers of retail service providers may readily participate include the "energy markets" (e.g., "day-ahead" energy market, "real-time dispatched" energy market). While various pricing models exist for participation in these markets and other economic demand response wholesale electricity markets (as well as various penalty models for customer non-performance pursuant to an offer to reduce/curtail energy use), often any revenue generated by the energy customer from participation in these markets is based on the locational marginal price (LMP). The LMP may be calculated periodically at specified nodes (e.g., every 5 minutes, every half-hour, every hour) depending on the particular market in which the energy customer is participating. More generally, revenue generation relating to participation in an economic demand response wholesale electricity market is based on a prevailing "wholesale electricity price" for the particular market in question, which in turn generally is based on the LMP (calculated at various intervals), as discussed above.

To determine revenue earned by participating energy customers in a particular economic demand response wholesale electricity market such as an "energy market," the amount of electricity use reduction by the participating customer typically has to be measured; subsequently, this measured amount of electricity use reduction typically is multiplied by a price relating to the prevailing wholesale electricity price for the market in question (e.g., LMP). Electricity use reduction by the energy customer conventionally is measured against a reference electricity usage commonly referred to as a "customer baseline" (CBL). The CBL is intended to represent what the participating energy customer's electricity use normally would have been, over a particular time period and typical ("business-as-usual" or BAU) operating conditions for the customer's energy assets, absent the customer's voluntary electricity use reduction based on the incentive provided by the economic demand response wholesale electricity market.

Conventionally, a customer baseline (CBL) electricity use profile for an energy customer is derived by an RTO/ISO from an historical sample of actual electricity use by the customer over a particular time period and BAU operating conditions. In some cases, the particular time period for which an historical sample of the customer's actual electricity use is selected as a CBL may be based, at least in part, on similar conditions prevailing at the customer's site at the time of the historical sampling and participation in the economic demand response program (e.g., similar weather conditions, similar seasons/time of year, similar occupancy conditions at the customer's site, etc.). In other instances, the time period for selecting an historical sample of actual electricity usage as a CBL is based on relatively recent actual electricity use by the energy customer just prior to the customer's participation in the economic demand response program. For example, the ISO PJM Interconnect calculates a market-participating customer's CBL for a given weekday as "the average of the highest four out of the five most recent highest load (electricity use) weekdays in the 45 calendar day period preceding the relevant load reduction event." In sum, revenue generation from the economic demand response wholesale electricity "energy markets" conventionally is based on an historical actual electricity usage of a participating customer, which historical actual electricity usage serves as a customer baseline (CBL) against which electricity use reduction is measured for purposes of paying the energy customer for the use reduction.

SUMMARY

The Inventors have recognized and appreciated that new opportunities for participation in wholesale electricity markets by electricity consumers/end-users (e.g., energy customers of retail electricity suppliers) have created a need for energy management tools to facilitate energy-related revenue generation from such markets. In view of the foregoing, various embodiments are directed generally to methods, apparatus and systems for determining operating schedules for energy assets so as to facilitate revenue generation from wholesale electricity markets. These energy assets include energy storage assets, energy consuming assets and energy generating assets. In different examples herein, an energy asset can include an energy storage asset, an energy consuming asset, and/or an energy generating asset.

Wholesale electricity markets in which the energy customer may participate to earn energy-related revenue, and to which the various methods, apparatus and systems according to the concepts disclosed herein may apply, include various economic demand response wholesale electricity markets, examples of which include, but are not limited to, a "real-time energy market," a "day-ahead energy market," a "day-ahead scheduling reserve market," a "synchronized reserve" market, a "regulation" market, a "capacity" market, and an "emissions" market. The various methods, apparatus and systems according to the concepts disclosed herein may also apply to facilitate the energy customer participating in a market based on a voltage/VAR ancillary service to earn energy-related revenue. In some examples, the methods, apparatus and systems described herein may be implemented in whole or in part by a curtailment service provider (CSP) or other entity acting as a "broker" between energy customers and an RTO/ISO to facilitate participation in various demand response programs supported by wholesale electricity markets.

Suggested Operating Schedules for Energy Assets

In example implementations discussed in greater detail below, the methods, apparatus and systems described herein determine a suggested operating schedule for one or more energy assets (including energy-consuming assets for which energy usage may be curtailed), over a given time period T, that are operated by an energy customer of a retail electricity supplier. The energy assets operated by the energy customer may include electricity-consuming assets as well as electricity-generating assets (e.g., fossil-fuel-based generators, renewable energy sources) and/or electricity storage assets (e.g., batteries). The time period T over which a suggested operating schedule for the energy asset(s) may be determined according to the inventive concepts disclosed herein may be a portion of an hour, an hour, a period of multiple hours, a day, or a period of multiple days, for example (which in some instances may be based, at least in part, on time-varying wholesale electricity prices on a particular wholesale electricity market from which revenue may be generated). Similarly, the suggested operating schedule(s) for the energy assets(s) may be determined based at least in part on wholesale prices of various wholesale electricity "products" offered on the wholesale electricity markets in which the energy customer may participate (e.g., based on a geographic region in which the energy customer is located) to earn energy-related revenue.

In one example implementation, as discussed in greater detail below, the suggested operating schedule for one or more energy assets is determined via a mathematical optimization process that reduces a net energy-related cost to the energy customer over the time period T by increasing projected energy-related revenue from one or more wholesale electricity markets in which the energy customer may participate.

Energy Asset Modeling

To facilitate the mathematical optimization process for generating a suggested operating schedule for one or more energy assets, a mathematical model representing the customer's energy asset(s) is formulated and employed in the mathematical optimization process. The energy asset model is specified by one or more mathematical functions for calculating an energy profile (i.e., electricity use and/or electricity generation as a function of time over the time period T) for the asset(s), based on a proposed operating schedule for the asset(s) applied as an input to the model. In one aspect, the mathematical function(s) defining the asset model at least in part represent physical attributes of the energy asset(s) themselves that relate to electricity use and/or electricity generation. Depending on the energy asset(s) operated by the energy customer, a given model may represent a single energy asset or an aggregation of multiple energy assets operated by the customer.

Also, depending on the type of energy asset(s) being modeled, the asset model may be formulated to accept additional inputs to facilitate calculation of an energy profile based on a proposed operating schedule. Herein, in various examples, energy storage assets, energy consuming assets and/or energy generating assets are being modeled. For example, in the case of energy consuming assets such as transport vehicles including heating, ventilation and air conditioning (HVAC) systems for temperature control in one or more buildings, and/or other assets (including transport vehicles) for which thermodynamic considerations are relevant (including weather- or temperature-dependent energy generating assets including photovoltaic cells and wind turbines), the mathematical model for the asset(s) may be configured to consider as an input to the model actual or forecast ambient environmental conditions (e.g., temperature, humidity, ambient light/cloud cover, etc.) as a function of time, as well as other variables that may impact thermodynamics or the energy profile in general (e.g., occupancy, a presence of equipment such as computers and other instrumentation that may affect heating or cooling in an environment, etc.).

Customer Baseline (CBL) Energy Profiles for Business-as-Usual (BAU) Operating Schedules In some examples, the mathematical model for the energy asset(s) first is used to generate a simulated (or "predictive") customer baseline (CBL) energy profile corresponding to a typical operating schedule (also referred to herein as a "business-as-usual" (BAU) operating schedule, or "BAU conditions"). In particular, an energy customer's BAU operating schedule for its energy asset(s) is applied to the mathematical model, which in turn provides as an output a simulated CBL energy profile representing a typical electricity consumption or generation as a function of time, over a given time period T, for the modeled energy asset(s). In one aspect, the energy customer's BAU operating schedule represents the customer's typical behavior with respect to operating its energy asset(s), absent any incentive to reduce energy costs and/or earn energy-related revenue from the wholesale electricity market.

As discussed in greater detail below, a simulated and predictive CBL energy profile based on a mathematical model according to the concepts disclosed herein provides a significant improvement over conventional approaches to determine a frame of reference for typical energy profiles of energy customers (absent an incentive to generate revenue via wholesale electricity markets); as noted above, conventional approaches are limited to considering only historical actual energy use information. In particular, it is recognized and appreciated herein that conventional backward-looking assessment of CBL is not necessarily representative of what an energy customer's electricity usage actually would have been on a given day for which economic demand response revenue is being calculated—at best, such backward-looking historical actual-use-based assessments of CBL provide inconclusive estimates.

Additionally, it has been observed empirically that an historical actual-use CBL provides incentives for some energy customers to artificially inflate energy usage (i.e., by not operating energy assets pursuant to "business-as-usual" or BAU conditions, but instead purposefully adopting higher-consumption operating conditions) prior to a period in which the customer anticipates participation in economic demand response wholesale electricity markets; an artificially higher historic actual-use-based CBL, against which energy use reduction will be measured, provides a potentially higher economic demand response revenue. In this manner, the general goal of economic demand response programs to incentivize reduced electricity usage is undermined (by an artificially-increased electricity usage to establish a higher CBL).

Furthermore, the Inventors have recognized and appreciated that an historical actual-use-based CBL provides a long-term disincentive to participate in economic demand response wholesale electricity markets. In particular, as a given energy customer participates in economic demand response wholesale electricity markets over time, their average actual electricity use from retail suppliers is expected to decrease. If revenue from such markets continues to be calculated with reference to an historical actual-use-based CBL, the potential for economic demand response revenue will decrease over time, as an economic settlement approach based on historical actual-use CBL eventually will begin to treat incentivized electricity use reduction as "business-as-usual" operating conditions for the energy customer. This type of treatment arguably will ultimately discourage participation in wholesale electricity markets. At very least, continued reliance on historical actual-use-based CBL likely will compel an extension of a "look-back" period serving as a basis for determining CBL for energy customers who actively participate in economic demand response wholesale electricity markets for significant periods of time. As longer look-back periods are adopted, the accuracy and relevance of historic actual-use-based CBLs from more distant time periods arguably will significantly decrease.

Accordingly, for at least the foregoing reasons, a simulated and predictive CBL energy profile, based on a mathematical model of an energy customer's energy asset(s) according to the concepts disclosed herein (rather than an historical actual-use-based CBL as conventionally employed), provides a significant improvement for more accurately determining revenue earned from economic demand response wholesale electricity markets. In some examples, the mathematical model for the energy asset(s)

may not be predicated on any significantly historical actual electricity use information for the energy asset(s), and instead may be based in part on physical attributes of the energy asset(s) themselves that relate to electricity use and/or electricity generation, as noted above. In this manner, simulated and predictive CBL energy profiles based on such mathematical models are not substantively influenced by significantly historical actual electricity use information.

A self-tuning energy asset model according to a principle herein may adapt itself to the current conditions of an energy asset. That is, the computation of the CBL calculations may reflect temporary changes or permanent changes in the physical characteristics of an energy asset. The historical actual-use-based CBL may capture permanent changes in the energy asset as well.

In other examples, the mathematical model for energy asset(s) may be predicated on some degree of essentially real-time or near real-time feedback (e.g., from one or more control systems actually controlling the modeled energy asset(s)), which feedback may represent actual electricity use. This feedback may be used, according to some examples of the methods, apparatus and systems disclosed herein, to refine some aspects of the mathematical model; however, even when real-time or near real-time feedback representing actual electricity use is employed, in some examples the mathematical model is may be based on physical attributes of the energy asset(s) themselves relating to electricity use and/or electricity generation.

Objective Cost Functions

In some examples, the mathematical model for the energy asset(s) is employed to determine a suggested operating schedule over a given time period T for the energy asset(s) (different than the BAU operating schedule) based on a mathematical optimization of an "objective cost function" representing the net energy-related cost to the energy customer for operating the asset(s). In example implementations, the objective cost function incorporates the mathematical model for the energy asset(s) and specifies energy-related revenues from one or more wholesale energy markets (e.g., based on forecasted wholesale energy prices over the time period T for the one or more wholesale markets of interest), from which possible revenue may be available to the energy customer. In some examples, the energy-related revenues specified in the objective cost function may take into consideration a simulated customer baseline (CBL) energy profile (discussed above) as a basis for determining such revenue.

The objective cost function employed in the mathematical optimization to determine a suggested operating schedule for the energy asset(s) also may specify energy-related costs which are offset by the energy-related revenues. In particular, in some examples, the energy-related costs included in the objective cost function may include "actual" energy-related costs (e.g., retail electricity costs, wholesale electricity costs representing revenue earned by the energy customer, fuel costs to run one or more electricity generation assets, operation and/or maintenance costs that may be associated with electricity generation and/or energy storage assets, lifetime and/or replacement costs for electricity generation and/or energy storage assets, emissions-related costs, etc.). The energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets).

Optimization of Objective Cost Function For Generating Energy Asset Operating Schedules In one example, the objective cost function (which incorporates the mathematical model of the energy asset(s)) may be provided to an optimizer (a particularly-programmed processor, also referred to as a "solver") that implements a mathematical optimization process to determine a suggested operating schedule for the energy asset(s) over a given time period T. In one conceptual illustration of the mathematical optimization process, some number N of candidate operating schedules are successively applied to the mathematical model to generate simulated energy profiles corresponding to the candidate operating schedules. A net energy-related cost represented by the objective cost function is calculated for each simulated energy profile, and the candidate operating schedule that minimizes the objective cost function (i.e., minimizes the net energy-related cost) is selected as the suggested operating schedule. In some implementations, the amount of revenue available from the relevant wholesale electricity markets over the given time period T is a significant factor dictating the candidate operating schedule that is provided as an output of the optimizer. The energy-related costs may also include a reliability cost (such as based on any voltage/VAR control activity in a microgrid application) and/or an emissions cost based on an emissions market.

Adopting Operating Schedules, Market Bids and Settlement

The suggested operating schedule in turn may be transmitted to the energy customer (e.g., to an energy management system of the energy customer), and the customer may choose to adopt or not adopt the suggested operating schedule to actually operate its energy asset(s) over the particular time period T for which the optimization is performed. In some implementations, a given operating schedule is transmitted to the energy customer in the form of one or more bias signals representing a change in an operating set point of one or more assets, as a function of time over the time period T, from the typical or "business-as-usual" (BAU) operating set point for the asset(s). In some examples, the energy customer makes a choice to adopt a given suggested operating schedule in tandem with making an offer (a "bid") to provide one or more wholesale electricity market products to the appropriate market pursuant to the adopted operating schedule.

If the energy customer adopts the suggested operating schedule to actually operate its energy asset(s) so as to provide a particular wholesale electricity market product pursuant to an accepted bid (e.g., reduce its energy consumption), various information ultimately is obtained from the energy customer to facilitate a "settlement" process pursuant to which the customer is paid by the wholesale market operator (i.e., the RTO/ISO overseeing the wholesale electricity market(s) in which the customer is participating). For example, in one example relating to energy markets (wherein the "product" is energy use curtailment), the energy customer's "metered load" (i.e., actual energy use during the time period T in which the suggested operating schedule is adopted) is measured, and compared to a simulated CBL based on the mathematical model for the customer's energy asset(s). The energy customer may then be paid for its economic demand response electricity use reduction based on a difference between the simulated CBL and the actual metered load, multiplied by the actual wholesale energy price during the time period T for the market in question (e.g., LMP).

Apparatus, systems, methods and computer-readable media are described for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a regulation market and/or a wholesale electricity market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, an energy-generating capacity of a transport vehicle in communication with the energy storage asset based on a motion of the transport vehicle, and (i) a regulation price associated with the regulation market and/or (ii) a forecast wholesale electricity price associated with the wholesale electricity market. The at least one processing unit is communicatively coupled to the at least one communication interface and the at least one memory. Upon execution of the processor-executable instructions, the at least one processing unit determines the operating schedule for the controller of the at least one energy storage asset using the mathematical model, and controls the at least one communication interface to transmit to the energy customer the determined operating schedule for the controller of the at least one energy storage asset, and/or controls the at least one memory so as to store the determined operating schedule for the controller.

In an example, the operating schedule for the controller of the at least one energy storage asset can be determined based on an optimization process using the mathematical model.

Non-limiting example operation characteristics of the at least one energy storage assets herein are a state of charge, a charge rate, a degree of non-linearity of charge rate a discharge rate, a degree of non-linearity of discharge rate, a round trip efficiency, or a degree of life reduction.

Non-limiting examples of energy storage asset applicable to any of the apparatus, systems, and methods described herein include lithium ion batteries, lead acid batteries, flow batteries, or dry cell batteries.

In an example, the motion of any of the transport vehicles herein can be a regenerative braking motion.

In an aspect, the energy-related revenue available to the energy customer over the time period T is based at least in part on a regulation market and a wholesale electricity market. The operating schedule for the controller of the at least one energy storage asset can be generated to specify a first time interval within the time period T for use of the energy storage asset in the regulation market and a second time interval within the time period T for use of the energy storage asset in the energy market.

In an aspect, upon execution of the processor-executable instructions, the at least one processing unit determines the operating schedule for the controller of the at least one energy storage asset using the mathematical model by minimizing a net energy-related cost over the time period T. The net-energy related cost is based at least in part on an amount of energy accumulated in the energy storage asset based on the expected energy-generating schedule of the transport vehicle, electricity generation by the at least one energy storage asset; and electricity consumption by the at least one energy storage asset. The energy-related revenue available to the energy customer is based at least in part on the minimized net energy-related cost.

In an aspect, the at least one energy storage asset can include at least one wayside storage unit in electrical communication with the transport vehicle.

In an aspect, the at least one energy storage asset can include at least one electric vehicle and/or at least one hybrid electric vehicle in electrical communication with the at least one wayside storage unit.

In an aspect, the apparatus, systems, methods and computer-readable media can further include at least one energy generating asset in electrical communication with the at least one energy storage asset, where the at least one energy storage asset includes at least one wayside storage unit in electrical communication with the transport vehicle, and where the wayside storage is configured to store an amount of energy generated by the at least one energy generating asset and/or an amount of energy generated based on the motion of the transport vehicle.

Non-limiting examples of applicable energy generating asset are photovoltaic cells, wind generators, diesel generators, fuel cells, gas turbines, diesel generators, flywheels, electric vehicles, hybrid electric vehicles, or wind turbines.

An example system is also provided that includes any of the apparatus described herein and a power control system. The power control system can include a controller. The power control system can be coupled to the at least one energy storage asset and to the apparatus so as to receive the suggested operating schedule. The power control system can be implemented to control operation of the at least one energy storage asset based at least in part on the operating schedule.

Apparatus, systems, methods and computer-readable media described herein can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a regulation market and a wholesale electricity market that includes an energy market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, an energy-generating capacity of a transport vehicle in communication with the energy storage asset based on a motion of the transport vehicle, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on an amount of energy accumulated in the energy storage asset based on the expected energy-generating schedule of the transport vehicle, the duration of energy storage asset participation in the regulation market, electricity generation by the at least one energy storage asset, and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller Apparatus, systems, methods and computer-readable media described herein can be used for determining suggested operating schedule over a time period T for at least one energy storage asset associated with a transportation operation implemented by an energy customer of a retail electricity supplier, so as to reduce a net energy-related cost, over the time period T, associated with electricity consumption and/or electricity generation by the energy customer, wherein the net energy-related cost is based at least in part on an energy-related revenue available to the energy customer over the time period T from a regulation market and/or a wholesale electricity market. In this example, the apparatus includes at least one communication interface, at least one processing unit, and at least one memory to store processor-executable instructions, a mathematical model for the at least one energy storage asset, and an objective cost function. The mathematical model specifies at least one function that calculates an energy profile for the at least one energy storage asset based at least in part on an operating schedule for the at least one energy storage asset applied to the mathematical model. The objective function represents the net energy-related cost, the objective cost function specifying the energy-related revenue and at least one energy-related cost associated with operation of the at least one energy storage asset, the objective cost function calculating the net energy-related cost based at least in part on the energy profile calculated via the mathematical model and (i) a regulation price associated with the regulation market and/or (ii) a forecast wholesale electricity price associated with the wholesale electricity market. The at least one processing unit can be configured to determine the suggested operating schedule, via an optimization process, as a solution that minimizes the objective cost function, and control the at least one communication interface to transmit to the energy customer the suggested operating schedule for the controller of the at least one energy storage asset and/or controls the at least one memory so as to store the determined operating schedule for the controller.

In an example, the at least one processing unit controls the at least one communication interface to transmit the suggested operating schedule to a power control system coupled to the at least one energy storage asset.

In an example, the power control system is coupled to the apparatus so as to receive the suggested operating schedule, where the power control system controls operation of the at least one energy storage asset based at least in part on the suggested operating schedule.

Apparatus, systems, methods and computer-readable media described herein can be used for implementing a method of generating energy-related revenue in connection with operation of an electric rail system, the electric rail system including at least one energy storage asset to store regenerative breaking energy arising from the operation of the electric rail system. The method includes electronically determining a suggested operating schedule for charging and discharging of the at least one energy storage asset based on optimization of an objective cost function representing, at least in part, a demand response revenue from a regulation market, and controlling the at least one energy storage asset according to the suggested operating schedule.

In an example, a power control system is provided to control at least one energy storage asset associated with an electric rail system, the at least one energy storage asset configured to store regenerative breaking energy arising from the operation of the electric rail system. The power control system can include at least one communication interface to receive a suggested operating schedule for charging and discharging of the at least one energy storage asset, the suggested operating schedule being based on optimization of an objective cost function representing, at least in part, a demand response revenue from a regulation market, and a controller, coupled to the at least one communication interface, to control the at least one energy storage asset according to the suggested operating schedule received via the at least one communication interface.

Apparatus, methods and computer-readable media described herein can be used for determining an operating schedule of a controller of at least one energy storage asset so as to generate energy-related revenue, over a time period T, associated with operation of the at least one energy storage asset according to the operating schedule. The energy-related revenue available to the energy customer over the time period T is based at least in part on a wholesale electricity market and a regulation market. In this example, the apparatus includes at least one communication interface, at least one memory to store processor-executable instructions and a mathematical model for the at least one energy storage asset, and at least one processing unit. The mathematical model facilitates a determination of the operating schedule for the controller based at least in part on an operation characteristic of the at least one energy storage asset, an energy-generating capacity of a transport vehicle in communication with the energy storage asset based on a motion of the transport vehicle, a regulation price associated with a regulation market, and a forecast wholesale electricity price associated with the wholesale electricity market. The at least one processing unit is configured to determine the operating schedule for the controller of the at least one energy storage asset based on an optimization process using the mathematical model, wherein the operating schedule specifies a first time interval within the time period T for use of the energy storage asset in the regulation market and a second time interval within the time period T for use of the energy storage asset in the energy market. The at least one processing unit is also configured to control the at least one communication interface to transmit to the energy customer the operating schedule for the controller of the at least one energy storage asset and/or controls the at least one memory so as to store the determined operating schedule for the controller.

An example power control system including a controller can be coupled to the at least one energy storage asset and to the apparatus so as to receive the suggested operating schedule, where the power control system controls operation of the at least one energy storage asset based at least in part on the operating schedule.

Apparatus, methods and computer-readable media described herein can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a regulation market and/or a wholesale electricity market. The at least one energy storage asset includes at least one electric vehicle and/or at least one hybrid electric vehicle. In this example, the apparatus includes at least one communication interface, at least one memory to store processor-executable instructions and a mathematical model for the at least one energy storage asset, and at least one processing unit. The mathematical model facilitates determination of the operating schedule for the controller of the at least one energy storage asset based at least in part on an operation characteristic of the at least one energy storage asset, an energy-generating capacity of at least one energy generating asset in communication with the energy storage asset, and (i) a regulation price associated with the regulation market and/or (ii) a forecast wholesale electricity price associated with the wholesale electricity market. Upon execution of the processor-executable instructions, the at least one processing unit determines the operating schedule for the controller of the at least one energy storage asset using the mathematical model, and controls the at least one communication interface to transmit to the energy customer the determined operating schedule for the controller of the at least one energy storage asset, and/or controls the at least one memory so as to store the determined operating schedule for the controller.

In an example, the operating schedule for the controller of the at least one energy storage asset can be determined based on an optimization process using the mathematical model.

Non-limiting examples of applicable energy generating asset are photovoltaic cells, wind generators, diesel generators, fuel cells, gas turbines, diesel generators, flywheels, electric vehicles, hybrid electric vehicles, or wind turbines.

In an aspect, upon execution of the processor-executable instructions, the at least one processing unit determines the operating schedule for the controller of the at least one energy storage asset using the mathematical model by minimizing a net energy-related cost over the time period T. The net-energy related cost is based at least in part on an amount of energy accumulated in the energy storage asset based on the expected energy-generating schedule of the transport vehicle, electricity generation by the at least one energy storage asset; and electricity consumption by the at least one energy storage asset. The energy-related revenue available to the energy customer is based at least in part on the minimized net energy-related cost.

In an example, the net energy-related cost is specified as a difference between an electricity supply cost and an economic demand response revenue over the time period T.

In an example, the mathematical model facilitates a determination of the operating schedule for the controller of the at least one energy storage asset based at least in part on a replacement cost for the at least one energy storage asset.

In an example, the operating schedule for the controller of the at least one energy storage asset can specify a first time interval within the time period T for use of the energy storage asset in the regulation market and a second time interval within the time period T for use of the energy storage asset in the wholesale electricity market.

In an example, the operating schedule for the controller of the at least one energy storage asset can specify a first time interval within the time period T for use of the energy storage asset in the regulation market and/or the wholesale electricity market, and a second time interval within the time period T for charging the at least one energy storage asset.

The following patent applications are hereby incorporated herein by reference in their entirety:

U.S. Provisional Application No. 61/477,067, filed on Apr. 19, 2011;

U.S. Provisional Application No. 61/552,982, filed on Oct. 28, 2011;

U.S. Non-provisional application Ser. No. 12/850,918, filed on Aug. 5, 2010; and U.S. Provisional Application No. 61/279,589, filed on Oct. 23, 2009.

The entire disclosure of these applications is incorporated herein by reference in its entirety, including drawings, It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6 illustrates an example block diagram representing an asset model according to a principle described herein.

FIG. 7 illustrates an example block diagram representing another asset model according to a principle described herein.

DETAILED DESCRIPTION

Following below are more detailed descriptions of various concepts related to, and embodiments of, inventive methods, apparatus, and systems for determining a suggested operating schedule for energy assets to facilitate revenue generation from wholesale electricity markets. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but not limited to, the term "including" means including but not limited to. The term "based on" means based at least in part on.

As used herein, the term "in communication with" includes direct communication between elements as well as indirect communication between the elements, such as by means of at least one intermediate component. As used herein, the term "in electrical communication with" includes direct electrical communication between elements as well as indirect electrical communication between the elements, such as by means of at least one intermediate component.

Figure 1:
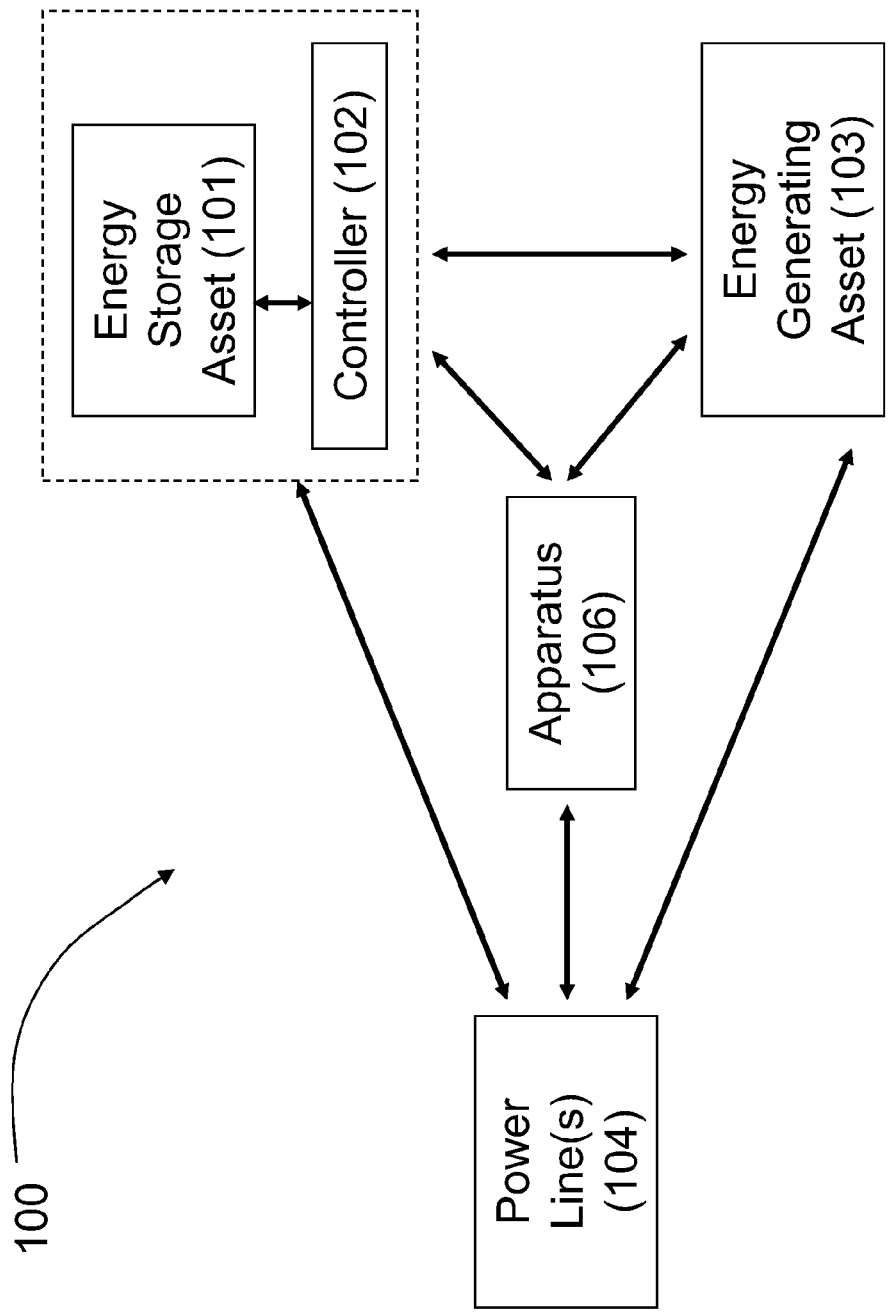
FIG. 1 shows an example system that includes an energy storage asset, a controller, and an energy generating asset, according to a principle described herein.

As illustrated in the example of FIG. 1, the apparatus and methods described herein are applicable to a system 100 that includes at least one energy storage asset 101, a controller 102 in communication with the energy storage asset 101, and an energy generating asset 103. At least one of the energy storage asset 101, the controller 102, and the energy generating asset 103 is in communication with a power line 104. The controller 102 facilitates charging of the energy storage asset 31 using the electricity supplied by power line 104 or feeding power generated by a discharge of the energy storage asset 101 to the power line 104. The energy generating asset 103 includes at least one regenerative energy asset. As also depicted in the non-limiting example of FIG. 1, the controller 102 facilitates charging of the energy storage asset 101 using the regenerative energy that can be generated by an energy generating asset 103 that is a regenerative energy generating asset. According to the principles herein, an apparatus 106 is provided that can be used to generate a suggested operating schedule for the controller of the energy storage asset 101. Operation of the controller 102 and energy storage asset 101 according to the operating schedule can facilitate an energy-related revenue to an energy customer. The controller 102, the energy storage asset 101, and the apparatus 106 may be located at one or more different facilities of the energy consumer.

In an example, the apparatus 106 can be used according to the principles herein to determine the suggested operating schedule for the controller 102 of the at least one energy storage asset 102 based at least in part on a mathematical model applied to an operation characteristic of the at least one energy storage asset, an energy-generating capacity of a transport vehicle in communication with the energy storage asset based on a motion of the transport vehicle, and a forecast wholesale electricity price associated with an energy market and/or a regulation price associated with the regulation market. An energy generating asset 103 that is a regenerative energy generating asset includes the transport vehicle, and the regenerative braking energy is generated from a braking motion of the transport vehicle. The operating schedule for the controller of the at least one energy storage asset 101 is generated based on an optimization process using the mathematical model.

As used herein, the term "transport vehicle" refers to at least one railroad car of a train of a transportation system or at least one platform or compartment of a carriage system. The at least one railroad car can be a part of an electric railway power traction system. A carriage system includes an elevator system or any other similar system based on a platform or compartment housed in a shaft for transporting people or things to different vertical levels or horizontal positions.

The expected energy-generating schedule of the energy generating asset 103 can be determined based on its expected or averaged energy generating capacity. For example, where energy generating asset 103 is a regenerative braking energy of a regenerative energy generating asset, the expected energy-generating schedule can be determined based on the set schedule of trains in a transportation system or the averaged or projected motion of transport vehicles in a transportation system or a carriage system.

In an example, the at least one energy storage asset 101 is at least one wayside energy storage asset. Non-limiting examples of the wayside energy storage assets are energy storage assets located at the substations of transportation systems, or energy storage assets located at the power units for the carriage systems.

In another example, the energy generating asset 103 can include at least one electric vehicle and/or at least one hybrid electric vehicle.

Non-limiting examples of energy storage assets include batteries, ice units, and compressed air. Non-limiting examples of batteries include lithium ion batteries, lead-acid batteries, flow batteries, or dry cell technology batteries.

In the non-limiting example of FIG. 1, the controller 102 facilitates the communication between the regenerative energy generating asset 103 and the energy storage asset 101. In another example, the regenerative energy generating asset 103 may communicate with the energy storage asset 101 via one or more other components including the controller 102.

The apparatus and methods herein facilitate generation of energy-related revenue for an energy customer of an electricity supplier, where the energy customer commits an amount of energy from the at least one energy storage asset to a regulation market and/or an energy market. In an example, the electricity supplier may be a retail electricity supplier that supplies the electricity to the energy customer at a retail price. In another example, the electricity supplier may supply the electricity to the energy customer at a contracted for or negotiated price. In various examples herein, the energy customer may allow an amount of capacity of the energy storage asset to be committed to the energy market or the charge/discharge capacity of the energy storage asset to be committed to the regulation market. When implemented, the apparatus and methods described herein may allow the energy customer to generate an amount of energy-related revenue over a time period that an amount of charge capacity and/or charge/discharge capacity of the energy storage asset is committed to the regulation market and/or the energy market.

In a non-limiting example, an apparatus or a method described herein can be used to generate an operating schedule for a controller that communicates with the energy storage asset. The controller is capable of exercising an amount of control over the rate of charging or energy generation of the energy storage asset. As a result, the controller can be used to maintain the state of charge of the energy storage asset, or change its state of charge controllably. Operation of the controller, and hence the energy storage asset, according to the operating schedule generated by an apparatus or a method herein over the time period may make available to the energy customer an amount of energy-related revenue based at least in part on the wholesale electricity market.

Figure 2:
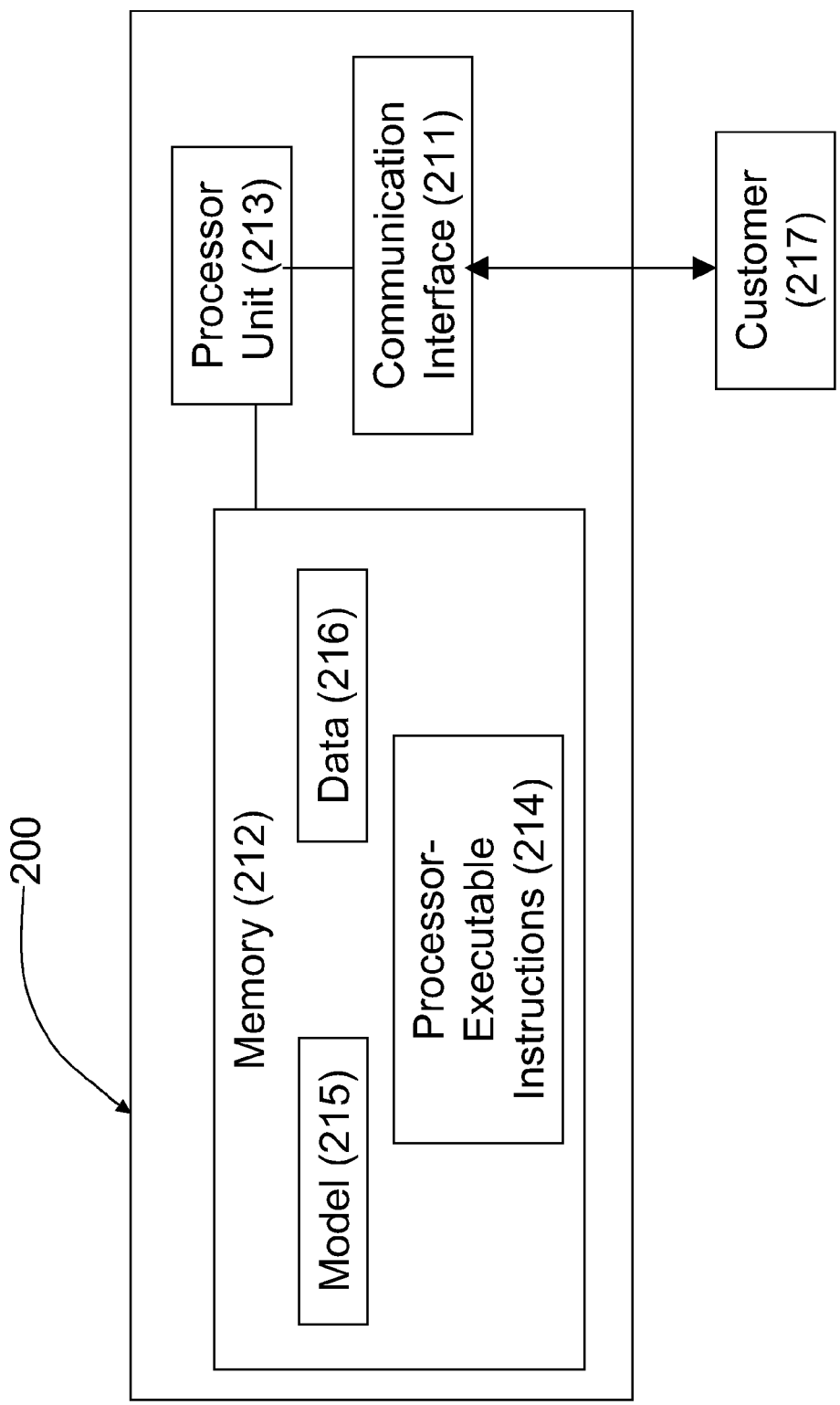
FIG. 2 shows an example apparatus according to a principle described herein.

A non-limiting example of the apparatus 200 according to the principles described herein is illustrated in FIG. 2. The apparatus 200 includes at least one communication interface 211, at least one memory 212, and at least one processing unit 213. The at least one processing unit 213 is communicatively coupled to the at least one communication interface 211 and the at least one memory 212.

The at least one memory 212 is configured to store processor-executable instructions 214 and a mathematical model 215 for the at least one energy storage asset. As described in greater detail below, the mathematical model determines the operating schedule for the controller based on data 216 associated with parameters, including but not limited to, an operation characteristic of the energy storage asset, an operation characteristic of a regenerative energy generating asset in communication with the energy storage asset, and a regulation price associated with a regulation market and/or a forecast wholesale electricity price associated with the wholesale electricity market.

In a non-limiting example, the at least one processing unit 213 executes the processor-executable instructions 214 stored in the memory 212 at least to determine the operating schedule for the controller of the energy storage asset using the mathematical model 215. The at least one processing unit 213 also executes processor-executable instructions 214 to control the communication interface 211 to transmit to the energy customer 217 the operating schedule that has been determined for the controller and/or controls the memory 212 to store the determined operating schedule for the controller. In a non-limiting example, the processing unit 213 may execute processor-executable instructions 214 to control the communication interface 211 to transmit to the operating schedule directly to the controller.

The operation characteristic of the energy storage asset may be its state of charge, charge rate, the degree of non-linearity of the charge rate, discharge rate, degree of non-linearity of the discharge rate, round trip efficiency, and degree of life reduction. In an example where the operation characteristic of the energy storage asset is its charge rate and/or discharge rate, the operating schedule for the controller may include suggested different time intervals for charging the energy storage asset or discharging the energy storage asset during the time period T that the system is in operation. As a non-limiting example, the operating schedule for the controller may indicate a time interval for charging the energy storage asset that coincides with a corresponding time interval during which the forecast wholesale electricity price falls below a predetermined threshold value. As another non-limiting example, the operating schedule for the controller may indicate a time interval of discharging the energy storage asset that coincides with a corresponding time interval during which the forecast wholesale electricity price exceeds a predetermined threshold value.

Figure 3:
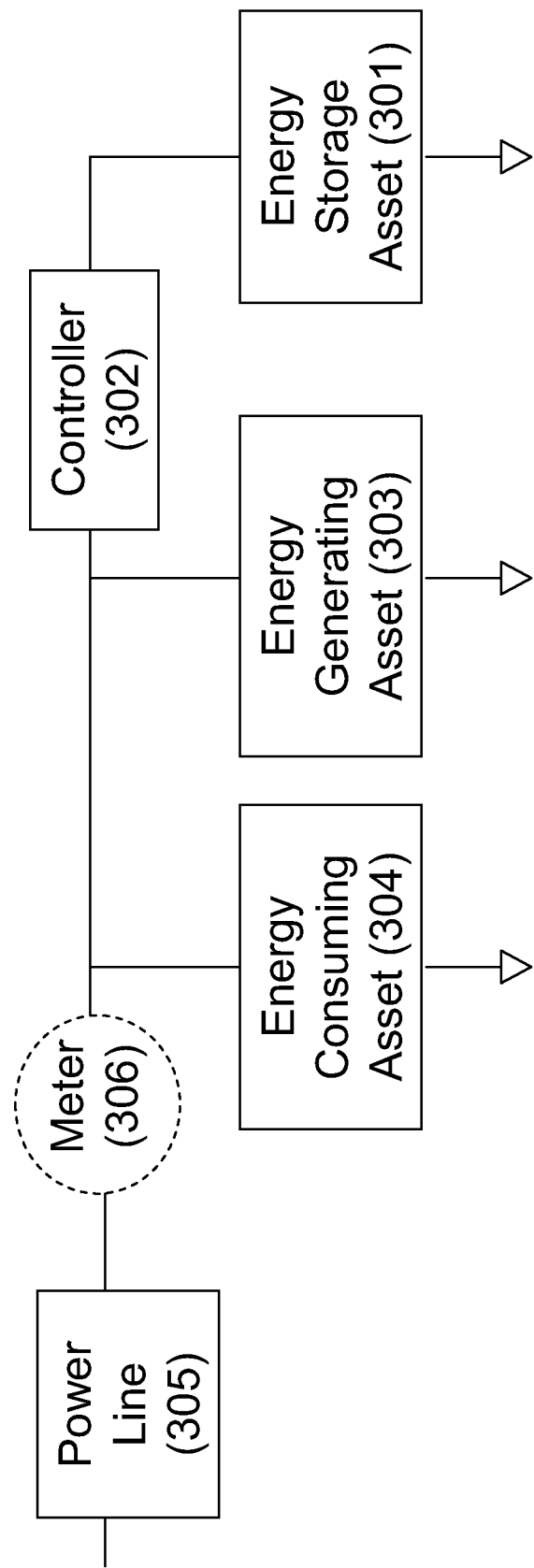
FIG. 3 shows an example system that includes an energy storage asset, a controller, an energy generating asset, and an energy consuming asset, according to a principle described herein.

The apparatus and methods described herein are also applicable to a system as depicted in the example of FIG. 3. In this example, the apparatus includes at least one energy storage asset 301, a controller 302 in communication with the at least one energy storage asset 301, at least one energy generating asset 303 and at least one energy consuming asset 304. The at least one energy storage asset 301 is in communication with a power line 305. The energy generating asset 303 can be a regenerative energy generating asset. The energy generating asset 303 can include at least one other energy generating asset, including photovoltaic cells, fuel cells, gas turbines, diesel generators, flywheels, electric vehicles, hybrid electric vehicles, and wind turbines. The controller 302 in communication with the energy storage asset 301 facilitates charging of the energy storage asset 301 using the electricity supplied by power line 305. The controller 302 also facilitates feeding power generated by a discharge of the energy storage asset 301 to the power line 305. As depicted in the non-limiting example of FIG. 1, the controller 302, the energy storage asset 301, the energy generating asset 303, and the energy consuming asset 304 may be located behind a power meter 305. For example, all of the controller 302, the energy storage asset 301, the energy generating asset 303, and the energy consuming asset 304 may be located at one or more facilities of the energy consumer.

In the non-limiting example of FIG. 3, the controller 302 facilitates the communication between the energy consuming asset, the energy storage asset, and the energy generating asset. In other examples, the energy consuming asset may communicate with the energy storage asset via one or more other components including the controller 302.

An apparatus according to the principles of FIG. 2 may be implemented relative to the system of FIG. 3 to generate an operating schedule for the controller 302. In this example, the mathematical model facilitates determination of the operating schedule for the controller of the at least one energy storage asset further based at least in part on an expected energy-generating schedule of the energy generating asset in communication with the energy storage asset and the energy consuming asset. Any principles and/or implementations described herein, including above, in connection with FIG. 1 are also applicable to the system of FIG. 3.

The operation characteristic of the energy consuming asset may be its load use schedule. For example, the operation characteristic of the energy consuming asset can be its energy consumption profile as a function of time. The energy consuming asset may be a controllable asset or a fixed-load asset. A fixed-load asset is an energy consuming asset whose energy consumption characteristics may not be readily modified, even if it varies over time. The energy consumption characteristics of a controllable energy consuming asset may be modified by changing parameters of operation of the system. A non-limiting example of an operation characteristic for a controllable energy consuming asset is its set point. The set point may be a controllable set point, e.g., it may be controllable as a function of time or temperature. For example, where the controllable energy consuming asset is a transport vehicle with a variable internal temperature controlled by a heating, ventilation and air conditioning (HVAC) system, the operation characteristic may be a temperature set point for the HVAC system. In another example, the transport vehicle also can serve as an energy consuming asset to the extent that some of the regenerative braking energy that is used to charge the energy storage asset is used to accelerate (i.e., push) the transport vehicle from the station.

As described herein, in an example, an amount of energy of the energy storage asset may be generated and supplied to the power line at a discharge rate to generate energy-related revenue for the energy customer in an energy market. The energy-related revenue can depend on a forecast wholesale electricity price associated with the wholesale electricity market, and may be determined based on computation of a net-energy related cost. The net energy related cost may be computed based on the supply costs for supplying electricity to the customer and a demand response revenue. An apparatus and method herein can be implemented to generate an operating schedule for the controller of the energy storage asset that provides recommendations for the timing of charging and discharging of the energy storage asset.

In an example, the processing unit can be configured to determine the operating schedule for the controller of the at least one energy storage asset using the mathematical model by minimizing a net energy-related cost over the relevant time period (T). The net energy-related cost can be associated with electricity generation by the energy storage asset, electricity consumption by the energy storage asset, and electricity consumption by the energy consuming asset. Here, the energy-related revenue available to the energy customer may be computed based at least in part on the minimized net energy-related cost.

The net energy-related cost may be specified as a difference between the electricity supply cost and the economic demand response revenue over the pertinent time period.

In an example, the processing unit can be configured to determine the operating schedule for the controller using the mathematical model and a representative customer baseline (CBL) energy profile for the energy consuming asset over the time period (T). As used herein, the term "representative customer baseline energy profile" or "representative CBL energy profile" encompasses representations of the energy customer's energy usage in the absence of change of behavior according to the principles described herein. As non-limiting examples, the "representative customer baseline energy profile" or "representative CBL energy profile" includes an estimation based on the energy customer's business-as-usual (BAU) operations, including any form of averaged or weighted measure based on measures of historical BAU operations. Herein, the representative CBL energy profile represents a typical operation of the at least one energy consuming asset by the energy customer. For example, where the energy consuming asset is a fixed-load asset, the representative CBL may be determined as the energy consumption profile for the energy consuming asset.

Where the operating schedule for the controller is generated based on using the mathematical model and a representative customer baseline (CBL) energy profile, the economic demand response revenue may be computed based on the forecast wholesale electricity price, the electricity generation by the energy storage asset, the electricity consumption by the energy storage asset, and the representative CBL energy profile for the energy consuming asset.

In an example herein, a portion of the energy of the energy storage asset may be committed to the regulation market. That is, the wholesale electricity market for the energy customer would include an energy market and a regulation market. In an example where the forecast wholesale electricity price is for the energy market, the operating schedule for the controller may specify optimal time intervals for use of the energy storage asset in the regulation market. For example, if the forecast wholesale electricity price for the energy market is projected to fall below a predetermined threshold value during a time interval, the operating schedule for the controller may recommend of the energy storage asset in the regulation market during that time interval. Where the forecast wholesale electricity price for the energy market is projected to fall below a predetermined threshold value during a time interval, the operating schedule for the controller may recommend use of the energy storage asset in the regulation market during that time interval.

According to an example of the principles herein, the wholesale electricity market may include both the energy market and the regulation market, and the operating schedule generated may facilitate implementation of the energy storage asset in both the energy market and the regulation market. According to a principle of virtual partitioning described herein, the operating schedule for the controller may be configured so that the energy customer may participate in both the energy market and the regulation market concurrently the energy storage asset. In a non-limiting example, the operating schedule for the controller of the energy storage asset may specify that, during a given time interval, a first portion of an available state of charge (SOC) of the energy storage asset may be used in the energy market and a second portion of the available SOC of the energy storage asset may be committed to the regulation market. The operating schedule generate for the controller may be used to energy-related revenue for the energy consumer based on both the energy market and the regulation market. The principles and implementations described above in connection to FIG. 1 are also applicable to a system operating according to the principles of virtual partitioning.

The apparatus 200 illustrated in FIG. 2 may be used to implement the virtual partitioning described herein. In this non-limiting example, the at least one memory 12 is configured to store processor-executable instructions 14 and a mathematical model 15 for the at least one energy storage asset, where the mathematical model determines the operating schedule for the controller based on data 16 associated with parameters, including but not limited to, an operation characteristic of the energy storage asset, an operation characteristic of the energy consuming asset in communication with the at least one energy storage asset, and a forecast wholesale electricity price associated with the wholesale electricity market.

In this non-limiting example of virtual partitioning, the at least one processing unit 213 executes the processor-executable instructions 214 stored in the memory 212 at least to determine the operating schedule for the controller of the energy storage asset using the mathematical model 215, where the operating schedule specifies, during a time interval less than time period T, a proportion of an available state of charge (SOC) of the energy storage asset for use in the energy market and a remaining proportion of the available SOC of the energy storage asset for use in the regulation market. The at least one processing unit 213 also executes processor-executable instructions 14 to control the communication interface 11 to transmit to the energy customer 217 the operating schedule that has been determined for the controller and/or controls the memory 212 to store the determined operating schedule for the controller. In a non-limiting example, the processing unit 213 may execute processor-executable instructions 214 to control the communication interface 211 to transmit to the operating schedule directly to the controller.

In a non-limiting example, the operation characteristic of the at least one energy storage asset can be at least one of a state of charge, a charge rate, a degree of non-linearity of charge rate a discharge rate, a degree of non-linearity of discharge rate, a round trip efficiency, and a degree of life reduction. The proportion of the available SOC of the energy storage asset for use in the energy market may be supplied as a direct-current (DC) signal, while the remaining proportion of the available SOC of the energy storage asset for use in the regulation market may be delivered at a variable charge rate or variable discharge rate.

In an example where the energy storage asset is used in both the energy market and the regulation market, constraints may be placed on the total amount of energy used. For example, the total SOC of the energy storage asset over the time that it is used in both markets can be constrained to be depleted to no less than a minimum allowed SOC value or charged to no more than a maximal allowed SOC value. In an example, the sum of the proportion of the available SOC of the at least one energy storage asset for use in the energy market and the remaining proportion of the available SOC of the at least one energy storage asset for use in the regulation market can be constrained to be no less than a minimal allowed SOC and no more than a maximal allowed SOC. As a non-limiting example, the maximal allowed SOC of the energy storage asset may be set at 80%, and the minimal allowed SOC may be set at 20%.

Figure 4:
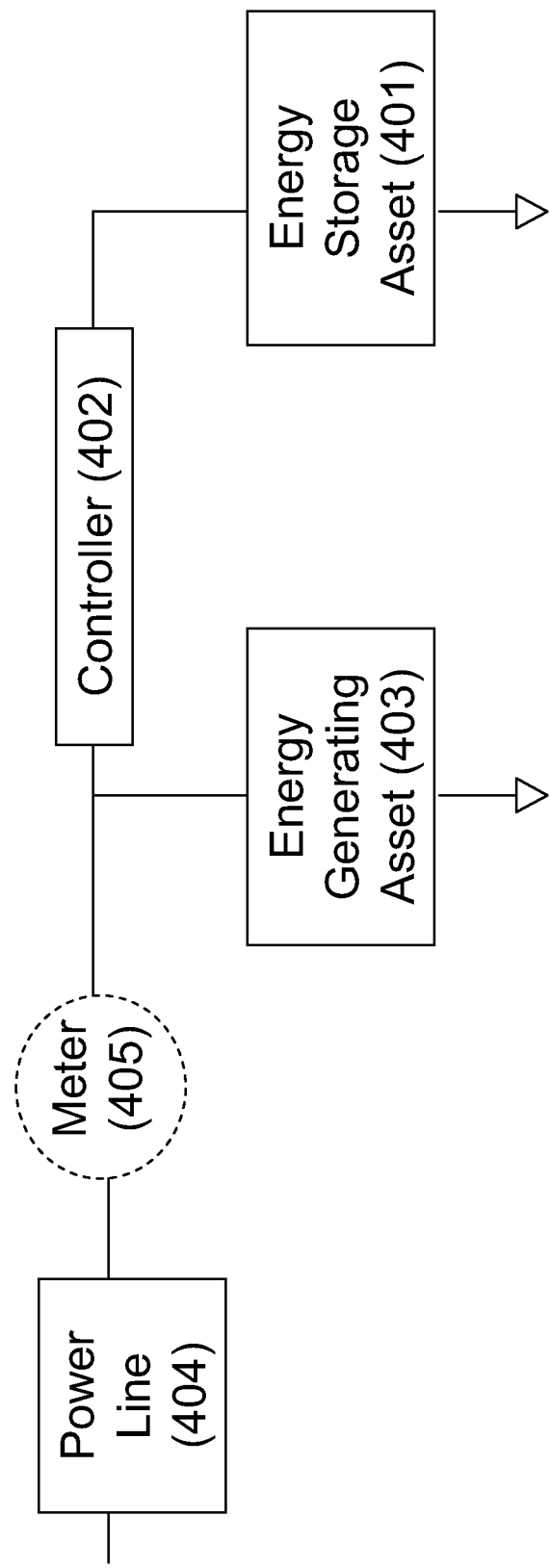
FIG. 4 shows an example system that includes an energy storage asset, a controller, and an energy generating asset, according to a principle described herein.

The apparatus and methods described herein are also applicable to a system as depicted in the example of FIG. 4. In this example, the apparatus includes an energy storage asset 401, a controller 402 in communication with the energy storage asset 401, and an energy generating asset 403 in communication with a power line 404. The controller 402 facilitates charging of the energy storage asset 31 using the electricity supplied by power line 404. The controller 402 also facilitates feeding power generated by a discharge of the energy storage asset 401 to the power line 404. Non-limiting examples of energy generating assets include photovoltaic cells, fuel cells, gas turbines, diesel generators, flywheels, electric vehicles, and wind turbines. As depicted in the non-limiting example of FIG. 4, the controller 402, the energy storage asset 401, and the energy generating asset 403 may be located behind a power meter 405. For example, all of the controller 402, the energy storage asset 401, and the energy generating asset 33 may be located at one or more facilities of the energy consumer.

As a non-limiting example, the system of FIG. 4 can apply to an example implementation where an aggregation of electric vehicles and/or hybrid electric vehicles that are in communication with at least one energy generating asset are committed to a regulation market and/or an energy market as energy storage assets to facilitate deriving energy-related revenue.

As another non-limiting example, the system of FIG. 4 can apply to an example implementation where wayside energy storage asset(s) are coupled with the aggregation of electric vehicles and/or hybrid electric vehicles, and the combined capacity is committed to the regulation market and/or the energy market as energy storage assets to facilitate deriving the energy-related revenue.

In the non-limiting example of FIG. 4, the controller 402 facilitates the communication between the energy storage asset and the energy generating asset. In other examples, the energy consuming asset may communicate with the energy storage asset via one or more other components including the controller 402.

An apparatus according to the principles of FIG. 2 may be implemented relative to the system of FIG. 4 to generate an operating schedule for the controller 402. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 4.

In a non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market. In this example, the apparatus includes at least one communication interface, at least one memory to store processor-executable instructions and a mathematical model for the at least one energy storage asset, and at least one processing unit. The mathematical model facilitates determination of the operating schedule for the controller based at least in part on an operation characteristic of the at least one energy storage asset, an expected energy-generating schedule of the energy generating asset in communication with the energy storage asset, and a forecast wholesale electricity price associated with the wholesale electricity market. The at least one processing unit can be configured to determine the operating schedule for the controller of the at least one energy storage asset using the mathematical model, and control the at least one communication interface to transmit to the energy customer the operating schedule for the controller of the at least one energy storage asset and/or controls the at least one memory so as to store the determined operating schedule for the controller.

In this example, the at least one processing unit can be configured to determine the operating schedule for the controller of the at least one energy storage asset using the mathematical model by minimizing a net energy-related cost over the time period T. The net-energy related cost is based at least in part on the amount of energy generation by the at least one energy generating asset, electricity generation by the at least one energy storage asset; and electricity consumption by the at least one energy storage asset. The energy-related revenue available to the energy customer is based at least in part on the minimized net energy-related cost. The net energy-related cost may be specified as a difference between an electricity supply cost and an economic demand response revenue over the time period T. The energy generating asset may be a photovoltaic cell, a fuel cell, a gas turbine, a diesel generator, a flywheel, an electric vehicle, or a wind turbine. The operation characteristic of the at least one energy storage asset may be a state of charge, a charge rate, a degree of non-linearity of charge rate a discharge rate, a degree of non-linearity of discharge rate, a round trip efficiency, or a degree of life reduction.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule. The energy-related revenue available to the energy customer over the time period T is based at least in part on a wholesale electricity market, and the wholesale electricity market includes an energy market and a regulation market. In this example, the apparatus includes at least one communication interface, at least one memory to store processor-executable instructions and a mathematical model for the at least one energy storage asset, and at least one processing unit. The mathematical model facilitates a determination of the operating schedule for the controller based at least in part on an operation characteristic of the at least one energy storage asset, an expected energy-generating schedule of an energy generating asset in communication with the energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the amount of energy generation by the at least one energy generating asset, duration of energy storage asset participation in the regulation market, electricity generation by the at least one energy storage asset and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

In this example, the available output of the controller may be a charge rate of the at least one energy storage asset or a discharge rate of the at least one energy storage asset. The net energy-related cost is specified as a difference between an electricity supply cost and an economic demand response revenue over the time period T. The operation characteristic of the at least one energy storage asset may be a state of charge, a charge rate, a degree of non-linearity of charge rate a discharge rate, a degree of non-linearity of discharge rate, a round trip efficiency, and a degree of life reduction.

Figure 5:
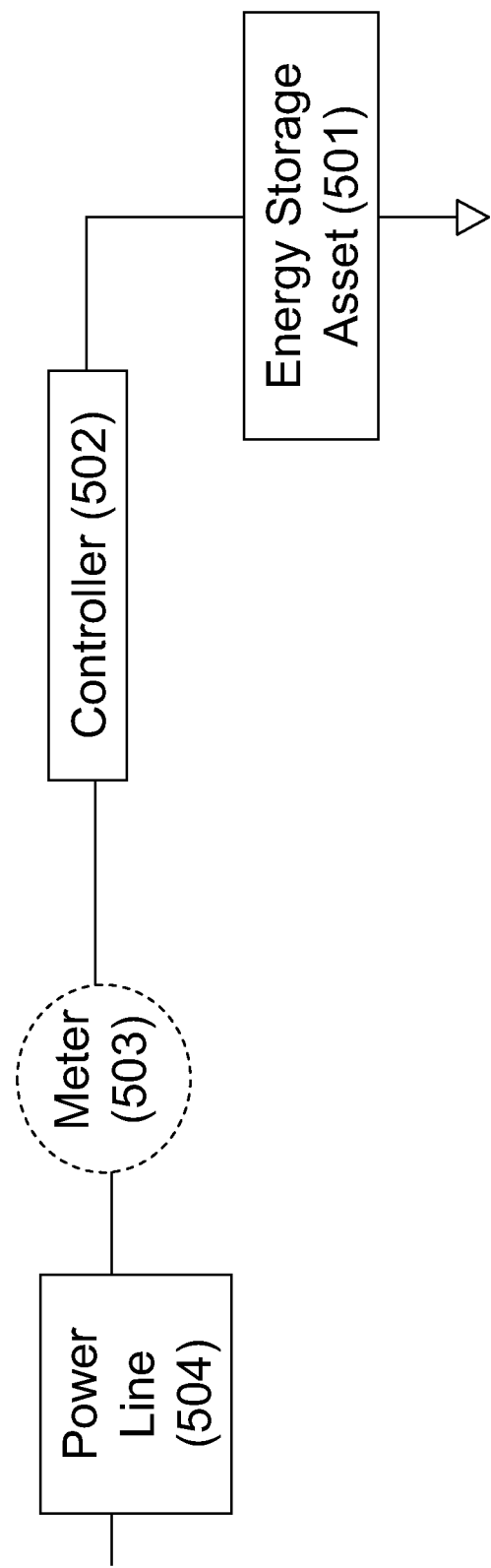
FIG. 5 shows an example system that includes an energy storage asset and a controller, according to a principle described herein.

The apparatus and methods described herein are also applicable to a system as depicted in the example of FIG. 5. In this example, the apparatus includes an energy storage asset 501, and a controller 502 in communication with the energy storage asset 501 and in communication with a power line 504. The controller 502 facilitates charging of the energy storage asset 31 using the electricity supplied by power line 504. The controller 502 also facilitates feeding power generated by a discharge of the energy storage asset 501 to the power line 504. Non-limiting examples of energy generating assets include photovoltaic cells, fuel cells, gas turbines, diesel generators, flywheels, electric vehicles, and wind turbines. As depicted in the non-limiting example of FIG. 5, the controller 502, and the energy storage asset 501 may be located behind a power meter 503. For example, the controller 502 and the energy storage asset 501 may be located at one or more facilities of the energy consumer.

As a non-limiting example, the system of FIG. 5 can apply to an example implementation where an aggregation of electric vehicles and/or hybrid electric vehicles that are in communication with at least one energy generating asset are committed to a regulation market and/or an energy market as energy storage assets to facilitate deriving energy-related revenue.

As another non-limiting example, the system of FIG. 5 can apply to an example implementation where wayside energy storage asset(s) are coupled with the aggregation of electric vehicles and/or hybrid electric vehicles, and the combined capacity is committed to the regulation market and/or the energy market as energy storage assets to facilitate deriving the energy-related revenue.

In the non-limiting example of FIG. 5, the controller 502 facilitates the communication between the energy storage asset and the energy generating asset. In other examples, the energy consuming asset may communicate with the energy storage asset via one or more other components including the controller 502.

An apparatus according to the principles of FIG. 2 may be implemented relative to the system of FIG. 5 to generate an operating schedule for the controller 502. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 5.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market, and wherein the wholesale electricity market includes an energy market and a regulation market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the duration of energy storage asset participation in the regulation market, electricity generation by the at least one energy storage asset, and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

In this example, the available output of the controller is a charge rate of the at least one energy storage asset or a discharge rate of the at least one energy storage asset. The net energy-related cost may be specified as a difference between an electricity supply cost and an economic demand response revenue over the time period T. The operation characteristic of the at least one energy storage asset is a state of charge, a charge rate, a degree of non-linearity of charge rate a discharge rate, a degree of non-linearity of discharge rate, a round trip efficiency, or a degree of life reduction.

Energy Asset Modeling

To facilitate the mathematical optimization process for generating a suggested operating schedule for one or more energy assets according to various examples of the principles herein, a mathematical model representing an energy customer's energy asset(s) is formulated and employed to simulate an "energy profile" for the asset(s). In one aspect, the model is essentially specified by one or more mathematical functions that at least in part represent physical attributes of the energy asset(s) themselves as they relate to electricity use and/or electricity generation. Depending on the energy asset(s) operated by the energy customer, the mathematical function(s) defining an asset model may represent a single energy asset or an aggregation of multiple energy assets operated by the customer. For purposes of the discussion herein, the term "asset model," unless otherwise qualified, is used generally to denote a model representing either a single energy asset or an aggregation of multiple energy assets.

To illustrate the general concept of an asset model, a model is first considered for one or more energy assets that not only may be turned "on" or "off," but that may be controlled at various "operating set points." For example, consider the case of a transport vehicle that includes a heating, ventilation and air conditioning (HVAC) system for temperature control, for which the customer may choose different temperature set points at different times (e.g., thermostat settings); accordingly, in this example, the temperature set points constitute "operating set points" of the transport vehicle. In this example, the magnitude of the operating set point may vary as a function of time t, in a continuous or step-wise manner (e.g., Temp(t)=72 degrees F. for 9 PM<t<9 AM; Temp(t)=68 degrees F. for 9 AM<t<9 PM). In other examples of energy assets that merely may be turned "on" or "off," the magnitude of the operating set point may be binary (i.e., on or off), but the respective on and off states may vary as a function of time t (e.g., over a given time period T).

Based on the notion of time-varying operating set points for energy assets, the term "operating schedule" as used herein refers to an operating set point of one or more energy assets as a function of time, and is denoted by the notation SP(t):

SP(*t*)=operating schedule for one or more energy assets.

The amount of energy used (and/or generated) by a particular asset or group of assets in a given time period T is referred to herein as an "energy profile." In various implementations discussed herein, the energy profile of one or more assets often depends at least in part on a given operating schedule SP(t) for the asset(s) during the time period T. For a fixed-load asset, the energy profile may not depend on a given operating schedule SP(t). Accordingly, an energy asset model specifies one or more mathematical functions for calculating an energy profile (i.e., electricity use and/or electricity generation as a function of time) for the asset(s), based on a proposed operating schedule for the asset(s) applied as an input to the model. The one or more functions constituting the asset model are denoted herein generally as F (and for simplicity the term "function" when referring to F may be used in the singular), and the model may be conceptually represented using mathematical notation as:

$$F(SP(t))=EP(t),\qquad \text{Eq. 1}$$

where the operating schedule SP(t) is an argument of the function F, and the energy profile of the modeled asset(s) as a function of time is denoted as EP(t). In a non-limiting example, EP(t) has units of MWh. FIG. 6 illustrates a simple block diagram representing the asset model given by Eq. 1.

In various examples, the function(s) F defining a particular asset model may be relatively simple or arbitrarily complex functions of the argument SP(t) (e.g., the function(s) may involve one or more constants, have multiple terms with respective coefficients, include terms of different orders, include differential equations, etc.) to reflect how the asset(s) consume or generate energy in response to the operating schedule SP(t). In general, the particular form of a given function F, and/or the coefficients for different terms, may be based at least in part on one or more physical attributes of the asset(s), and/or the environment in which the asset(s) is/are operated, which may impact the energy profile of the asset(s) pursuant to the operating schedule. More specifically, depending on the type of energy asset(s) being modeled, the mathematical model may be formulated to accept other inputs (in addition to the operating schedule SP(t)), and/or to accommodate variable parameters of a given function F (e.g., via time-dependent coefficients of different terms of the function), to facilitate calculation of the energy profile EP(t) based on a proposed operating schedule SP(t).

For example, in the case of the transport vehicle discussed above, and/or other assets for which thermodynamic considerations are pertinent, various internal factors that may impact the asset's energy profile in general (e.g., occupancy; a presence of equipment such as computers and other instrumentation that may affect heating or cooling in an environment; thermal inertia due to insulation, vehicle materials, windows; etc.) may be considered in the formulation of the form of the function F itself, and/or coefficients for different terms of the function F. In some examples discussed in further detail below, the function F may be dynamically adjusted based on observing actual energy usage over time by the asset(s) pursuant to control via a particular operating schedule (i.e., coefficients of function terms initially may be estimated, and subsequently adjusted over time based on real-time feedback from controlled assets).

Similarly, the mathematical model for the asset(s) may be configured to consider as an input to the model actual or forecast ambient environmental conditions (e.g., temperature, humidity, ambient light/cloud cover, etc.) as a function of time, collectively denoted as "weather information" W(t), which may impact the energy profile of one or more assets. In this case, the model may be conceptually represented as:

$$F(SP(t), W(t)) = EP(t), \quad \text{Eq. 2}$$

where both the operating schedule SP(t) and the weather information W(t) are arguments of the function F. FIG. 7 illustrates a simple block diagram representing the asset model given by Eq. 2. It should be appreciated that, while weather information W(t) is noted above as providing another possible input to the model in addition to the operating schedule SP(t), in other examples one or more other inputs to the model may be provided and considered as arguments to the function F (and accordingly taken into consideration in the function) for purposes of calculating an energy profile EP(t) for the asset(s).

Figure 8:
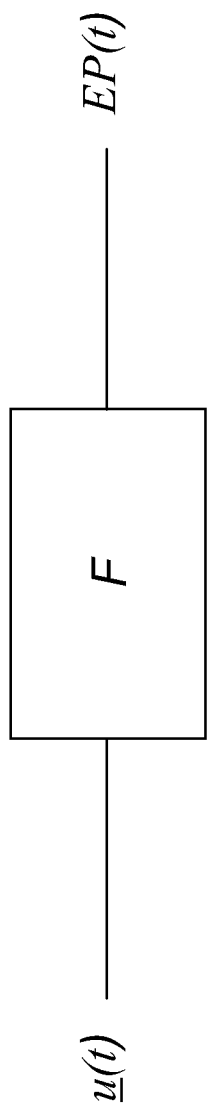
FIG. 8 illustrates an example block diagram representing another asset model according to a principle described herein.

In another example herein, the mathematical model for a system that includes a controllable asset, such as an energy storage asset and an associated controller, may be configured to consider as an input to the model the control vector for the controller as a function of time, denoted as $\underline{u}(t)$, which may impact the energy profile. In this case, the model may be conceptually represented as:

$$F(u(t)) = EP(t), \quad \text{Eq. 3}$$

where both the control vector of the controller is an argument of the function F. FIG. 8 illustrates a simple block diagram representing the asset model given by Eq. 3. It should be appreciated that, while the control vector u(t) is noted above as providing input to the model, in other examples, one or more other inputs to the model may be provided and considered as arguments to the function F (and accordingly taken into consideration in the function) for purposes of calculating an energy profile EP (t) for the asset(s). An energy storage asset herein generally refers to an asset that can store a form of energy and release it as usable energy (or power) over time. Non-limiting examples of energy storage assets include batteries, ice units, compressed air, flywheel, heated liquids, and heated solids. Non-limiting examples of batteries include lithium ion batteries, lead-acid batteries, flow batteries, or dry cell technology batteries.

Figure 9:
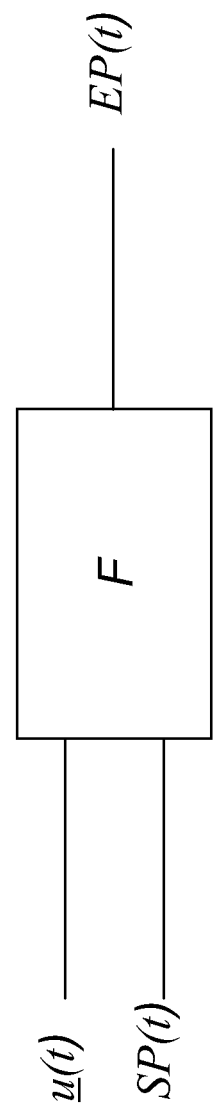
FIG. 9 illustrates an example block diagram representing another asset model according to a principle described herein.

In yet another example herein, the mathematical model for a system that includes an energy consuming asset, such as but not limited to a transport vehicle, and a controllable asset, such as but not limited to an energy storage asset and an associated controller, may be configured to consider as an input to the model the control vector for the controller as a function of time, denoted as $\underline{u}(t)$, and temperature dependent operating set points for the energy consuming asset (its operating schedule). In this case, the model may be conceptually represented as:

$$F(u(t), SP(t)) = EP(t), \quad \text{Eq. 4}$$

where both the control vector of the controller is an argument of the function F. FIG. 9 illustrates a simple block diagram representing the asset model given by Eq. 4. The control vector for a controller, $\underline{u}(t) = C_t + D_t$, may be expressed as:

$$C_t = u_{1,t} * C/D_{max}$$

$$D_t = u_{2,t} * C/D_{max} \quad \text{Eq. 5}$$

with the constraints that $u_{1,t} * u_{2,t} = 0$ and $0 \le u_{1,t}, u_{2,t} \le 1$, where represents $C/D_{max}$ the maximum charge rate or discharge rate capacity of the controller in communication with the energy storage asset.

Figure 10:
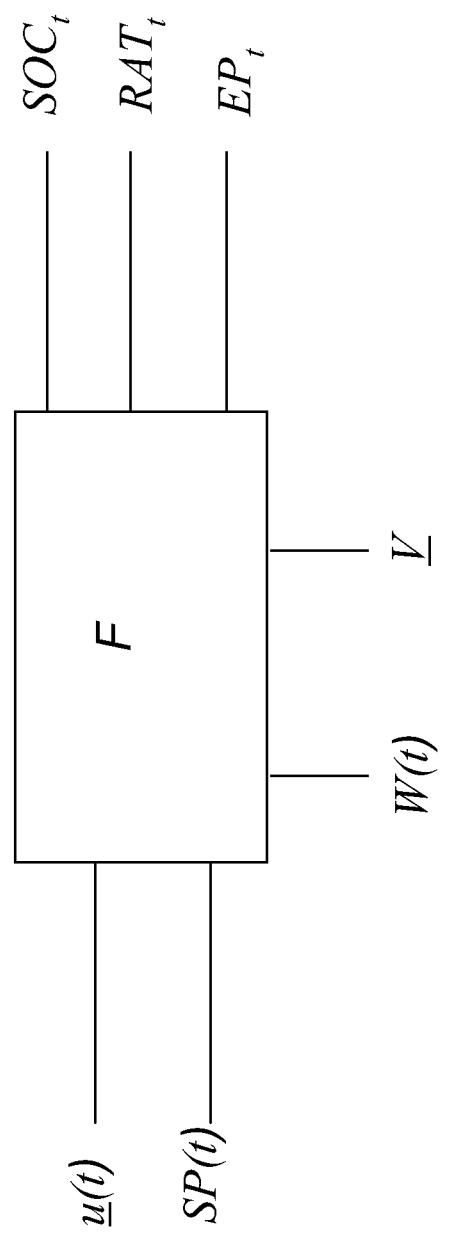
FIG. 10 illustrates an example block diagram representing another asset model according to a principle described herein.

In yet another example herein, the mathematical model for a system that includes an energy consuming asset, such as but not limited to a transport vehicle, and a controllable asset, such as but not limited to an energy storage asset and an associated controller, may be configured to consider as an input to the model the control vector for the controller as a function of time, denoted as $\underline{u}(t)$, and temperature dependent operating set points for the energy consuming asset (its operating schedule). FIG. 10 illustrates a simple block diagram representing the asset model for such as system according to the principles herein. In this case, the model may have outputs of the state of charge ($SOC_t$) of the energy storage asset as a function of time t, the return-a-temperature ($RAT_t$) as a function of time t (for, e.g., a HVAC or other similar equipment), and the energy profile of the energy consuming asset (e.g., the transport vehicle). Other inputs to the system can be weather information (W(t)) and/or feedback from other energy assets in the system ($\underline{v}$). This model can be used, e.g., for co-optimization of an energy storage asset and an energy consuming asset for the energy market.

In an example according to a principle herein, once an appropriate asset model is established for a given energy asset or group of energy assets, different candidate operating schedules may be applied to the model to simulate how the energy profile EP(t) of the asset(s) is affected as a function of time, over a given time period T, by the different operating schedules.

An example technique for facilitating determination of optimal operating schedule for energy cost reduction and/or revenue generation from wholesale electricity markets according to various examples disclosed herein is as follows. In this example, the system includes an energy consuming asset, a controller of the energy storage asset, and a controllable energy consuming asset. A plurality of first candidate operating schedules is selected for the controller, and a plurality of second candidate operating schedules is selected for the energy consuming asset. Each second candidate operating schedule for the energy consuming asset is different from the BAU operating schedule for the energy consuming asset. The plurality of first and second candidate operating schedules are successively applied to the mathematical model to generate corresponding plurality of simulated energy profiles for the energy storage asset and the energy consuming asset. A plurality of projected net energy-related costs to the energy customer are computed, where each projected net energy-related cost is computed based at least in part on the representative CBL energy profile and the simulated energy profiles corresponding to the respective first and second candidate operating schedules and the forecast wholesale electricity price. Respective ones of the first and second candidate operating schedules corresponding to one simulated energy profile of the plurality of simulated energy profiles that results in a minimum net energy-related cost of the plurality of net energy-related costs calculated are selected as an optimal first operating schedule and an optimal second operating schedule. That is, namely, this technique can be implemented to simulate how energy assets consume/generate electricity based on different candidate operating schedules for the asset(s), and to select a particular operating schedule that facilitates a particular economic goal of the energy customer.

In another example, the operating schedules for the energy storage asset and energy consuming asset can be calculated in tandem based on minimizing the net energy-related costs (NEC), as discussed in greater detail below.

Operating Schedules and Constraints

In considering various operating schedules SP(t) that may be applied to the asset model so as to simulate a corresponding energy profile EP(t), in some instances SP(t) may not be varied freely. Such limitations on candidate operating schedules may be due at least in part to physical limitations of the asset(s) being modeled, and/or limitations on operation of the asset(s) dictated by the energy customer itself. For example, in some instances the customer may want to constrain the range in which the magnitude of SP(t) may be varied at any given time, and/or the customer may wish to designate particular periods of time (e.g., within the given time period T of interest) during which particular values of SP(t) cannot be changed (or only changed in a limited manner).

For purposes of illustration, again consider a transport vehicle with an HVAC system. The customer may specify that, in considering candidate operating schedules SP(t) for the transport vehicle, temperature set points (i.e., the magnitude of SP(t) in this example) must remain in a range of from between 65 to 75 degrees F. in any proposed operating schedule; furthermore, the customer may dictate that during a certain time frame, the temperature set point may not exceed 70 degrees F. In general, magnitude and/or timing limitations placed on a candidate operating schedule SP(t) for one or more modeled assets are referred to herein as "constraints" on the operating schedule.

The concept of candidate operating schedules for one or more modeled energy assets subject to one or more "constraints" is denoted herein as:

$$SP(t)|_{Constraints} = \text{operating schedule for one or more energy assets subject to constraints}$$

In an example, the system includes an energy storage asset, and constraint may be placed on the allowed state of charge (SOC) of the energy storage asset. For example, the constraint may be placed that the SOC does should not be allowed to fall below a minimal SOC value (i.e., not too depleted) and/or that the SOC does should not be allowed to go above a maximal SOC (i.e., not overly-charged).

Business-as-Usual (BAU) Conditions and Customer Baseline (CBL) Energy Profiles

Once an appropriate asset model is established for a given energy asset or group of energy assets, a particular operating schedule of interest in some examples is referred to herein as a "typical" or "business-as-usual" (BAU) operating schedule (also referred to herein as "BAU conditions"), denoted as $SP(t)_{BAU}$. In particular, "BAU conditions" refer to an operating schedule that an energy customer would typically adopt for its energy asset(s), absent the incentive to reduce energy costs and/or earn energy-related revenue from wholesale electricity markets. Again turning to the example of a transport vehicle for purposes of illustration, absent any incentive to change its behavior, during a summer season in which cooling is desired an energy customer may typically set the thermostat (i.e., temperature set points) for the transport vehicle at 72 degrees F. from 9 PM to 9 AM, and at 68 degrees F. from 9 AM to 9 PM; this can be represented conceptually using the notation adopted herein as:

$$SP(t)_{BAU} = \begin{cases} 72, & 9 \text{ PM} < t < 9 \text{ AM} \\ 68, & 9 \text{ AM} < t < 9 \text{ PM} \end{cases}.$$

When a typical operating schedule $SP(t)_{BAU}$ is applied to the asset model, the particular energy profile generated by the model is a special case referred to herein as a simulated "customer baseline" (CBL) energy profile, denoted as CBL(t). Using the example relationship given in Eq. 2 above (which includes consideration of weather information), the special case of a CBL energy profile may be conceptually represented mathematically as:

$$F(SP(t)_{BAU}, W(t)) = CBL(t), \qquad \text{Eq. 6}$$

where the typical operating schedule $SP(t)_{BAU}$ is an argument of the function F (in this example together with the weather information W(t)), and the CBL energy profile of the modeled asset(s) as a function of time is denoted as CBL(t).

Although consideration of weather information W(t) is included in the example above, it should be appreciated that the simulation of a customer baseline (CBL) energy profile in other examples may not consider weather information (as such information may not be relevant to the energy profile of the asset(s) in question). It should also be appreciated that while the simulation of a CBL energy profile may be useful for mathematical optimization techniques employed in some examples to facilitate energy cost reduction and/or revenue generation from particular wholesale electricity markets (e.g., economic demand response "energy markets"), simulation of a CBL energy profile may not be applicable or necessary in other examples to facilitate energy cost reduction and/or revenue generation from wholesale electricity markets.

Objective Cost Functions and Optimal Control

For purposes of the present disclosure, an "objective cost function" specifies all energy-related costs and energy-related revenues associated with operating one or more modeled energy assets of an energy customer so as to achieve a particular economic goal (an economic "objective"). In one aspect, an objective cost function incorporates the function(s) F representing the mathematical model for one or more energy assets, and specifies an energy customer's "net energy-related cost" (e.g., in dollars) associated with operating the modeled asset(s) over a given time period T. The energy customer's net energy-related cost as given by the objective cost function is denoted herein as NEC$:

NEC$=net energy-related cost to operate one or more energy assets.

As discussed in greater detail below, objective cost functions providing a net energy-related cost NEC$ according to different examples may have a variety of respective cost and revenue terms, based at least in part on the types of asset(s) being operated and the particular revenue-generation objective(s) (e.g., the particular wholesale electricity market(s) from which revenue is being sought).

For example, in some examples, the energy-related costs included in the objective cost function may include "actual" energy-related costs (e.g., retail electricity costs, wholesale electricity costs representing revenue earned by the energy customer, etc.). In some examples, the energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets). In an example, energy-related costs included in the objective cost function may include reliability costs associated with voltage/VAR control in a microgrid application. Similarly, an objective cost function may include one or more terms specifying energy-related revenues corresponding to one or more wholesale electricity markets (e.g., "energy markets," "synchronized reserve," "regulation").

To provide a preliminary illustration of concepts germane to an objective cost function specifying a net energy-related cost NEC$, an example relating to economic demand response revenue from the wholesale electricity "energy markets" is first considered. To this end, retail electricity prices (i.e., what the energy customer pays a "utility" for electricity usage) and wholesale electricity-related product prices available to the energy customer respectively are denoted as:

Retail$(t)=price of electricity from a retail electricity provider("utility"); and Wholesale$(t)=price of electricity-related product on applicable wholesale electricity market, where the retail electricity price Retail$(t) and the wholesale electricity-related product price Wholesale$(t) may vary independently of each other as a function of time. In an example, the units of the retail electricity price Retail$(t) and the wholesale electricity-related product price Wholesale$(t) are $/MWh.

The wholesale price Wholesale$(t) can be dictated by (e.g., based at least in part on) the "locational marginal price" (LMP) as a function of time, as noted above (see Background section). However, depending on a given wholesale electricity market and/or a particular electricity-related product in question, it should be appreciated that the wholesale price Wholesale$(t) may be based on other and/or additional factors. Also, practically speaking, wholesale prices are not continuous functions of time; rather, as discussed above, wholesale prices based on the LMP may be calculated periodically at specified nodes of the grid (e.g., every 5 minutes, every half-hour, every hour) depending on the particular market in which the energy customer is participating. Accordingly, it should be appreciated that Wholesale$(t) typically is a discrete function of time, with t having some periodicity (e.g., 5 minutes, 30 minutes, 60 minutes).

Given the notation above for retail and wholesale prices, the energy customer's modeled retail electricity costs (or "supply costs"), for operating one or more modeled electricity-consuming assets pursuant to a particular operating schedule SP(t) applied to an asset model, is denoted herein as Supply$(t), given by:

$$\text{Supply\$}(t) = EP(t) * \text{Retail\$}(t), \quad \text{Eq. 7}$$

wherein EP(t) is the energy profile of the modeled asset(s) (e.g., given by any of Eqs. 1-4 above).

For the energy storage asset, the energy customer's "supply costs" for charging the asset can be denoted herein as Supply$(t)$_{ES}$, given by:

$$\text{Supply\$}(t)_{ES} = EP(t) * \text{Retail\$}(t), \quad \text{Eq. 8}$$

wherein EP(t) is the energy profile of the modeled energy storage asset(s). Since the energy profile for an energy storage asset can be represented based on a charge rate ($C_t$) for a time step (t<7) over the amount of time of charging ($\Delta t$), the supply costs can be expressed as:

$$\text{Supply\$}(t)_{ES} = C_t * \Delta t * \text{Retail\$}(t). \quad \text{Eq. 9}$$

The charge rate ($C_t$) may be the maximum charge rate of the energy storage asset, or a charge rate less than the maximum charge rate. For example, in different examples herein, the output of the controller may modify the charge rate of the energy storage asset to values that are less than the maximum charge rate.

If the system includes an energy storage asset and an energy generating asset, the total supply costs can be expressed, in a non-limiting example, as the energy storage asset (Supply$(t)$_{ES}$) reduced by a cost amount based on the amount of energy provided by the energy generating asset ($EG_k$). In an example, the total supply costs can be expressed as:

$$\text{Supply\$}(t)_{total} = (C_k - EG_k) * \Delta t * \text{Retail\$}(t). \quad \text{Eq. 10}$$

Supply costs may also apply to the system by virtue of the reduction in life of the energy storage asset. An energy storage asset may have a limited life depending on its rating of expected charge/discharge cycles. A portion of the costs associated with ultimately replacing an energy storage asset at the end of its lifetime may be included in the supply costs based on the number of charge/discharge cycles it is expected to undergo when implemented in an energy market and/or a regulation market as described herein. The lifetime reduction supply costs may also depend on the number of kWh is used in each charge or discharge cycle, and/or for what length of time the energy storage asset is used in a market (energy, regulation, etc.). For example, the contribution to the supply costs based on the replacement cost (Replacement$) may be computed according to the expression:

$$\text{Supply\$}(t)_{LIFE} = \text{Replacement\$}/n \quad \text{Eq. 11}$$

where n represents an effective number of charge/discharge cycles. The effective number of charge/discharge cycles can depend on the number of cycles the asset is expected to undergo when implemented in an energy market and/or a regulation market, the number of kWh is used in each charge or discharge cycle, and/or for what length of time the energy storage asset is used in a given market. This lifetime supply cost would be additive to any of the expressions for supply costs described herein for a system that includes an energy storage asset.

With respect to economic demand response revenue from the wholesale electricity energy markets, in the present example it is presumed that the energy customer is amenable to operating its energy asset(s) pursuant to a candidate operating schedule that is different than its "typical operating schedule" or BAU conditions (i.e., SP(t)$_{BAU}$), such that the energy profile EP(t) of the asset(s) will be on average lower than the customer baseline CBL(t) (see Eq. 6 and related description above). Altering the energy profile of the asset(s) with respect to the customer baseline, pursuant to a change in behavior represented by a candidate operating schedule different than BAU conditions, provides the source of opportunity for generating economic demand response revenue from the wholesale electricity energy markets. Accordingly, a wholesale electricity energy market "demand response revenue," denoted herein as DR$(t)$_{EM}$, is given generally by:

$$\text{DR\$}(t)_{EM} = \max\{0, [(CBL(t) - EP(t)) * \text{Wholesale\$}(t)]\}. \quad \text{Eq. 12}$$

In an example, the DR$(t) represents the net difference between actual net metered load and the BAU load. The participation of any component of the energy asset in the energy market, regulation market or spinning reserve market is included in the computation of DR$(t) to the extent they affect the value of the metered load. In addition, the energy generated by any energy generating asset that is part of the energy asset may also be included in the computation of DR$(t) to the extent this behind-the-meter generated energy affects the value of the metered load.

For an energy storage asset in an energy market, a demand response revenue may be denoted herein as DR$(t)$_{ES}$, is given generally by:

$$\text{DR\$}(t)_{ES} = (0 - (-(D_t))) * \Delta t * \text{Wholesale\$}(t). \quad \text{Eq. 13}$$

As described herein, a system that includes an energy storage asset can participate in both an energy market (at a price of Wholesale$(t)) and in a regulation market (at a price of regulation$(t)). In this example, the demand response revenue may be computed herein as DR$(t)$_{ES}$, denoted by:

$$DR\$(t)_{ES}=(\epsilon D_t)*\Delta t*\text{Wholesale}\$(t)+(\gamma D_t)*\Delta t*\text{regulation}\$(t) \quad \text{Eq. 14}$$

where $D_t$ denotes the discharge rate of the energy storage asset at a time step. Where the system participates in the energy market and the regulation market at different points in time during overall time period T, both multipliers of the discharge rate, $\epsilon$ and $\gamma$, may be equal to 1. In different examples herein, the output of the controller may modify the discharge rate of the energy storage asset to values that are less than the maximum discharge rate. Using the principles of virtual partitioning described herein, by apportioning an output of the controller in communication with the energy storage asset, a portion of the discharge rate may be directed to the regulation market and another portion directed to the energy market during a given time step. As a non-limiting example, the operating schedule determined as described herein may cause the controller to discharge the energy storage asset at a discharge rate of $\epsilon D_t$ to the energy market, while concurrently respond to the regulation market at a discharge rate of $\gamma D_t$ along shorter timescales (such as but not limited to at 2-second intervals or minute-by-minute time intervals). Here, the constraint on the values may be $\epsilon+\gamma \leq 1$ if $D_t$ represents the maximum discharge rate of the energy storage asset.

In a non-limiting example, where the regulation price is not based on the discharge rate, but rather depends only on the time period of commitment of the energy storage asset to the regulation market, the demand response revenue may be computed as:

$$DR\$(t)_{ES}=(\epsilon D_t)*\Delta t*\text{Wholesale}\$(t)+\text{regulation}\$(t)*\Delta t \quad \text{Eq. 15}$$

In another example, the demand response revenue for a system that includes an energy storage asset and an energy generating asset participating in an energy market may be computed as:

$$DR\$(t)_{ES+EG}=(D_t)*\Delta t*\text{Wholesale}\$(t)+(E_{EG})*\text{Wholesale}\$(t) \quad \text{Eq. 16}$$

where $D_t$ denotes the discharge rate of the energy storage asset at a time step and $E_{EG}$ denotes the energy provided by the energy generating asset.

According to the principles described herein, a demand response may also be generated for a system that includes an energy storage asset and an energy generating asset participating in both an energy market and a regulation market.

Based on the equations for supply costs and demand response above, an example of an objective cost function to provide a net energy-related cost NEC$ over a given time period T for operating the modeled asset(s), considering both retail electricity supply costs and demand response revenue can be computed based on the expression:

$$NEC\$ = \sum_{t}^{T} (\text{Supply}\$(t) - DR\$(t)). \quad \text{Eq. 17}$$

In one example, an objective cost function as exemplified by Eq. 17 may be provided to an optimizer (a particularly-programmed processor, also referred to as a "solver"; such as processor unit 13 of FIG. 2) that implements a mathematical optimization process to determine a suggested operating schedule for the energy asset(s) over the time period T that minimizes the net energy-related cost NEC$. Accordingly, the optimizer solves for:

$$\text{Min}\left[\sum_{t}^{T} (\text{Supply}\$(t) - DR\$(t))\right] \quad \text{Eq. 18}$$

By substituting the pertinent equations for supply costs and demand response (which depends on the energy assets in a given system) back into Eq. 18, the various informational inputs provided to the optimizer may be readily ascertained.

As a non-limiting example, for a system that is participating in the energy market, the various informational inputs provided to the optimizer may be readily ascertained as follows:

$$\text{Min}\left[\sum_{t}^{T} \{(EP(t)*\text{Retail}\$(t)) - (\max\{0, [(CBL(t) - EP(t))*\text{Wholesale}\$(t)]\})\}\right], \quad \text{Eq. 19}$$

where from Eq. 2

$$EP(t)=F(SP(t)|_{Constraints}, W(t)),$$

and from Eq. 6

$$CBL(t)=F(SP(t)_{BAU}, W(t)),$$

where again it is presumed for purposes of illustration that weather information W(t) is relevant in the present example. From the foregoing, it may be seen that one or more of the following inputs may be provided to the optimizer in various examples:

F—one or more functions defining the mathematical model for the energy asset(s);

SP(t)$_{BAU}$—BAU or "typical" operating schedule for the energy asset(s);

Constraints—any timing and/or magnitude constraints placed on candidate operating schedules for the energy asset(s);

W(t)—weather information as a function of time (if appropriate given the type of energy asset(s) being operated);

u(t)—control vector for the controller in communication with the energy storage asset;

Retail$(t)—retail price of electricity as a function of time;

Wholesale$(t)—wholesale price of electricity-related product as a function of time;

Regulation$ (t)—regulation price in regulation market as a function of time; and NEC$—the objective cost function describing the energy customer's net energy-related cost associated with operating the modeled energy asset(s).

Based on the foregoing inputs, the optimizer solves Eq. 19 by finding an "optimal" operating schedule for the energy asset(s), denoted herein as SP(t)$_{opt}$, that minimizes the net energy-related cost NEC$ to the energy customer:

SP(t)$_{opt}$="optimal" or suggested operating schedule for one or more energy assets In various implementations described herein, the optimizer may receive one or more inputs, including but not limited to, the weather information W(t), the retail electricity price Retail$(t), and the wholesale price of the electricity-related product Wholesale$(t) (and the regulation price (regulation$(t))) as forecasted values provided from a third-party source, for the time period T over which the optimization is being performed.

While a given optimizer in a particular implementation may employ various proprietary techniques to solve for the minimization of an objective cost function according to various examples of the principles herein, conceptually the optimization process may be generally understood as follows. In various implementations discussed herein, the optimizer generates the operating schedule using the model of the system through an optimal control procedure. In the various example implementations, the optimizer determines an optimal operating schedule over the defined time period (T) by optimizing an objective cost function. For example, the optimizer can be implemented to determine the operating schedule that generates the energy-related revenue by minimizing a function representing the net energy-related costs of the system over the time period (T). The net energy-related costs can be computed based on the supply costs and the demand response revenue as described herein, including in Eqs. 1-19 above. The optimizer optimizes the objective cost function over the entire defined time period (T) to generate the operating schedule. The generated operating schedule can include suggestions, for different specific time intervals within the overall time period T, for when the controller can be used to implement the energy storage asset in the energy market, in the regulation market, or in both the energy market and regulation market (through dynamic partitioning).

In a non-limiting example of an implementation of the optimizer, some number N of candidate operating schedules $SP(t)|_{Constraints}$ for the modeled asset(s) (together with weather information W(t), if appropriate based on a given objective function) can be successively applied to the asset model given by the function(s) F to generate simulated energy profiles EP(t) corresponding to the candidate operating schedules (see Eqs. 1-4). A net energy-related cost NEC$ given by the objective cost function is calculated for each such simulated energy profile EP(t) (see Eq. 17), and the candidate operating schedule that minimizes the objective cost function (i.e., the "optimal" operating schedule $SP(t)_{opt}$ that minimizes the net energy-related cost NEC$) is selected as the suggested operating schedule to be provided to the energy customer.

As noted earlier, the example above in connection with the objective cost function of Eq. 17 is based on actual energy-related costs (e.g., retail electricity cost) Supply$(t). In other examples, the energy-related costs included in a given objective cost function additionally or alternatively may include "indirect" energy-related costs, such as "convenience/comfort" costs associated with the energy customer's adoption of a suggested operating schedule $SP(t)_{opt}$ different than its typical operating schedule $SP(t)_{BAU}$. In one aspect of such examples, a convenience/comfort cost represents an "indirect" cost in that it does not necessarily relate to actual energy-related expenditures, but rather attributes some cost (e.g., in dollars) relating to a change in the customer's behavior with respect to operating its asset(s), based on the incentive of possible energy-related revenue from the wholesale electricity markets.

Accordingly, in some examples, an alternative objective cost function similar to that shown in Eq. 17 may be given as:

$$NEC\$ = \sum_{t}^{T} (\text{Comfort}\$(t) + \text{Supply}\$(t) - DR\$(t)), \quad \text{Eq. 20}$$

where Comfort$(t) represents a convenience/comfort cost associated with a change in the energy customer's behavior with respect to operating its asset(s). In an example where the energy-related costs included in the objective cost function include reliability costs, they would be included in the computation (such as in Eq. 12) similarly to the Comfort$(t).

A convenience/comfort cost Comfort$(t) may be defined in any of a variety of manners according to different examples. For example, in one implementation, a convenience/comfort cost may be based at least in part on a difference (e.g., a "mathematical distance") between a given candidate operating schedule and the typical operating schedule (BAU conditions) for the modeled asset(s)—e.g., the greater the difference between the candidate operating schedule and the typical operating schedule, the higher the convenience/comfort cost (there may be more inconvenience/discomfort attributed to adopting a "larger" change in behavior). This may be conceptually represented by:

$$\text{Comfort}\$(t) = G[|SP(t)_{Constraints} - SP(t)_{BAU}|] \quad \text{Eq. 21}$$

where G specifies some function of the absolute value of the "difference" between a candidate operating schedule (e.g., in a given iteration of the optimization implemented by the optimizer) and the typical operating schedule.

To provide an example of how Eqs. 20 and 21 may be employed in an optimization process to determine a suggested operating schedule $SP(t)_{opt}$ for an energy customer according to one example, again consider a transport vehicle operated by the energy customer, for which a given operating schedule SP(t) is constituted by a temperature set point as a function of time. If $T(t)_{BAU}$ represents the temperature set points constituting a typical operating schedule, and $T(t)|_{Constraints}$ represents different temperature set points constituting a candidate operating schedule that may be adopted to facilitate energy-cost reduction and/or revenue generation, the convenience/comfort cost Comfort$(t) in this example may be defined as a "temperature set point deviation" $T_{dev}(t)$, according to:

$$\text{Comfort}\$(t) = T_{dev}(t) = A(|T(t)|_{Constraints} - T(t)_{BAU}|), \quad \text{Eq. 22}$$

where A is a constant that converts temperature units to cost units (e.g., degrees F. to dollars). In an example, A may be adjustable for each individual time step, so A may be represented as a vector. Eq. 22 specifies that there is a greater "indirect" cost associated with candidate operating schedules having temperature set points that deviate more significantly from the typical temperature set points (albeit within the constraints provided by the energy customer). In this manner, as part of the optimization process, potential revenue from the wholesale electricity markets may be "tempered" to some extent by a perceived cost, included in the objective cost function (see Eq. 20), that is associated with the inconvenience/discomfort of deviating significantly from the typical operating schedule.

In the example above, although the multiplier A in Eq. 22 is discussed as a conversion constant, it should be appreciated that in other examples A may be an arbitrary function having as an argument the absolute value of the difference between a candidate operating schedule and the typical operating schedule as a function of time. More generally, it should be appreciated that a convenience/comfort cost Comfort\$(t) is not limited to the "temperature-related" example provided above in connection with a transport vehicle, and that other formulations of a convenience/comfort cost as part of an objective function are possible according to various examples of the principles herein.

In yet other examples of objective cost functions, different cost and revenue terms of a given objective cost function may include corresponding "weighting factors" (e.g., specified by the energy customer), so as to ascribe a relative importance to the energy customer of the respective terms of the objective cost function in arriving at a suggested operating schedule $SP(t)_{opt}$. For example, in some instances, an energy customer may want to emphasize the importance of increasing prospective demand response revenue DR\$(t) vis a vis decreasing supply costs Supply\$(t) in solving the optimization problem to arrive at a suggested operating schedule; similarly, in other instances, an energy customer may want to emphasize convenience/comfort costs Comfort\$(t) vis a vis increasing prospective demand response revenue DR\$(t) in solving the optimization problem to arrive at a suggested operating schedule. The ability of an energy customer to tailor a given objective cost function according to weighting factors for respective terms of the objective cost function provides an "elasticity" to the optimization process. Using the objective cost function given in Eq. 20 above as an example, in one example such weighting factors may be included in the specification of an objective cost function as respective term multipliers:

$$NEC\$ = \sum_{t}^{T} [(\alpha * \text{Comfort}\$(t)) + (\beta * \text{Supply}\$(t)) - (\gamma * DR\$(t))], \quad \text{Eq. 23}$$

where $\alpha$, $\beta$, and $\gamma$ constitute the weighting factors. In an example, $\alpha+\beta+\gamma=1$. In another example, $\alpha+\beta+\gamma\neq 1$.

In another example, the value of a weighting factor may differ at various points during the day. For example, if it is preferred that the Comfort\$(t) takes a bigger part in the objective cost function computation at certain points during the day, the factor $\alpha$ may be increased relative to the other weighting factors.

In an example implementation, the operating schedule can be generated through applying an optimization using a net-energy related cost function based only on the energy market. The result of the optimization can be used to provide recommendation for time intervals for the energy customer to participate in the energy market, regulation market, or both the energy market and the regulation market. For example, based on the results of the optimization, the operating schedule may determine that any excess charge/discharge capacity of the controller of the energy storage system may be committed to the regulation market on an hour-by-hour basis. For example, it can be determined that the any excess charge/discharge capacity of the controller may be committed to the regulation market during the first 15 time intervals. The optimization may make such a determination depending on whether the forecast regulation price in the regulation market in this time interval offers opportunity for energy-related revenue during this time interval or if considered in the context of the global optimization over time period T. In an example, such a determination may be made depending on whether the SOC of the energy storage asset is feasible for its use in the regulation market. For example, it may be preferable for the energy storage asset to be near around a 50% SOC for it to be applicable to the regulation market. In addition, if it is decided to commit the energy storage asset to the regulation market for a time interval, e.g., for one or more 1-hour time intervals, the optimization described herein may be re-performed based on the new input state of the system. Such new inputs can include the state of charge of the energy storage asset after its commitment to the regulation market ends. In another non-limiting example, the optimization may evaluate different SOC initial inputs to assess whether "recovery" from the regulation market is feasible for later participation in the energy market.

In an example, a predetermined threshold value of wholesale electricity price can be set at which it is decided that the excess charge/discharge capacity of the controller will be committed to the regulation market. Based on the results of the optimization, a predetermined threshold value of the LMP price, indicated by the dashed horizontal line, may be set. In addition, it may be determined that the first time interval of charging the energy storage asset occurs during the time period that T coincides with the time interval during which the forecast wholesale electricity price falls below the predetermined threshold value. It may also be determined in the operating schedule that a second time interval of discharging the energy storage asset occurs coincides with a time interval during which the forecast wholesale electricity price exceed the predetermined threshold value.

While the discussion above of example objective cost functions and optimization of same to generate suggested operating schedules for energy assets has been based at least in part on economic demand response revenue from wholesale electricity energy markets (and in some particular examples involving transport vehicles), it should be appreciated that the disclosure is not limited in this respect; namely, according to other examples, objective cost functions may be formulated and optimized to achieve a wide variety of energy-related objectives associated with different types of energy assets and revenue generation opportunities from wholesale electricity markets. For example, computation based on revenue from the regulation market has also been described herein above, and optimization based on the wholesale price and the regulation price are described herein below. In other examples, the principles herein can be applied to other markets, such as the spinning reserve market.

Generating an Operating Schedule for Deriving Energy-Related Revenue

As discussed above, the output of an optimization process to minimize an energy customer's net energy-related cost NEC\$ (e.g., as specified by an objective cost function) is typically provided as a suggested operating schedule $SP(t)_{opt}$, for one or more energy assets. Generally speaking, the suggested operating schedule $SP(t)_{opt}$ may comprise one or more set point values as a function of time that take into consideration all of the energy customer's modeled and controllable energy assets.

For example, in some instances involving multiple individually modeled and controllable energy assets, the suggested operating schedule $SP(t)_{opt}$ may comprise multiple time-varying control signals respectively provided to corresponding controllers for the different energy assets. In other cases, the energy customer may have an energy management system (EMS) that oversees control of multiple energy assets, and the suggested operating schedule $SP(t)_{opt}$ may comprise a single control signal provided to the energy customer's EMS, which EMS in turn processes/interprets the single control signal representing the suggested operating schedule $SP(t)_{opt}$ to control respective energy assets.

In examples in which the energy customer normally operates its energy asset(s) according to a typical operating schedule $SP(t)_{BAU}$ (absent any economic incentive to change its energy-related behavior), the suggested operating schedule $SP(t)_{opt}$ may be conveyed to the energy customer in the form of one or more "bias signals," denoted herein by Bias(t). In particular, one or more bias signals Bias(t) may represent a difference between the suggested operating schedule and the typical operating schedule as a function of time, according to:

$$\text{Bias}(t) = SP(t)_{opt} - SP(t)_{BAU}. \qquad \text{Eq. 24}$$

Eq. 24 applies in certain cases. In a more general case, the Bias offsets the "demand level" over components of the energy asset. The bias signal (sent to a EMS) may cause controllers to take actions such as but not limited to load sheddings (including shutting off non-essential loads) and modifying the amount of energy used to push a train (e.g., out of a station) or to start a car of a carriage system.

In an example, in response to the bias signal is sent to the EMS, the EMS may make changes to operation settings of components of the energy asset.

Following is a description of the different markets, including energy markets and regulation markets, to illustrate how each market can affect the operation of an energy asset.

Dynamic Virtualization

Dynamic virtualization is an integrated solution for energy generation and storage involving energy assets, such as batteries and solar generators. This uses a version of examples with virtual partitioning of an energy storage asset. Dynamic virtualization can be used to co-optimize energy storage assets and solar generation across different energy markets or other uses. These markets or uses may include (1) electric energy provided over the grid to the energy market, and (2) the ancillary services market (which may include regulation, which is focused on regulation of power frequency and voltage on the grid) or (3) use of the storage device to maintain power quality at the owners' facilities.

Dynamic virtualization uses examples of systems with the virtual partitioning of the battery or other type of energy storage asset into virtual separate batteries, each virtual energy storage asset being allocated to separate markets or functions, such as participating in the energy market, and the ancillary services (regulation) market or use to maintain power quality at the premise. The virtual partition of the batteries is not physical, but is instead an allocation of energy storage asset capacity to various markets or uses. This virtual partition by allocation is dynamic in that it can be constantly changed in response to changing price points and performance requirements during the day.

There are rapid swings in load on the spot electric energy market. In order to maintain electrical balance on the grid and regulate consistent power and voltage on the grid over short periods of time, for example, over periods of four seconds, fifteen seconds, or one minute, the grid operator sends out signals to change generation to match the load changes. Batteries are particularly well suited to respond to these short response time signals.

With examples of the principles herein, energy storage assets such as batteries can be applied to swing between the markets for energy and ancillary services for regulation of the grid or for the maintenance of power quality at the energy storage asset owner's facility. In the past, batteries were not purchased and installed for the purpose of providing regulation services, because batteries tend to be too expensive for this purpose alone. Most regulation services now come from gas powered generators providing about 1-10 megawatts, and these energy assets take time to turn on and off. Industrial batteries, however, are instant on and off and usually provide power in the 1 megawatt range—and can respond to grid operator signals in milliseconds.

In the past, energy storage and energy storage asset facilities were usually purchased with the intent to provide backup power for the owners, in case the electric power grid goes down or temporarily provides inadequate power. However, once the battery or other type of energy storage assets are installed to satisfy backup capacity for the owner, they may also to some extent be active in the regulation market to regulate the power and voltage on the grid, and in the energy market, to sell power into the grid in response to real-time pricing changes (or to cut the user's demand on the grid). For example, energy storage assets may discharge to the grid during high LMP price hours.

Energy storage assets may include batteries, ice units, compressed air, or other technologies to store energy on site by users and generators of power. Batteries may be of any type, including lithium ion, lead acid, flow batteries, dry cell batteries, or otherwise.

Solar generators of power may include solar panels, solar cells, any other photovoltaic power generator, or any means for generating power from sunlight. This may also include generation of electricity from steam or similar use of liquid to gas phase generation from sunlight, to generate electricity.

The energy market involves generating power, distributing power into the grid, and drawing power out of the grid, each at a price. This is measured in terms of megawatt hours that are the amount of power delivered. Energy is delivered for sustained periods of time, such as for 15 minutes or more.

The capacity market is measured in terms of megawatts of capacity. In this market, a seller makes their facilities available to generate electricity when needed and holds them in reserve for that purpose, but may never actually distribute energy into the grid rather than just be on-call. This, in effect, pays the seller to be available and impacts the reliability of the grid.

The ancillary market includes regulation of frequency and voltage in the grid, and the provision of an operating reserve. The regulation of the voltage in the grid involves discharging energy into the grid or absorbing energy from the grid in small increments, frequently, for short periods of time, and very rapidly.

Smart grid services increasingly rely on new technologies such as renewable energy and large-scale storage resources. Unfortunately, the life-cycle costs associated with such resources, when taken individually, are still high compared with more traditional forms of energy production. In addition, the desired proliferation of distributed and renewable resources on the power grid introduces new threats to its reliable operation, as they are subject to unpredictable drops in output, such as when the wind stops blowing. Consequently, both economic and reliability issues introduce substantial obstacles to a high penetration of those technologies in the power grid.

By themselves, storage resources such as electrical batteries are presently high cost options. Likewise, photovoltaic generation and wind turbines are comparatively quite expensive and their intermittency creates new strains on the power grid.

However, when optimally managed by various examples disclosed herein to provide timely support to the power grid, the net cost of electrical storage can be substantially reduced, as the result of payments by the grid operator (ISO/RTO) provides for facilities that can be called on to provide such support. Also, combining energy storage with intermittent generation makes technologies such as wind and solar more predictable on the grid, and hence, more valuable.

Examples, including dynamic virtualization, can dramatically improve the economics of renewable generation and storage technologies, by co-optimizing their operation to participate in the various energy and ancillary services (including regulation) markets and thus maximize their economic benefits.

Examples focus on the economics of batteries and energy storage and, by providing energy resource optimization and a gateway to the wholesale markets, can help facility managers deploy a comprehensive energy storage solution that can cost-effectively meet an organization's business objectives.

More broadly, when optimally coupling energy storage with renewable generation, various examples redefine the economics of such resources, while providing firm, dispatchable virtual generation that supports the reliability objectives of the power grid. Thus, by integrating distributed resources into virtual generation via system operator dispatch, examples can help enable the acceleration of renewable energy generation technologies such as solar and wind.

Systems Including Energy Storage Assets

Large-scale storage is widely seen as a necessary piece of the smart grid and a key component of America's electricity future. This recognition is driven by the following factors: (1) the growing adoption of intermittent renewable power sources; (2) state and nationwide budget shortfalls, leading local governments to seek cost-effective solutions for maintaining America's aging infrastructure; and (3) the widespread belief that electric vehicles ("EVs") will materially grow their market share over the next 5 to 15 years.

In this context, stakeholders have been looking for ways to accelerate the development and implementation of grid-level storage. Effective battery and other energy storage asset solutions can take unpredictable energy resources and turn them into reliable power, while matching electricity supply to demand; they play a crucial role in fostering microgrids and distributed generation, viable alternatives to expanding the U.S.'s power infrastructure; and they can address the new and unique concerns created by EVs, such as helping to maintain grid stability and giving utilities and grids more control over energy dispatch.

A key concern with batteries has long been their high upfront cost and long payback periods. Various examples address this by providing battery-owners a robust gateway to the wholesale electricity markets, thus unlocking new streams of revenues that increase their return on investment. This may also apply to other types of energy storage assets.

Various examples provide processor-executable instructions (including software solutions) that optimizes participation in wholesale markets by providing energy storage asset owners with dynamic virtualization, a service that continuously re-partitions the energy storage asset for different markets and uses, chiefly real-time energy, and regulation, and power quality control, in an optimized manner, based on pricing and weather data, retail electricity rates, and characteristics of the energy storage asset and its host site.

For large retailers and supermarkets, backup generation is a necessary but often expensive proposition. The nation's largest big box chains have taken a variety of approaches to minimizing the costs of providing substitute power in the case of an emergency or brownout; but for many stores, their only choice to date has been inefficient and costly diesel generators.

Examples with dynamic virtualization optimally manage an energy storage asset's state of charge based on the revenue producing opportunities in the wholesale market, as well as the organization's business objectives, such as providing backup power to critical loads for a given period of time. Thus, when paired with these examples, the energy storage asset becomes an energy resource that will concurrently: (1) participate in the energy markets by providing a way to shift the net load of a facility from high- to low-price periods; (2) participate in the frequency regulation market by responding to real-time signals from the grid operator; (3) participate in other wholesale markets, such as energy and synchronized reserve; and (4) provide reactive/voltage support to the microgrid/distribution grid.

Examples enable the energy storage asset to maximize revenues from the various wholesale markets, while maintaining its ability to achieve its main objective of providing a reliability service to the organization. To achieve this, examples herein describe virtualization of the energy storage asset and creating dynamic "energy storage asset partitions," in a manner similar to the way computing resources are virtualized. Through its optimization capability, an example determines in hourly increments which portion of the controller output (including its capacity), and hence the energy storage asset capacity (including its SOC), can be allocated to the energy and regulation markets respectively, while maintaining sufficient reserve to meet the forecasted backup requirements. The optimal control (to perform the optimization described herein) can take into account the forecasted and real-time hourly prices for each of the markets, along with the time and weather dependent backup requirements of the facility. When combined with other resources such as renewable generation, backup generation or demand response, the examples described herein can extract the maximum value of all such resources while meeting the organization's reliability, comfort, and sustainability objectives.

Following is a description of the different markets, including energy markets and regulation markets, to illustrate how each market can affect the operation of an energy storage asset.

Regulation Market

In a non-limiting example, capacity of the energy storage asset may be committed to the regulation market to maintain the frequency and/or voltage on the power line. For example, system operators seek to maintain the system frequency at very near to a nominal frequency of around 60 Hz in the U.S. or around 50 Hz in some other countries (including countries in the European Union). If the frequency is too high, there is too much power being generated in relation to load. A system operator would send a signal to participants in the regulation market to increase their load, or ask for generation to be reduced, to keep the system in balance. If the frequency is too low, then there is too much load in the system, and the system operator would send a signal asking for generation to be increased or the load reduced. A grid operator may use a real-time communication signal to call for either a positive correction (referred to in the industry as "regulation up") or negative correction (referred to as "regulation down"). If load exceeds generation, the frequency and voltage tend to drop. The ISO/RTO system operator would relay a signal requesting regulation up. If, however, generation exceeds load, the frequency tends to increase. The ISO/RTO system operator would relay a signal requesting regulation down (including asking for reduced generation).

The regulation market may seek commitment of a system on an hourly basis. However, the ISO/RTO system operator may relay regulation signals for regulation up and/or regulation down at much shorter timescales. For example, during the commitment period, the adjustments of regulation may take place minute-by-minute, on the order of a minute or a few minutes, or on the order of a few seconds (e.g., at 2-second or 4-second intervals). Traditional regulation applies to slower responding energy storage assets (e.g., assets with about 5 minutes response time), such as but not limited to chillers. Faster responding energy storage assets, such as but not limited to batteries, can respond within about 2 seconds. In an example, the objective cost function may include a term to performance incentives offered for fast responding energy storage assets. To participate in the regulation market, a resource may receive and may need to respond to a regulation signal generated by the grid operator approximately every 2 seconds. (In some territories, this rule may be relaxed somewhat for batteries.) The energy storage asset responds to this signal with a percentage of its maximum resource capability that is bid into the regulation market. Examples receive and respond to this signal and distribute it among the various resources participating in the regulation market within a given price zone, based on the results produced by an optimizer If the ISO/RTO system operator sizes the regulation signals to adequately balance the signal in the long run, the charge of the energy storage asset may merely fluctuate around its initial state of charge when it started to provide regulation. That is, the proportion of the available state of charge of the energy storage asset that is committed for use to provide regulation may be delivered at variable charge rates or discharge rates. Adequately balanced regulation signals should neither completely deplete nor fill the energy storage asset.

In a non-limiting example, the regulation price may be set at average values of around $30-$45/MW per hour, with hourly rates fluctuating around this average value. Some regulation markets may pay simply for the commitment of an available capacity of the energy storage asset during a time period, such as for an hour, with a separate payment for the total amount of energy ultimately provided. Thus, payment at the regulation price may be made for the period of commitment, even if the system is not called upon to provide regulation during the commitment period.

There may also be additional payment from the energy market for energy generated, based on the wholesale electricity market price (the LMP).

Operating characteristics of the energy storage asset include power (or its instantaneous delivery capability in kW) and the energy stored in the energy storage asset (or the amount of power it can generate over one hour, or kWh). In a non-limiting example, a battery rated at 1.5 MW power and 1.0 MWh energy storage capacity will be able to provide 1.5 MW power for a total period of 40 minutes (60×1/1.5). Thus, if the owner bids 1.5 MW into the regulation market for a given hour, a 50% discharge signal over 2 seconds could decrease the battery's charge level by 0.8 kWh (1.5 MW×1/1800 hrs).

As part of a certification for participating in the regulation market, the ISO/RTO system operator may verify that the energy storage asset is capable of responding to the regulation bid into the market. The ISO/RTO system operator may require that the energy storage asset be able to be charged/discharged at its full enrolled amount, when receiving a +/−100% regulation signal within a duration of 10 minutes. In the 1.5 MW example above, the battery charge would be increased/decreased by +/−250 kWh (1.5 MW×1/6 hr).

For example, assuming that the energy storage asset starts with an initial state of charge of 50% at time t=0. Ideally, the regulation signal is "net zero," meaning that the quantity of charged/discharged energy averages to zero over a given 24-hour period. In reality, the state of charge of the energy storage asset may at times drift to the limits of the energy storage asset's recommended state of charge. If the state of charge exceeds some adjustable maximum or minimum values, various examples include compensating by exiting the regulation market for the next hour and bringing the energy storage asset back to its initial set-point.

In an example, the operating schedule that is generated according to an implementation of an apparatus herein specifies intervals of time when the energy storage asset may be committed to the regulation market. During these time periods, the operating schedule may additionally indicate the points during these intervals of time where energy may be bought to charge the energy storage asset if its state of charge falls below a desirable limit, or where excess energy may be sold if the state of charge is too high. This discharge can contribute to a short-term demand response action in the real-time energy market.

Energy Market

To participate in the energy market, the energy storage asset should to be able to provide the "as bid" energy into the real-time market for the next hour. Various examples compute the optimal charge or discharge signal in anticipation of or in response to the economic signals, while maintaining minimum and maximum constraints on the state of charge of the energy storage asset. When combined with other controllable resources, such as renewable generation or advanced lighting and HVAC systems, examples extract the maximum economic value of each resource, given external factors and constraints. For example, examples can use an energy storage asset to compensate for the intermittency of renewable generation, and can include demand response actions to help maintain the balance.

Figure 11:
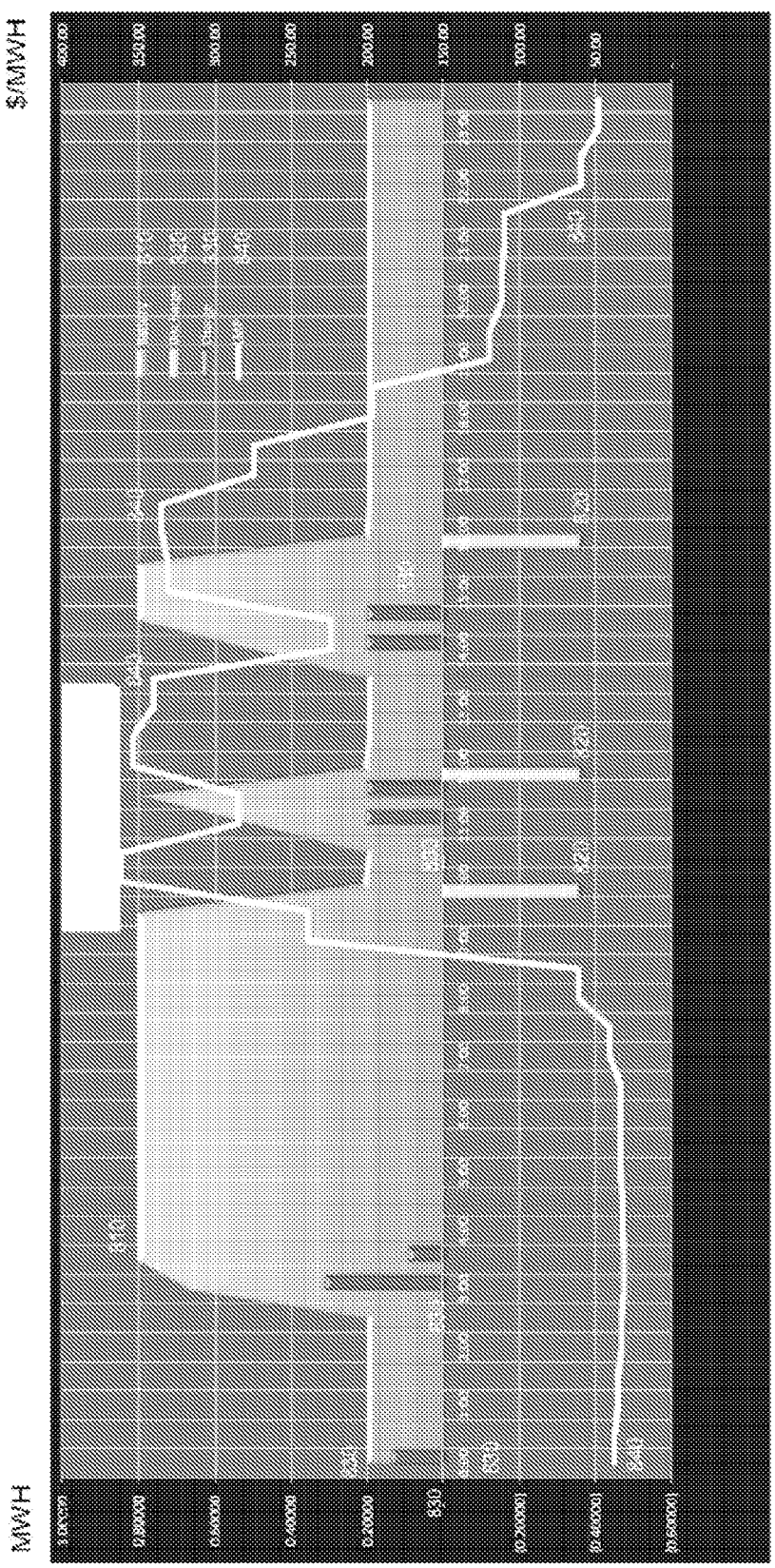
FIG. 11 shows an example energy storage asset optimization according to a principle described herein.

FIG. 11 shows an example energy storage asset optimization in response to economic signals and performance needs. The horizontal axis is time over a 24 hour cycle. The left vertical axis is megawatt hours. The right vertical axis shows price in dollars per megawatt hours. The volume under the line battery 810 shows the stored capacity in the battery. The three lines below the horizontal axis shows the discharge 820 from the battery. The seven vertical lines 830 above the horizontal axis shows charging to the battery 830. The line 840 shows the LMP energy price throughout the 24-hour cycle to which indicated energy assets are responding. In this example, examples determine the optimized hourly charge and discharge schedule of a 1.5 MW/1.0 MWh battery in response to an LMP price signal. The optimization is further constrained to maintain a 200 kWh minimum capacity for backup purposes, and a maximum capacity of 800 kWh to maintain charge/discharge cycle efficiency.

Spinning Reserve Market

To participate in the spinning reserve market, the energy storage asset should to be able to commit resources to provide power during unplanned outages of base load generators. Spinning reserve is generation capability that can provide power to the grid immediately when called upon by the ISO/RTO and reach full capacity within 10 minutes. The energy storage asset needs to be electrically synchronized with the grid, e.g., through the controller, to participate in this market. Revenue in the spinning reserve market is for capacity rather than energy. It requires quick response but makes low total energy demand. Requests in the spinning reserve market may be made around 20-50 times per year.

Revenue for the spinning reserve market may be determined based on the ability of an energy storage asset to provide power during an unplanned event, such as a generator failure. Revenue may also be derived based on the amount of energy (MWh) that is generated during active participation in the spinning reserve market, such as based on the electricity wholesale price.

Market Based on Voltage/VAR Ancillary Service

To participate in a market based on a voltage/VAR ancillary service, certain resources of the energy asset may be committed to provide for voltage control and/or VAR control.

The voltage/VAR ancillary service seeks to maintain reliability and power quality. It may appear at the microgrid level or feeder level of a distribution system.

A voltage control ancillary service assists in maintaining system voltages within an acceptable range (120 volts±about 5% or 220 volts±about 5%) to customers served by a feeder. For example, if the supply line voltage fluctuates by some amount, resources of the energy asset may be committed to adjust the distribution primary voltage so that the distribution primary voltage also does not drift out of the acceptable range. In another example, if the current (ampere) flowing on the feeder increases during peak load conditions, the voltage along the feeder may decrease due to an increase in current flow, resulting in decreased voltage for customers that are further from the substation end of the feeder. Here, resources of the energy asset may be committed to raise the line voltage under peak load conditions to account for any increased voltage drop. If instead the feeder is lightly loaded, the voltage drop may be lower, and resources of the transport vehicle may be committed to lower the voltage to avoid possible high voltage conditions.

VAR refers to the reactive power (measured in volt-ampere reactive (VARs)). VAR is the electrical energy that energizes capacitive components and inductive components in a power system. A non-limiting example of a capacitive component is overhead conductors, which are continuously charged and discharged by an alternating current (AC) waveform. Non-limiting examples of inductive components are electric motors and transformers, which can store energy in magnetic fields that are used for device operation. By reducing the amount of VARs flowing on the distribution feeder, an electricity supplier can reduce electrical losses and improve the voltage profile along the feeder. Where reactive power varies throughout the day, the capacitive components of a energy asset that are equipped with switches can be placed in or out of service as needs vary during the day. These capacitive components of the energy asset may be equipped with controllers. A system, apparatus, or method may be used to determine when to switch the switches on or off. For example, when the voltage at the location of the capacitive component is low, the operating schedule determined according to a principle herein may include instructions for the controller to close the switch to place the capacitive component in service. When the voltage is high, the operating schedule may include instructions for the controller to open the switch to remove the capacitive component from service.

Revenue from a market based on the voltage/VAR ancillary service may be determined based on the ability of an energy storage asset of the energy asset(s) to be used to provide the voltage controls and/or the VAR controls. In an example, the voltage/VAR control may apply in a microgrid application at the microgrid bus level, which may introduce a reliability cost to the computation of the net-energy-related cost.

Co-optimization Across Multiple Markets and/or Ancillary Services

As described above, the economic signal can be a driver for the average charge status of the energy storage asset. It responds to price signals that are averaged on an hourly basis. The regulation signal can be seen as having a "bias" effect over the average charge, in response to the regulation commands. Examples co-optimize the energy storage asset charge by first economically optimizing the charge status of the energy storage asset, then allocating the balance of the available power to the regulation market, on an hourly basis.

By adding user-adjustable upper and lower constraints to the optimized energy storage asset charge, examples take into account reliability objectives (e.g. backup) and charge/discharge cycle efficiency. Other constraints can be added, based on the type of energy storage asset technology used, to maximize charge/discharge round trip efficiency, and optimize energy storage asset life versus energy storage asset replacement costs.

In addition to co-optimizing a storage resource at a given location, examples have the capability to perform a global optimization across multiple customers within the same price zone, and disaggregate the regulation and economic signals among the various customers. In particular, this gives customers that do not have the minimum energy storage asset capacity required the ability to participate in the regulation market.

Co-Optimization with Other Distributed Resources

With various examples, distributed resources can earn maximum economic benefit through co-optimization. Co-optimization of various resources on one site results in accelerated payback for all assets, and this, in turn, accelerates the market-wide penetration of these resources.

Figure 12:
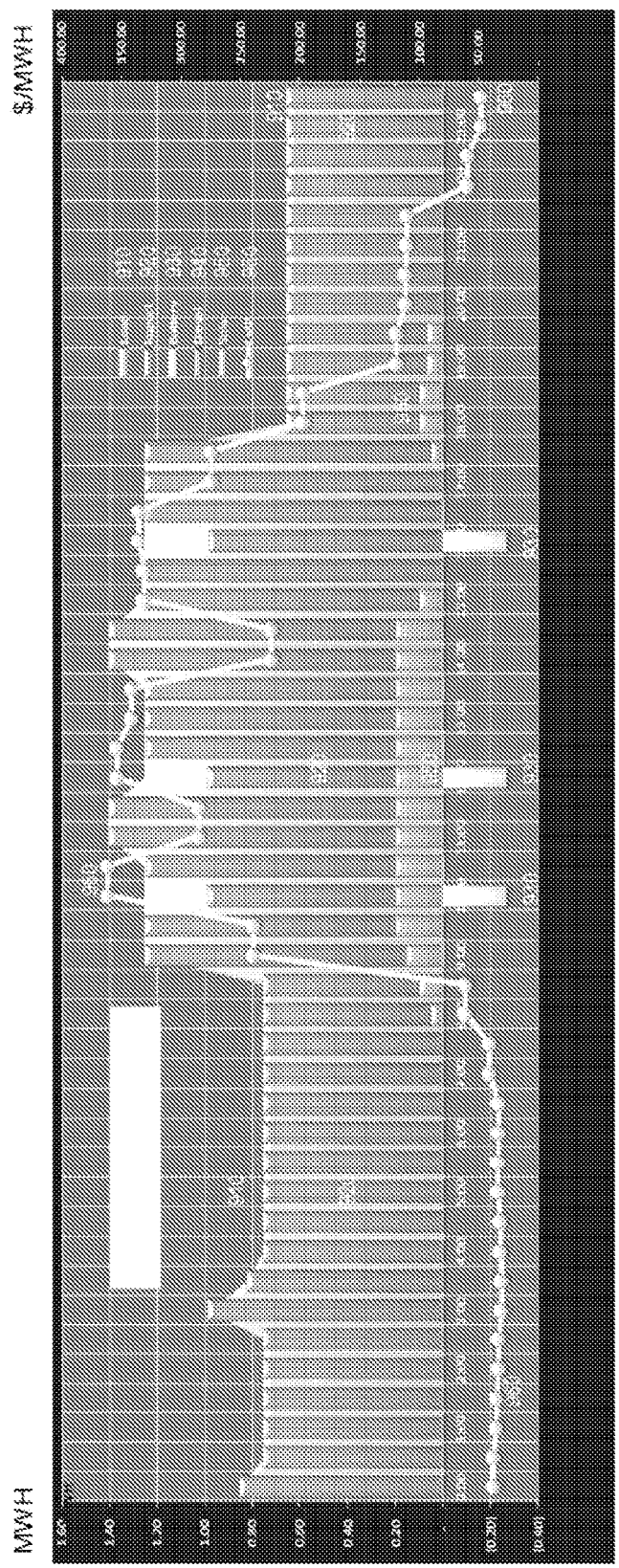
FIG. 12 shows an example generation schedule for an energy storage asset-energy generating asset co-optimization according to a principle described herein

FIG. 12 shows an example generation schedule for battery-photovoltaic co-optimization. FIG. 12 shows an example where the same battery used in the previous example in FIG. 11 is combined with 0.5 MW of PV (solar-photovoltaic) generation. The horizontal axis shows the time in the 24-hour cycle. The left vertical axis shows megawatt hours. The right vertical axis shows price in dollars per megawatt hours. The load 910 is the electric load on the facilities. The import of power 920 shows the power imported into the facilities from the grid. The battery 930 shows the three bars below the horizontal axis for the power discharge from the batteries at specific times. The diesel 940 is not shown because diesel generation is not used in this co-optimization because of its relative price. The solar 950 shows the power used by the system and/or stored in the batteries from the solar generator or photovoltaic generator at various times. The LMP line 960 shows the fluctuating price for electricity during the 24-hour cycle.

Example Energy Storage Assets

Various examples are technology agnostic and can optimize any storage installation. However, certain forms of storage, such as compressed air and ice storage, are currently not recognized as applicable resources for some regulation markets.

Aided by significant private investment, grid-scale batteries have significantly reduced in cost over the past decade. Different technologies appear to have converged around a similar price: with batteries offered at roughly $1-2 per Watt, and $1-2 per Watt-hour, before Balance of Plant ("BoP")

costs. (Watts [W, kW, MW] are a measure of power, i.e., the charge and discharge rate of an energy storage asset. Watt-hours [Wh, kWh, MWh] are a measure of energy, i.e., the storage capacity of an energy storage asset.) At these prices, energy storage asset owners and lessees can use examples to achieve a positive return over the installed life while meeting their sites' backup needs.

Below is a brief overview of each different types of energy storage assets:

Lithium-Ion Battery

This "power battery" is well-suited for regulation with high efficiency and hybrid opportunities. However, it has a high cost and little data exists to corroborate lifespan claims.

Quoted prices include $2 million for a 1 MW/1 MWh unit, and $1.5 million for a 1 MW/250 kWh unit.

Lithium-Ion (Li-Ion) batteries are receiving great attention because they are the preferred battery for electric vehicles. Presently, Li-Ion batteries are among the most expensive of the storage options available. This may change, as many companies are pouring resources into new Li-Ion variants; however, some suggest that the chemical characteristics of Li-Ion cells make it difficult to significantly reduce their cost. Additionally, Li-Ion is a new technology so that no company has empirically demonstrated Li-Ion's lifespan. Companies have tried to allay these concerns through "accelerated testing" that charge/discharge the battery more rapidly, but this does not provide full insight into how well Li-Ion batteries perform over time.

Li-Ion batteries are very dense and therefore very small compared to other technologies. One manufacturer's 1 MW/1 MWh unit, for example, has dimensions of 8'×20'. In comparison, a quoted lead-acid unit with similar specs has dimensions of 40'×70'.

Hybrid opportunities for Li-Ion batteries are discussed in the flow battery section.

Lead-Acid Battery

This battery is the lowest-cost option with long lifespan and proven technology. However, it is physically large with high maintenance and limited depth of discharge.

Quoted prices include $896,000 for a 1 MW/2 MWh unit, and $512,000 for a 1 MW/500 kWh unit.

Lead-Acid batteries, which have the same chemistry as a car battery, are proven for long-lasting grid applications. One manufacturer's 1 MW/1.4 MWh unit lasted for 12 years, from 1996-2008, as both a provider of voltage support and a backup power source, before the battery cells were replaced. The original power electronics of that installation still function, and the unit is running with a new set of lead-acid cells.

A downside of lead-acid batteries is that they are very heavy and very large. This is why they are not being considered as much for EVs, and this poses other logistical challenges for metropolitan installations. Lead-acid batteries are also considered to be high maintenance. They need to be kept within a narrow temperature range, and therefore require their own building (for industrial power uses), as well as periodic upkeep. Also, lead-acid batteries are typically oversized because exceeding the lower bounds of their state of charge can damage the cells. They are best for regulation or voltage support, and as backup if sized explicitly for that purpose.

Flow Batteries

These batteries can be fully charged and discharged without damage to the battery. Also, "hybridization" is possible. However, this "energy battery" limits regulation market opportunities and has low round-trip efficiency.

Quoted prices include $1.15 million for a 1 MW/1 MWh battery.

Flow batteries are energy batteries, i.e., they are best suited for backup electricity, but their chemistry limits their ability to provide high-MW regulation. The typically configured flow battery takes 4 hours to charge/discharge, and flow batteries have lower round-trip efficiencies than other types (roughly 75% in contrast to Li-Ion's 90%). With flow batteries, a tank is filled with electrolyte fluid that flows through solid cell stacks located at the top of the unit. The liquid solution never degrades, but the cells need to be replaced every 5 or 6 years. The cost of cell replacement is 10-15% of the total unit.

The electrochemical characteristics prohibit them from power-dense applications, unless they are oversized and paired with a large inverter, or "hybridized" with another battery technology. Hybridization can be provided by some suppliers in conjunction with a well-established power electronics provider. One manufacturer has created a system that allows its "energy" batteries to be paired with "power" batteries, like lithium-ion, connected through a single inverter. A leading lithium-ion battery manufacturer recently announced a plan to provide a similar Li-Ion/flow battery unit for grid-scale applications.

Dry Cell Technology

This power battery is good for the regulation market. However, it has very small recommended depth of charge/discharge and is expensive.

Quoted prices include $1.5 million for a 1.5 MW/1 MWh battery, plus 30% extra for BoP ("Balance of Plant").

These batteries provide high power-to-energy ratios that make them attractive for regulation, so long as they remain within a fairly narrow range of state of charge. These batteries are not meant to fully charge or discharge and pushing their recommended operating parameters affects their lifespan. Ideal state of charge is 20-80%. Because of these constraints, these batteries would need to be oversized to provide backup. These batteries are more expensive than cheaper options such as lead-acid.

Based on their characteristics, these batteries are likely suited for projects whose primary objective is not backup power, but rather systems support. They provide high-MW regulation, can address voltage sag concerns, and can be recharged by regenerative braking. However, when their state of charge limitations are taken into account, they appear to be a costly technology, even in comparison to lithium-ion.

Ice Units

The thermal storage capacity of an ice unit can be used according to the principles herein as an energy storage asset.

Ice units can be used to modify how a transport vehicle is cooled, including how energy is consumed for cooling/air conditioning. An ice unit generally consists of a thermally-insulated storage tank that attaches to a transport vehicle's air-conditioning system. The unit makes ice (generally at night when supply costs tend to be lower) and uses that ice during the day to deliver cooling directly to the transport vehicle's existing air conditioning system. Storage tanks can be on the order of hundreds of gallons of water (e.g., about 450 gallons) of water. The water is frozen by circulating refrigerant through copper coils within or surrounding the tank. The condensing unit then turns off, and the ice is stored until its cooling energy is needed. During the higher temperature daytime hours, the power consumption of air conditioning and demand levels on the grid, increase. The ice unit may be used to replaces the energy-demanding compressor of a transport vehicle's air conditioning unit. The melting ice of the ice unit, rather than the air conditioning unit, can be piped around the transport vehicle to cool it.

Compressed Air

The storage capacity of compressed air can be used according to the principles herein as an energy storage asset.

For example, compressed air energy storage (CAES) technology provides a way to store compressed air, using energy generated at lower cost at one time, and use that compressed air at another time when energy costs are higher. For example, energy generated during periods of low energy demand periods (such as during off-peak electricity usage as night) may be released at on-peak times to meet higher demand. The CAES system may be located where there is large, accessible air-storage pockets or caverns, such as but not limited to mines and underground formations. The air may be compressed using electrically powered turbo-compressors. The compressed air stored in these pockets may be later fed to, e.g., gas-fired turbine generators to generate electricity during on-peak, higher-priced time periods. In another example, the compressed air is expanded using turbo expanders or air engines that are driving electrical generators to generate electricity.

In another example, the thermal storage capacity of compressed air can be used according to the principles herein as an energy storage asset.

Using a heat exchanger, it is possible to extract waste heat from the lubricant coolers used in types of compressors, and use the waste heat to produce hot water. Depending on its design, a heat exchanger can produce non-potable or potable water. When hot water is not required, the lubricant can be routed to the standard components for lubricant cooling. The hot water can be used in central heating or boiler systems, or any other application where hot water is required. Heat exchangers also offer an opportunity to produce hot air and hot water, and allow the operator some flexibility to vary the hot air to hot water ratio.

Controller for an Energy Storage Asset

The controllers for the energy storage assets described herein can be used to vary the input to or output from the energy storage assets. When the controller functions as a converter, it converts the AC signal to a DC signal. That DC signal may be used to charge the energy storage asset. When the controller functions as an inverter, it converts one type of voltage (direct current (DC)) into another type of voltage (alternating current (AC)). Since the electricity supplier generally supplies 110 or 220 volts AC on the grid, the conversion may typically be from 12 volts DC to 110 or 220 volts AC. In another example, the output of the controller may be different, depending on the type of load on the system. Inverters called utility intertie or grid tie may connect to energy generating assets such as solar panels or wind generator, and can feed their output directly into the inverter. The inverter output can be tied to the grid power.

In a non-limiting example, the inverter takes the DC output from the energy storage asset and runs it into a number of power switching transistors. These transistors are switched on and off to feed opposite sides of a transformer, causing the transformer to think it is getting an AC signal. Depending on the quality and complexity of the inverter, it may put out a square wave, a "quasi-sine" (sometimes called modified sine) wave, or a true sine wave. The quality of the quasi-sine wave can vary among different inverters, and also may vary somewhat with the load.

The virtual partitioning of the energy storage asset described facilitates partitioning between energy and regulation participation. The partitioning can be based on the available capacity of the controller (i.e., the inverter/converter). The SOC of the energy storage asset may be used to provide a constraint within the optimization for determining the optimal charge/discharge strategy for participation in these two different markets. As a non-limiting example, an operating schedule generated according to the principles herein can indicate the optimal charge/discharge strategy for the controller, including on an hourly basis, in response to or anticipation of projected LMPs. The balance of the inverter capacity of the controller may be made available to the regulation market at its shorter timescales (e.g., at the 2-second or minute-by-minute time intervals described above). The proportion of the controller output (and hence the energy storage asset) committed to the energy market and the remaining proportion of the energy storage asset committed to the regulation market are co-optimized based on the economic benefit derived from the two markets, and subject to the SOC constraints. The operating schedules generated based on any of the principles described herein, and in any of the example, can suggest the proportion of the controller output committed to the energy market and to the regulation market in a given time interval t (less than time period T), and for what length of time. the proportion of the controller output committed to the energy market and to the regulation market in a given time interval t (less than time period T). For example, for a controller with a 1 MWatt inverter capacity, the principles herein can be used to generate an operating schedule that suggests the proportion of the controller's 1 MWatt inverter capacity that can be committed to the energy market and to the regulation market in a given time interval t to generate the energy-related revenue.

Energy Generating Assets

Examples of energy generating asset applicable to the apparatus and methods herein include photovoltaic cells, fuel cells, gas turbines, diesel generators, flywheels, electric vehicles and wind turbines.

Electric storage has the potential to address some of the attributes of renewable energy generation. The intermittent nature of energy generating assets, including solar generation, may present some difficulty for grid operators. For example, weather events can make energy output of energy generating assets, including photovoltaic cells or wind turbines, difficult to predict. As renewable generators make up a growing share of regional generation portfolios, grid operators may require greater real-time visibility of distributed generation and benefit from a resource's ability to control bi-directional power flow. Adding storage to distributed generation achieves new levels of responsiveness not seen with existing systems.

According to principles described herein, the operating schedule generated for a system that includes a controller, an energy storage asset and an energy generating asset can firm up intermittent renewable generation into dispatchable generation. The operating schedule can provide for renewable generation forecasting based on the forecasted weather conditions.

Dynamic virtualization can be beneficial to sites that utilize both energy storage assets and energy generating assets. For example, by integrating weather data, price forecasts, and expected site load, examples can accurately predict a solar array's output, determine how much solar generation should be captured by an energy storage asset, and dispatch the energy storage asset at the time of day that optimizes revenues derived from wholesale market participation.

By passing energy through an energy storage asset and exhibiting real-time control, power can be delivered strategically and act as a price-responsive resource in the various wholesale markets. In effect, storage allows the maturation of energy generating assets as a resource that provides discrete power-flow to the grid that is controllable, quantifiable, and dispatchable. Solar power and its generation can be costly. Through dynamic virtualization the value of renewable generation can be increased by improving the resource with electric storage.

Regenerative Braking Energy from Transportation Systems and Carriage Systems

An example implementation of a system, apparatus and method herein is described based on a carriage system, such as but not limited to an elevator system or other similar system based on a platform or compartment housed in a shaft for transporting people or things to different vertical levels or horizontal positions. For example, the carriage system can be used to raise and lower people or things to different floors or levels of a building, a subterranean system, or move the people or things through other types of multi-level or multi-stage system. In this example implementation, the regenerative braking energy is generated through the slowing down (braking) of a cable, pulley, or other similar device that facilitates the movement of the platform(s) or compartment(s) of the carriage system. At least one energy storage asset may be in electrical communication with the carriage system to capture the regenerative braking energy generated during at least one braking event during the movement of the platform(s) or compartment(s) of the carriage system.

An example implementation of a system, apparatus and method herein is described based on a substation of a transportation system, such as but not limited to an electric railway power traction system. At least one energy storage asset may be in electrical communication with at least one railroad car of a train of the transportation system, to capture the regenerative braking energy generated during at least one braking event during the movement of the train. A train (or train system) herein refers to at least one railroad car pulled or pushed by one or more locomotives or power cars. The train or train system can include a series or plurality of railroad cars, which may be connected. The transportation system may include a ground level train system, an elevated train system, a subterranean train system, or any combination of the three. For example a train running on a single line in a railway system may travel in all three types of modes. In an example, the transportation system includes a trolley line or a tramway system. The example system, apparatus and method herein can be implemented to provide energy savings to an energy customer based on the capture of regenerative braking energy from at least one electric train being serviced from a substation. An example system, apparatus and method described herein can facilitate participation in the wholesale energy market as a resource for demand response.

An example system, apparatus and method according to the principles herein can be implemented to provide energy savings by capturing the regenerative braking energy produced by the braking of the electric trains of a transportation system or a carriage system using at least one energy storage asset, and using the energy to participate in a wholesale energy market and/or a regulation market as a resource for demand response. The at least one energy storage asset can be, but is not limited to, at least one wayside energy storage asset.

According to the principles herein, the wayside energy storage assets are located at the substations of transportation systems, or at the power units for the carriage systems, according to the example implementation.

In another example implementation, an aggregation of electric vehicles and/or hybrid electric vehicles that are in communication with at least one energy generating asset can be committed to a regulation market and/or an energy market as energy storage assets to facilitate deriving energy-related revenue. For example, the parking lot of a train station can include multiple coupling units to which electric vehicles and/or hybrid electric vehicles can be coupled so that their on-board energy storage units can be charged while the electric vehicles and/or hybrid electric vehicles remains coupled to the coupling unit. The on-board energy storage units of the electric vehicles and/or hybrid electric vehicles can be, but is not limited to, batteries and/or fuel cells. Non-limiting examples of batteries include a lithium ion battery, a lead acid battery, a flow battery, or a dry cell battery. The lot can include energy generating assets, such as but not limited to photovoltaic cells, wind generators, or diesel generators, that are coupled to the multiple coupling units for charging the electric vehicles and/or hybrid electric vehicles. The coupling unit(s), and/or the electric vehicles or the hybrid electric vehicles, can include at least one controller that can be used to control the charging/discharging of the energy storage units. According to an example implementation, the charge capacity and charge/discharge rates of the multiple electric vehicles and/or hybrid electric vehicles in the lot can be aggregated to provide an aggregate energy generating capacity and an aggregate charge/discharge capacity that may be committed to the regulation market and/or the energy market. The cumulative charge from the energy generating assets can be stored to the electric vehicles and/or hybrid electric vehicles and hence contribute to the aggregate energy generating capacity of the electric vehicles and/or hybrid electric vehicles. For example, an apparatus herein can be used to generate an operating schedule for the controller(s) of the coupling unit(s) and/or the electric vehicles or the hybrid electric vehicles such that energy-related revenue may be derived based on the participation of the aggregate energy generating capacity and the aggregate charge/discharge capacity of the electric vehicles and/or hybrid electric vehicles. In this example implementation, the operating schedule for the controller of the aggregation of electric vehicles and/or hybrid electric vehicles as energy storage asset can be determined (e.g., using an optimizer module) based at least in part on an operation characteristic of the aggregation of electric vehicles and/or hybrid electric vehicles, an energy-generating capacity of at least one energy generating asset in communication with the at least one energy storage asset, and a regulation price and/or a forecast wholesale electricity price associated with the respective market.

As with other systems and apparatus described herein, the net energy-related cost for this example implementation can be computed according to any of the methods described herein. As a non-limiting example, the net energy-related cost can be specified as a difference between an electricity supply cost and an economic demand response revenue over a time period (T). A mathematical model that can be used to facilitates a determination of the operating schedule for the controller of the at least one energy storage asset can also take as input a replacement cost for the at least one energy storage asset, a convenience cost, and/or any other applicable costs described herein. For example, the net energy-related cost can include a term that relates to the replacement cost, convenience cost, and/or any other applicable costs described herein.

In another example implementation, the wayside energy storage asset(s) can be coupled with the aggregation of electric vehicles and/or hybrid electric vehicles, and the combined capacity can be committed to the regulation market and/or the energy market as energy storage assets to facilitate deriving the energy-related revenue. As described herein, the wayside energy storage asset is charged using excess regenerative braking energy from the braking motion of the trains of the transportation system according to the principles herein. The operating schedule can be generated to operate the controller of the coupling unit(s) and/or the electric vehicles or the hybrid electric vehicles, as well as the controller of the wayside energy storage unit, according to operation schedules that could facilitate deriving energy-related revenue. According to an example implementation, the charge capacity of the multiple electric vehicles and/or hybrid electric vehicles in the lot can be aggregated with the capacity of the wayside energy storage asset to provide an aggregate energy generating capacity and an aggregate charge/discharge capacity that may be committed to the regulation market and/or the energy market. For example, an example apparatus herein can be used to generate an operating schedule for the controller(s) of the coupling unit(s) and/or the electric vehicles or the hybrid electric vehicles such that energy-related revenue may be derived based on the participation of the aggregate energy generating capacity and the aggregate charge/discharge capacity of the electric vehicles and/or hybrid electric vehicles.

An example system, apparatus and method implemented according to the principles herein can provide an energy customer with significant cost savings and environmental benefits by using less electricity and receiving revenues from an operator in the wholesale electricity market. The example system, apparatus and method also can be implemented to expand the range of use of an energy customer's existing regenerative braking and energy capture system by storing the energy in energy storage assets, where it can be used for additional purposes. The example system, apparatus and method also can be implemented to optimize the power and voltage quality of an energy customer's system, e.g., by providing carefully controlled and timed injections of power into a substation or other system that interfaces with an electricity transmission system. In an example, the captured electrical energy from the regenerative braking can be used in place of purchased energy for certain applications (e.g., purchased energy from an electrical power transmission, a power grid, or a microgrid). Such use can provide environmental benefits.

In an example implementation, the captured regenerative braking energy, whether from a carriage system or a transportation system, can be used to provide an operator in a regulation market with demand response or energy and regulation/ancillary resources, by optimizing the carriage system's or the transportation system's use of the captured energy and by using less electricity during higher cost hours (e.g., peak usage hours). The regenerative braking energy that is captured in the energy storage asset can be committed to an energy market and/or a regulation market based on an operating schedule that is generated according to a system, apparatus or method described herein.

An operating schedule, or any other output of an implementation of a system, apparatus and method herein, can be used by an operator in an energy market and/or an operator in a regulation market to determine an earnings compensation (a revenue) for the energy customer.

In an example implementation, any excess stored energy in the energy storage asset(s) can be committed for balancing electric generation and electric load on a regulation interconnection system, which can assist an energy customer to stabilize its electric distribution system. An example system or apparatus herein can be used to develop, analyze and disseminate additional data about the benefits of energy storage and optimization. An example system or apparatus herein also can be used o create a replicable and scalable model for energy savings and power optimization that can be deployed more broadly on a transportation system or a carriage system.

In an example implementation, a system, apparatus and method herein can be used to determine an operating schedule that includes time intervals for regenerative energy capture. The example system or apparatus captures any regenerative braking energy that is in excess on a traction power line of a transportation system or other similar power line of a carriage system. The example system or apparatus can be operated according to an operating schedule to automatically detect this excess energy by apply an algorithm (and associated method) that identifies the electric signature of the regenerative braking. The amount of energy capture may be proportional to the amount excess energy available for capture and/or the state of charge of the energy storage assets, such as but not limited to a battery bank. For example, the system can be prevented from capturing energy from any rectifiers. The example system or apparatus can no longer capture regenerative braking energy if the energy storage asset is already fully charged.

In an example implementation, a system, apparatus and method herein can be used to determine an operating schedule that includes time intervals for regenerative energy return. For example, if the voltage on a traction power line of a transportation system or other similar power line of a carriage system drops below a certain threshold value, e.g., when a train or elevator car starts, an example system or apparatus herein can be operated according to an operating schedule to provide energy from the energy storage assets to support the voltage and bring it back into its normal operating range. The transportation system or carriage system may be configured such that this functionality is automatically disabled when the voltage on the traction power line or other similar power line is very low, e.g., if any rectifiers are disconnected for maintenance, and/or for safety reasons (e.g., if there is an emergency power shutdown).

In an example implementation, a system, apparatus and method herein can be used to determine an operating schedule that includes time intervals for the energy storage asset(s) to be used for frequency regulation, based on an operating schedule that specifies a suggested charge and discharge of the at least one energy asset: The example system is able to respond to charge and discharge orders when required by a module that performs the optimization to provide the operating schedule. Both charge and discharge may be modeled as proportional to the value of the system operating point (such as a set point). Controlling signals from an operator in the frequency regulation market can be sent to the module that performs the optimization.

In an example implementation, a system, apparatus and method herein facilitates real-time computation of an energy-related revenue based on an operating schedule that specifies a suggested charge and discharge of the at least one energy asset: The system is able to respond to the commands during implementation of the operating schedule (of charge and discharge periods). Both charge and discharge may be modeled as proportional to the value of the system operating point (such as a set point).

An example system, apparatus and method herein can be used to determine an operating schedule that provides for energy flow control and optimization. An example system or apparatus integrates the proper algorithms (and associated method) applied by a module to optimize the efficiency of the energy flows between the energy storage asset(s) and a grid, transmission line or microgrid.

An example system, apparatus and method herein can be used for energy metering and data logging. The energy flows between the energy storage asset(s) and a grid, transmission line or microgrid, should be metered according to industry requirements. The data flows can be recorded in real-time on a memory (such as but not limited to a non-volatile memory) by a power control system. As an example, the data flows can be recorded on a memory with an accuracy of about 0.5 seconds. The example apparatus or system can be configured such that the data is viewable, retrievable and exportable in different formats, such as but not limited to either a comma-separated-value (CSV) file format or a spreadsheet file format. This can be accomplished through a secure user interface. In an example, the user interface to the power control system can be a web-based user interface that is accessible both locally and remotely. In an example, the user interface is a portal to a power control system based on a software-as-a-service model.

An example system, apparatus and method herein can include at least one communication interface and control. The example system or apparatus can include interfaces to integrate the control ports of the various pieces of equipment, including a supervisory control and data acquisition (SCADA) interface. SCADA is a non-limiting example of a type of industrial control system. The example system, apparatus and method can used a communication protocol that is a standard, industrial protocol. An example power control system according to the principles herein may have a local port (e.g., an Ethernet) and/or a remote access (e.g., IP) to monitor the example system or apparatus and adjust its parameters.

The example transportation system or carriage system can include protective measures such that the equipment is protected from the effects of transients from the traction power line of a transportation system or other similar power line of a carriage system.

Figure 13:
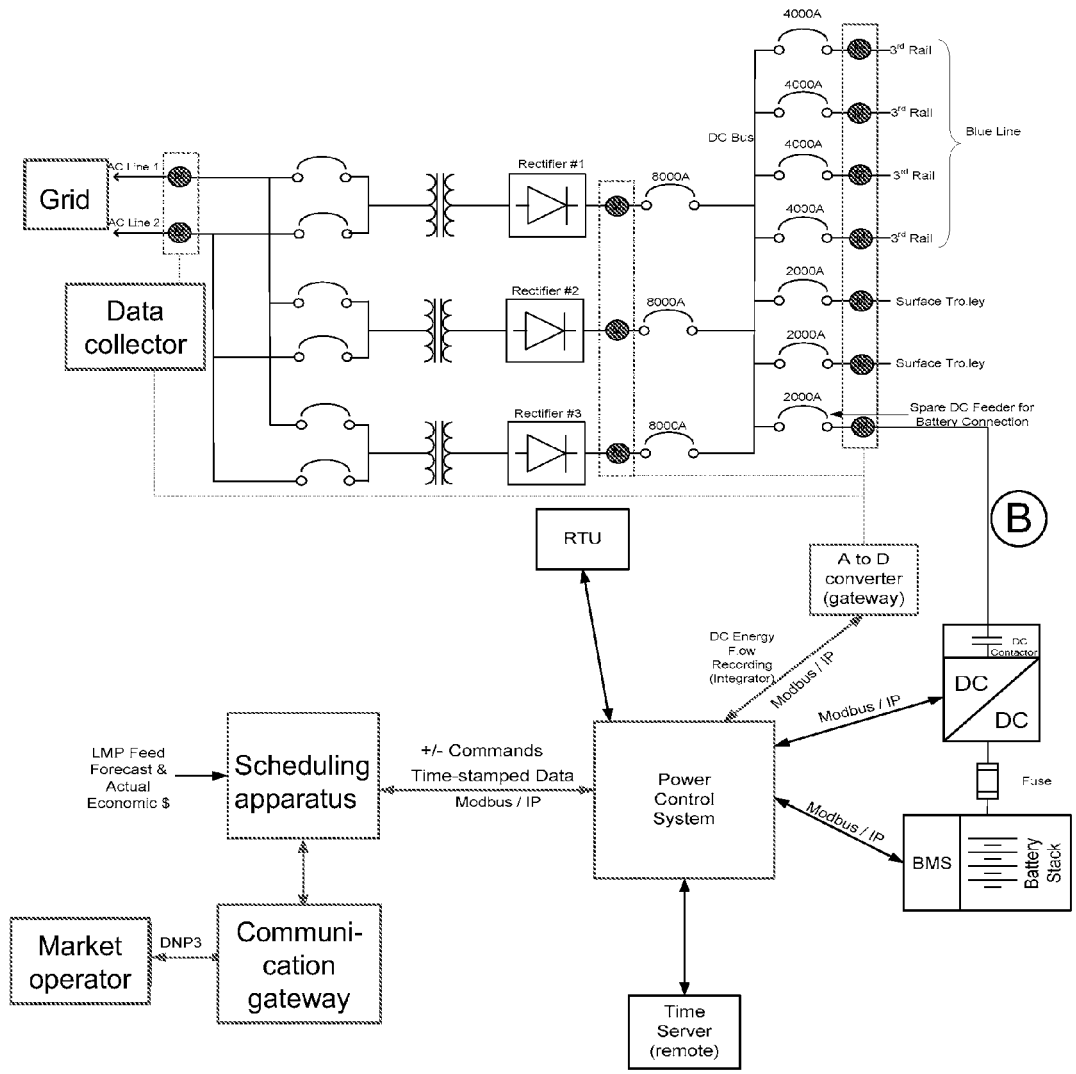
FIG. 13 shows an example apparatus and components of a transportation system, according to a principle described herein.

FIG. 13 shows a block diagram overview of a portion of an electric rail system including one or more energy storage assets (e.g., batteries), a power control system (PCS) for controlling the one or more energy storage assets, and a scheduling apparatus for determining operating schedules (e.g., charge/discharge schedules and/or rates of charging/discharging) for the one or more energy storage assets, according to an example. As shown in FIG. 13, the scheduling system can be configured to communicate with the PCS. The PCS can be configured to communicate with at least one of an analog-to-digital (A to D) converter, a RTU, a DC-to-DC converter, and an energy management system for the energy storage asset (in this example, a battery management system (BMS) for batteries). For example, the communication can be through a Modbus/IP (the Modbus RTU protocol with an IP networking standard that runs on the Ethernet. The RTU is an electronic device that is controlled by a microprocessor, and is used transmit data to SCADA systems. As also shown in FIG. 13, the scheduling apparatus can be configured to communicate with the market operator via a communication gateway (such as but not limited to ARCOM). FIG. 13 also shows the lines feeding from the electricity grid to the electrical lines of the transportation system. The battery stack shown in FIG. 13 can be part of a wayside energy storage asset system. The communication between the energy storage asset(s) (the battery stack) and the lines that feed to the rails is shown at "B". The transport vehicles (not shown) are in electrical communication with the $3^{rd}$ rail and/or the surface trolley. The regenerative energy from the braking motion of the transport vehicles can be used to charge the energy storage asset(s), e.g., via the communication pathway at "B". While the lines of the transportation system are shown at current values of 4000 A and 2000 A, the apparatus, systems and methods herein are not limited to such a transportation system.

Figure 14:
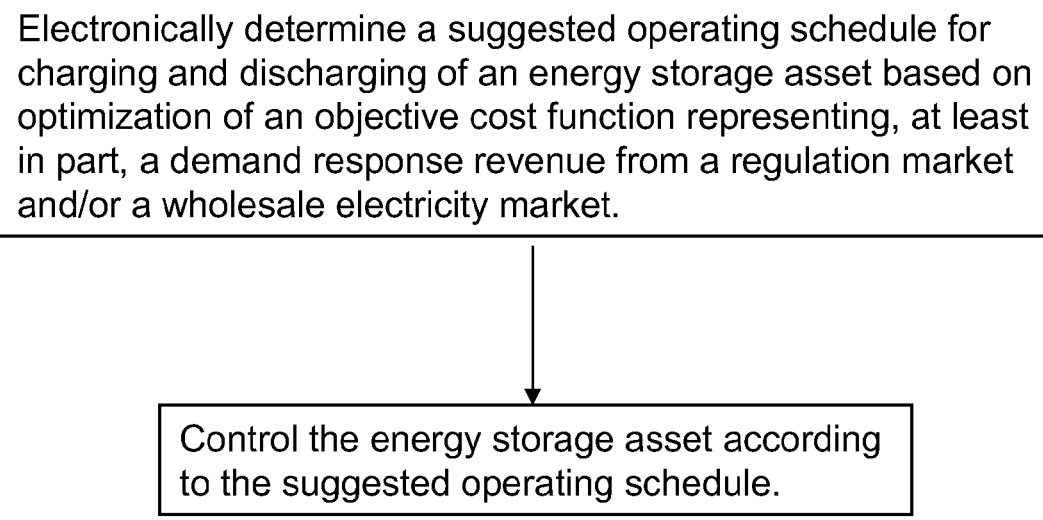
FIG. 14 shows an example method for generating energy-related revenue, according to a principle described herein.

FIG. 14 shows an example method for generating energy-related revenue in connection with operation of an electric rail system. The electric rail system includes at least one energy storage asset to store regenerative breaking energy arising from the operation of the electric rail system. The method includes electronically determining a suggested operating schedule for charging and discharging of an energy storage asset based on optimization of an objective cost function representing, at least in part, a demand response revenue from a regulation market and/or a wholesale electricity market, and controlling the energy storage asset according to the suggested operating schedule. The method of example 14 can be implemented using the system shown in FIG. 13.

Figure 15:
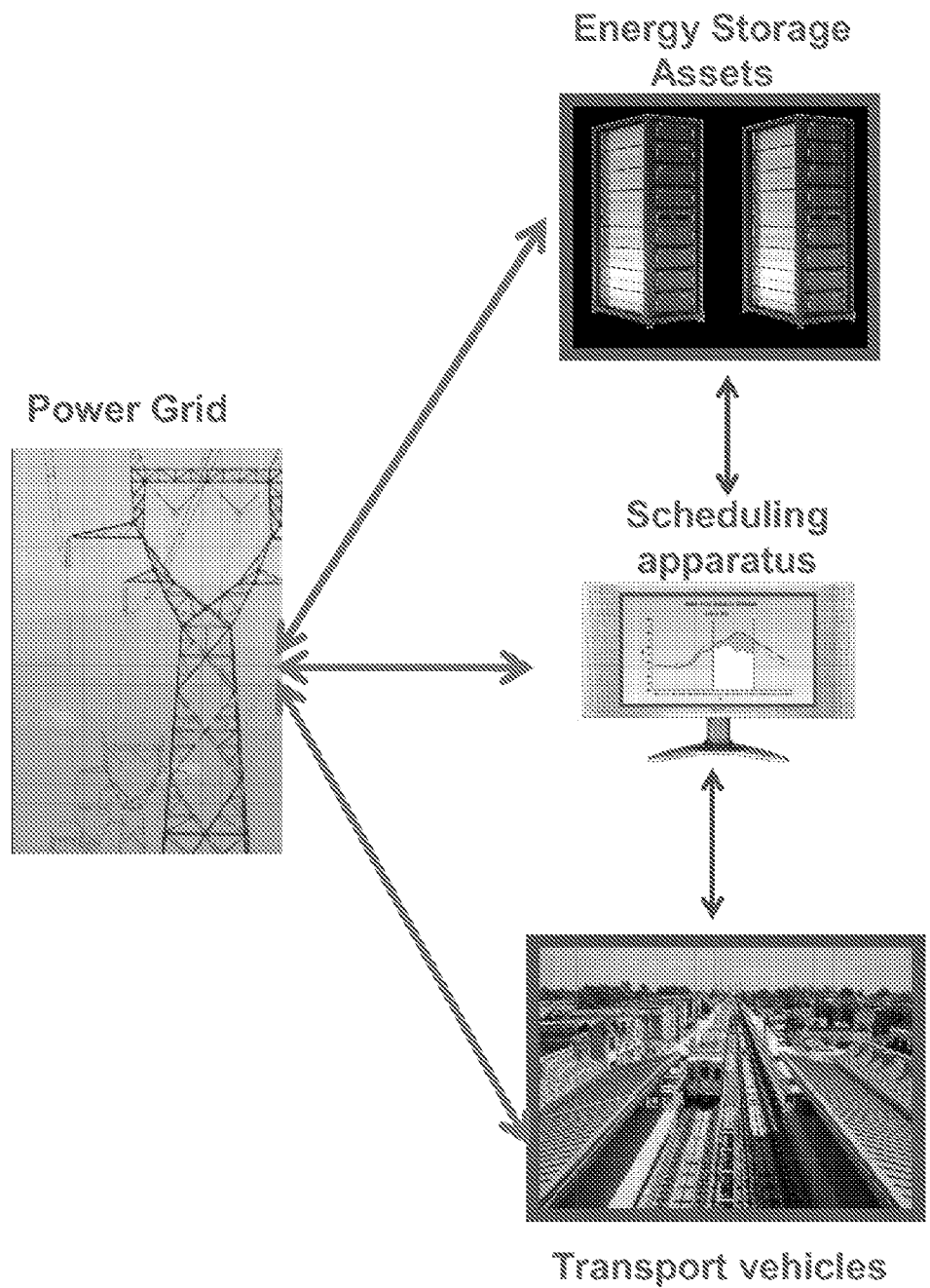
FIG. 15 shows example apparatus and components of an example implementation of a transportation system, according to a principle described herein.

FIG. 15 shows an example implementation that includes an example scheduling apparatus, energy storage asset(s), power grid and transport vehicles of an electric railway system. The arrows in FIG. 15 shows the various communication links between the components. It should be understood that the type of communication varies depending on the components involved. For example, the communication pathway between the power grid and the energy storage assets is an electrical pathway can be an electrical pathway, while the communication between the scheduling apparatus and the energy storage assets can be via a communication protocol, i.e., data or other information representing the operating schedule is transmitted to the controller of the energy storage asset(s). It should be understood also the communication between the components can be direct or indirect (i.e., through at least one intermediate component).

Transportation System

An example transportation system that can be used in a regulation market can be configured to be able to store or return energy during a minimum of 15 minutes at 500 kW. For the regenerative braking energy, each married pair of a train system can regenerate a current of about 2750 A or less during braking. This current is reduced because the voltage is limited to 800 VDC maximum ('clipping'). Some of this energy can be used for a train car's auxiliary components, including compressors, HVACs, lighting) and some is absorbed by the natural receptivity of the traction power line. The amount of energy to be captured by the energy storage asset(s) of the transportation system is estimated at about 3.6 kWh per coupled pair; i.e., 10.8 kWh per 6-car train. A DC-to-DC converter of the transportation system can be rated to 1.5 MW in continuous use. In order to maximize the capture of regenerative energy, the converter is able to operate at twice its nominal rating for a maximum of 30 seconds every 2 minutes during normal operating hours. Due to its power rating, the DC-to-DC Converter may limit the amount of energy to be captured during a regenerative braking event.

Figure 16:
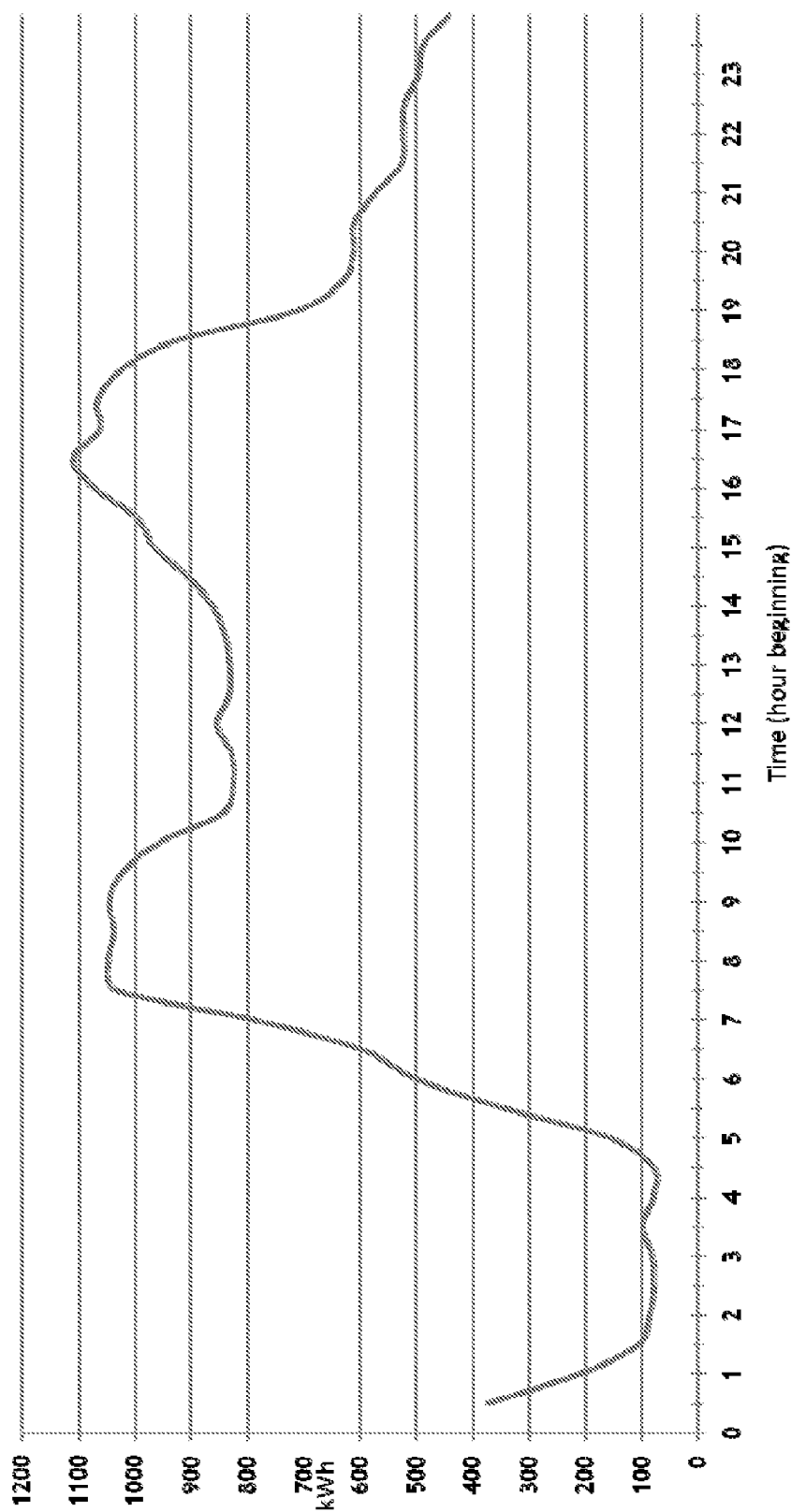
FIG. 16 shows a plot of an average weekday load versus time for a transportation system according to a principle described herein.

FIG. 16 shows an example of an average weekday load (in units of kWh) versus time for a transportation system. The values of load can be an input to the apparatus described herein for generating an operating schedule for a controller.

In an example, the operating schedule is optimized such that the load requirements of the transportation system are met at a given time t by power from a grid, power from the energy storage asset (which is being charged using the regenerative energy), or any combination of the two.

Energy Capture Computation:

The generation profile of the regenerative braking energy can be triangular-shape. The power rises with the start of the braking event, to a peak in value at approximately 1 second, then decrease linearly while the train slows down. The generated power ends abruptly when the mechanical brakes are applied, just before stopping. Therefore, the total energy can be estimated by this formula:

$$E = (P_{peak} \times \text{Duration})/2$$

where $P_{peak}$ is the peak power. The peak regenerative braking power for a coupled pair going at 49 mph is $$P_{peak} = (3900 \text{ A} \times 1390 \text{ V}) = 5.4 \text{ MW}.$$

The maximum voltage allowed by the infrastructure of is 800 V. Assuming the load is linear, the maximum power can be expressed as:

$$P_{peak} \text{ at } 800 \text{ v} = (2250 \text{ A} \times 800 \text{ V}) = 1.8 \text{ MW}.$$

Each train of the transportation system includes three (3) coupled pair of railway cars, so the total peak power during regeneration can be expressed as:

$$P_{peak\_train} = (3 \times 1.8 \text{ MW}) = 5.4 \text{ MW}.$$

The total regenerative energy at 49 mph (braking time 15 sec approx.) can be expressed as:

$$E = 5.4 \text{ MW} \times 15 \text{ s}/2 = 40.5 \text{ MJ or } 11.25 \text{ kWh}$$

Assuming that the auxiliaries of the railway car and the natural receptivity of the line capture immediately 40% of the regenerative energy, the remainder is:

$$E = 11.25 \times 60\% = 6.75 \text{ kWh}$$

A DC-to-DC Converter used in a transportation system can have a peak rating of about 2.25 MW. The maximum energy handled in 15 seconds can be expressed as 2.25 MW×15 s=22 MJ or 9.37 kWh. Due to the triangle-shaped energy wave, this result is divided by 2 (that is 4.7 kWh).

An assumption can be made that the train speed is about 50 mph, the maximum voltage is about 800 V, the braking time is about 15 seconds, and the natural line receptivity and auxiliary load of about 40%. The recoverable energy per braking event can be computed at about 4.7 kWh.

System Components

An example system according to the principles herein can include at least one energy storage asset. As a non-limiting example, the energy storage assets can include one or more batteries. For example, in a transportation system application, batteries that have an estimated nominal capacity of about 1 MWh may be used. The usable capacity of such a battery may be about 700 kWh (i.e., 70% of its nominal capacity) with a 1.5 MW permanent power rating (charge and discharge). As a non-limiting example, the energy storage assets can include one or more lithium-ion batteries having a capacity of about 400 kWh, with a power of about 1.1 MW continuous, a peak power of about 1.5 MW (for about 15 to about 30 seconds). In an example the lithium-ion batteries can be a lithium nickel cobalt aluminum oxide (NCA) battery or a lithium titanate battery. The energy storage assets can be designed to minimize maintenance. If an energy storage asset requires protection from its environment (including dust, temperature, humidity, etc.), specifications may be determined for the form of the protection equipment (including cabinets to enclose the energy storage asset, methods to cool the energy storage asset, sizing of the energy storage asset).

An example system according to the principles herein can include an energy asset management system (EMS). In an example where the energy storage asset(s) includes a battery, the EMS can be a Battery Management System (BMS). For example, a BMS can be used to manage the state of charge of the battery(ies), the status of the battery(ies), the signaling of an alarm, and provide an interface to a power control system (PCS). The EMS can be used to monitor the energy storage asset(s) and communicate in real-time its status to the power control system. The EMS also can be configured to integrate safety and alarm features to allow the other components of the system to perform any regular or emergency start-up and shut-down safely.

The example system can include a power control system (PCS). The PCS can include machine readable instructions to apply an optimization algorithm to the input parameters. The PCS can also include a user interface (such as a portal to a software-as-a-service platform), a SCADA interface, an interface to an EMS (such as but not limited to a BMS), an interface to an example apparatus or system herein that includes the optimizer module, an interface to a DC-to-DC converter. The user interface can be configured to provide local access and/or remote access to a user.

The example apparatus that includes the optimizer module can be configured to interface with the PCS, the SCADA system (to provide status, alarms, metering, etc.), the feeds of the LMP (forecast, actual feeds, or any combination thereof), and/or the system of the operator in the regulation market (through which signals can be sent for participation in a regulation market).

In an example where the energy storage asset is at least one battery, the system can include a DC-to-DC converter. The DC-to-DC converter is bi-directional and can present the same rating in either direction. As an example, a DC-to-DC converter can have a capacity of around 1.1 MW nominal and about 2.25 MW at peak power. As another example, a DC-to-DC converter can be rated 1.5 MW (permanent) in both directions. Such a DC-to-DC converter can operate between 500 VDC and 800 VDC on both the traction power side and the battery bank side. The battery bank may not be referenced to the ground, but the negative of the traction power may be grounded or nearly grounded (a few ohms) A DC-to-DC converter can be used to sustain transients from traction power equipment without damage. In an example, such a DC-to-DC converter can be operated to 3 MW at regular intervals, such as but not limited to for 30 seconds every 2 minutes, in order to maximize the regenerative braking energy recuperation. The DC-to-DC converter can be disposed in communication with the interface to the PCS and the energy storage asset(s).

An example PCS can be configured to integrate the various components in order to operate the system according to its specifications. The example PCS can be configured to communicate with the other components of the system. For example, the PCS can be configured to coordinate the operation of an example apparatus for generating the operating schedule, a DC-to-DC converter, and/or an EMS. In an example, the PCS also can be configured to control the DC-to-DC converter in real-time to perform various functions, including the operation of the energy storage asset to perform the operating schedule generated according to a method herein. Non-limiting examples of such functions include charging the energy storage asset(s) using the regenerative charge generated from a braking motion of the transport vehicle or the carriage compartment or performing the economic charge or discharge of the energy storage asset, including according to a co-optimization or to a dynamic partitioning of the energy storage asset. The PCS can be used to monitor and log into a memory the energy mitigated through the DC-to-DC converter. The log file can be formatted in CSV or XLS format. The operational parameters can be made accessible and programmable through the user interface. For example, a log file of the energy mitigated through the converter can be made retrievable through the user interface.

An example apparatus or system herein can include a module that monitors a traction power substation, including providing metering, indications of status, and alarms.

An example apparatus or system herein can include an ARCOM interface. The ARCOM interface is an industrial communications gateway that can be used with the energy storage asset(s) to receive a signal from an operator in a regulation market and provide signals to control the charging and discharging of the energy storage asset(s).

An example apparatus or system herein can include traction power components installed at a substation of a transportation system. Non-limiting examples of the traction power components include rectifier transformers, rectifiers, switchgear, protection relays, and the SCADA interface of a traction power substation (TPSS).

Transportation System Substation

Any example system, method, or apparatus according to the principles herein can be integrated with the infrastructure of a transportation system. An operating schedule generated according to the principles of any of the example system, method, or apparatus herein can be implemented using the transportation system's infrastructure.

Control and Optimization

An example apparatus or system according to the principles herein can include a module for generating an optimized operating schedule for the controller of the energy storage asset(s). For example, the optimization can be performed to maximize the total savings for the energy customer. These savings can include supply savings, and maximizing revenue from the regulation energy (economic) markets and/or the regulation market. The example apparatus and system can be used to perform the optimization based on the LMP forecast and actual feeds. In another example, the apparatus and system can be used to perform the optimization based on the LMP forecast and on other parameter, such as but not limited to a weather forecast and/or metering inputs from the substation.

Once a schedule is generated, an example apparatus or system described herein can be implemented to transmit the operating schedule to the PCS as one or more command signals. For example, an apparatus or system described herein can be implemented to transmit command signals to the PCS as a series of bias signals. In an example, the signals can be in the form of a command to charge or discharge the energy storage asset(s) over a period of time to participate in the energy market. For example, the command can signal the PCs to charge or discharge the energy storage asset over the period of about an hour. In another example, the signals can be in the form of a signal to raise or lower the charge/discharge rate to participate in the regulation market. These command signals can be sent over regular intervals of time such as twice or three times a day, each hour, about every 5 minutes, or every few seconds. For example, the regulation market operator may send commands to request changes in the charge/discharge rate at 2-second time intervals.

In an example, an apparatus or system herein can have a communication link or interface with a feed that provides the forecast LMP prices and/or the actual LMP prices. In another example, an apparatus or system herein can have a communication link or interface with a feed that provides the forecast LMP prices and/or the actual LMP prices, the metering inputs from the transportation system substation, the ARCOM interface, and the PCS, in order to generate a command signal that is sent to the PCS. A command signal can be configured to provide a set point value as a percentage of conversion capacity, either to charge or discharge the energy storage asset, or a 'zero' corresponding to no energy being converted (no charge, no discharge). As a non-limiting example, the energy storage asset can be a battery that receives a command to charge (from a DC bus) or to discharge (to a DC bus).

An example apparatus or system herein can be used to compute the value of the set point from the various parameters that are input to the apparatus system, such as but not limited to the forecast LMP prices and/or the actual LMP prices for the energy market and/or the regulation market price. The state of charge (SOC) of the battery energy storage assets also can be input to the apparatus or system.

Power Control System

In an example, a system described herein includes a PCS. The PCS can be used to control a converter, such as but not limited to a DC-to-DC Converter. The converter can be used to control the charge and discharge of the energy storage asset. For example, the PCS can control the converter based on the operating schedule generated by an optimizer module. Implementation of the operating schedule can cause the charging/discharging of the energy storage asset according to the set point provided by the operating schedule, the status of other sub components (including one or more other energy storage assets, other converters, the DC bus voltage), and the occurrence of the regenerative braking.

During a time period that an example system herein is participating in the wholesale energy market, the PCS can be caused to execute the instructions based on the operating schedule and drive the converter to charge or discharge the energy storage asset(s) according to the desired set point. During a time period that an example system herein is not participating in the wholesale energy market, the PCS can be caused to monitor the DC bus voltage in real time to detect the signature of regenerative braking. In this implementation, the PCS can be caused to drive the DC-to-DC Converter in order to maximize the energy recuperation and charge the energy storage asset accordingly. The PCS considers other parameters, as described above, and takes them into account when capturing the regenerative braking energy: The PCS also can be used to monitor other parameters of the example system, including the state of charge (SOC) of the energy storage asset, the ability of the DC-to-DC Converter to react (including for temperature management and any alarms.

Measurement and Verification

In an example system, the substation can include equipment for detecting, measuring or otherwise quantify the energy flows from the regenerative braking event(s), in AC and/or DC current mode:

The AC energy can be measured using a meter(s). In an example, the meter(s) is provided by the power utility and is called a "data collector".

The DC energy can be measured at several places, such as but not limited to, at the output of the rectifiers and at the DC breakers (called "feeders" as they feed power to the various tracks). Both voltage and current may be displayed on the front of the feeder cabinet.

The existing DC current shunts may have a great accuracy, of about 0.25%. With the addition of Analog-to-Digital (A to D) converters, capable of communicating using a communication protocol, such as but not limited to the MODBUS® (The Modbus Organization, Hopkinton, Mass.) serial communications protocol, the overall accuracy can remain within the required 2%. The measurement chain may be calibrated to assess its accuracy.

The voltage and current readings can be transferred to the PCS using the Modbus communication protocol, through the converters.

The power going through each feeder can be computed according to the expression: power=voltage×current.

The PCS can be configured to time-stamp the received data and temporarily store the values, using a remote time server to synchronize its internal clock periodically. The data can be transferred periodically to an example system herein to be archived. An example system herein can be configured to capture, store and share data, as allowable in the regulation market.

The optimization solution can provide precise data regarding the flow of energy going to the train tracks (for example, when an energy storage asset is used to push a train) or coming from the train tracks (for example, during a regenerative braking event). In an example implementation, a method includes a computation procedure to subtract the energy going directly from a rectifier to the train tracks.

In an example, the AC metering can be configured to read and store the energy flow at regular time intervals, e.g., every 15 seconds, the PCS can be configured to read and store the DC energy data at another regular time interval (e.g., twice per second). A degree of accuracy of the data can be achieved by increasing the frequency of the readings. Higher degrees of accuracy are beneficial for the regenerative braking energy capture events, since they are fairly short-lived. For example, they can last about 8 seconds to about 15 seconds only. An example apparatus or system herein can be configured to store the data in connection with the regenerative braking event at the regular time intervals.

That is, discrete power measurements can be made independently of the PCS or the optimization system. The data can be flowed through the PCS, where it can be time-stamped, and stored in a memory of the system. As such the PCS can be configured to act as a communication conduit. In an example, the quality of the measured values can be assessed by calibrating probes. In another example, the internal clock can be synchronized with a more accurate device, such but not limited to remote or a local network time server.

Optimizer Module

An optimizer module that can be implemented to generate an operating schedule according to the example apparatus, systems and methods herein is described. For example, the module can be implemented using a processing unit to determine the optimal utilizations of the regenerative braking energy and the energy storage assets to provide demand response energy that can be committed to a regulation market and/or an energy market in (wholesale) electricity markets. The example apparatus, systems and methods provide the capability of modeling the regenerative braking energy production characteristics from electric train traction systems, or the regenerative braking energy production characteristics from carriage systems (such as elevator systems or other moving compartments), each in conjunction with energy storage asset(s) such as but not limited to electric batteries. As a non-limiting example, a generated operating schedule may direct that the energy storage assets be charged from the retail energy supplies over a certain time period and be discharged later when the LMPs are higher than a threshold amount and/or when the regenerative braking energy causes excess charge accumulation of the energy storage assets above a certain predetermined amount.

According to the example apparatus, systems and methods herein, the energy storage assets are used to capture the excess regenerative braking energy that would otherwise be emitted as waste heat in the transportation system or the carriage system. The captured energy is stored in the energy storage asset, and may be used for voltage supports on the electric power traction lines or the carriage system. The other function of the energy storage asset that is facilitated by the generated operating schedule is to provide demand response energy and/or regulation services to the wholesale electricity market.

According to the example apparatus, systems and methods herein, the regenerative braking energy capturing process is managed using the PCS based on the implementation of the generated operating schedule. An example apparatus or system herein that includes an optimization module is used for generating the optimized schedules for the energy storage assets to maximize the overall benefits for the energy customer. The overall benefits of the optimal operating schedule includes power supply savings as well as possible derived revenues from providing demand response energy, regulation services, or both, to a wholesale electricity market. The example apparatus or system herein that includes an optimization module determines the optimal energy storage asset(s) operating schedules based, e.g., on hourly forecasts for wholesale electricity market energy LMPs and/or regulation market clearing prices, regenerative braking energy availability, and the energy storage asset(s) operational characteristics. In an example, the power supply contracts may provide certain limitations on the operation of the energy storage asset(s).

Once the optimal energy storage asset(s) operating schedules are determined, an example system or apparatus herein can be configured to send control signals to the PCS controlling the operations of the energy storage asset(s). These control signals can be in the form of signals sent at regular time intervals, such as but not limited to five-minute signals, indicating the desired state of one or more of the energy storage assets. As a non-limiting example, the control signals can indicate the desired charge/discharge states and the expected storage level (state of charge) of any battery assets on a five-minute time interval basis. In the case of regulation services being provided, system or apparatus herein can be configured to communicate energy storage asset control signals at shorter time intervals, such as but not limited to four-second or two-second time intervals, to the PCS system for its controls on the energy storage asset, i.e., changing a rate of charging/discharging the energy storage asset(s).

In an example implementation, the PCS system can be configured to communicate back to the example system or apparatus the real-time actual operating states of the energy storage asset. The energy storage asset's real-time operating state data can include the current state of charge and storage levels. The real-time operating state data can be returned as in input parameter to the optimizer module and, in a feedback process, be used in the generation of another optimal operating schedule for the energy storage asset.

In an example implementation, operation of the energy storage assets of a transportation system or carriage system according to an example operating schedule described herein can maximize cost savings and environmental benefits to an energy customer by recycling the regenerative braking energy to reduce electricity consumption. The revenues may be maximized from deriving revenues from demand response services to the wholesale electricity markets.

Controllable Resources and Controllable Energy Assets in an Optimization

In an example system, method and apparatus herein, the operation of controllable resources and controllable energy assets can be directed according to the operating schedule in order to achieve the objective of significant increase in net energy-related benefits and/or significant decrease in net energy-related costs. Non-limiting examples of controllable energy asset that can be controlled according to an optimizer-generated operating schedule include the excess regenerative braking energy, the energy supplies from power supply feeders, and the charge/discharge of the energy storage asset. Following is a description of non-limiting examples of the modeling of controllable energy assets and controllable resources. While the modeling is described based on elements and components of a transportation system, it is understood that the modeling also applies to equivalent elements and components of a carriage system.

Excess Regenerative Braking Energy: Virtual Generator

In an example implementation, the amount of energy available for charging the energy storage asset(s) may be reduced by a certain amount from the regenerative braking energy generated based on the braking motion.

For example, for an example transportation system that includes pairs of coupled train cars (married pair of train cars), each married pair can regenerate a current of up to about 2750 A during a single braking event. The traction power line voltage can be limited to maximum 800 VDC ('clipping'), so the current due to the regenerative braking energy may be reduced to maintain the power line voltage within the limit. In addition, some of this regenerative braking energy may be used by the auxiliary systems of the train car (including the compressor, the HVAC, and the lighting), used to assist a train accelerate to exit the station (i.e., provide a push), and/or some can be absorbed by the natural receptivity of the traction power line. The remaining amount of energy is referred to herein as the excess regenerative braking energy and may be captured by the energy storage asset as stored energy (which otherwise may be emitted as waste heat).

The regenerative braking event can take place in a very short time interval. For example, for a train traveling at a speed of about 49 miles per hour, the braking time is about 15 seconds (referred to herein as the regenerative braking time window). Within the regenerative braking time window, regenerative braking energy may be produced. The regenerative braking energy can be represented in a plot of energy vs. time as a triangular shape. The power from regenerative braking rises to its peak value in approximately 1 second following the start of the braking action, then can decrease linearly while the train slows down. It ends abruptly at the end of the regenerative braking time window. For the example of a train, this occurs when the mechanical brakes are applied just before stopping.

The number of braking events per day in a transportation system can be computed as the number of trains passing by a traction power substation where the energy storage asset is installed and stopping at the adjacent passenger stops. The amount of recoverable regenerative braking energy can vary with the distance between trains (i.e., impedance of the conductors between the trains), which is proportional to the headway. For a non-limiting example train line passing a power substation, described in the "Example Implementation" section hereinbelow, there can be as many as 378 trains running per day in both directions per working day and 204 trains per weekend day. The number of trains passing a power substation for any other train lines can be computed according to the examples described herein (including in the "Example Implementation" section herein below). Each stop of these running trains produces regenerative braking energy. The regenerative braking energy may then lead to excess energy for capturing with the energy storage asset at the times where the voltage conditions on the traction power line are favorable. Therefore, the regenerative braking power signals can be highly intermittent and take place in very short time windows.

With the approximation that the amount of excessive regenerative braking power and energy signals over time for a given time horizon into the near future at a specific substation can be pre-determined in terms of the train schedules, and the substation locations and traction power line voltage control operations, the excessive regenerative braking power and energy signals can be represented as a virtual generator with the generator model in an example system, method and apparatus herein. In an example, an energy generating capacity of excess regenerative braking energy for a transportation system may be determined according to each substation or location with at least one energy storage asset battery installed when the regenerative braking power and energy signals are significantly different.

Furthermore, it is observed that the amount of energy accumulated in the energy storage assets based on the excess regenerative braking energy increases cumulatively over time. For example, the state of charge of the energy storage asset can increase by an amount of about 10%, about 20%, about 30% or higher over the time periods that it is being charged using the excess regenerative braking energy and is being committed to a regulation market. Such an excess accumulated charge on the energy storage assets may cause them to become too highly charged to participate viably in the regulation. That is, an energy storage asset that is charged to only about a half of its capacity can be more useful in a regulation market (that the regulation operator has benefit of the possibility for charging or discharging beyond this point in participating in the regulation market. In an example implementation, the optimizer module can be used to generate an operating schedule such that the excess charge on the energy storage assets can be committed to the energy market at specific time periods to discharge some of the accumulated excess charge and committed to the regulation market at other time periods. Implementation of the operating schedule generated by the optimizer for such a co-optimization of the use of the energy storage assets in the regulation and energy markets can be used to derive an amount of energy-related revenue. In another example implementation, the optimizer module can be used to generate an operating schedule such that the energy storage asset can be dynamically partitioned such that it participates in the energy market and the regulation market in such a manner that the excess charge is fully exploited to derive an amount of energy-related revenue.

In an example, a system, apparatus and method herein includes a generator model that can be used to model the regenerative braking energy as a virtual generator. Non-limiting examples of the virtual generators are described in the "Example Implementation" section hereinbelow, as generated based on the generator static data and the generator time dependent data.

In an example transportation system, the regenerative braking energy can be produced in about a 15-second time window. In an example, an apparatus, method or system herein that includes the optimizer module may not need to apply the time granularity at such a fine level (i.e., at a similar timescale) to determine the optimal operating schedules for the energy storage asset (such as but not limited to charge/discharge schedules). The maximum available amount of excessive regenerative braking energy for each time interval can be introduced as a parameter in the optimizer module. The maximum available amount of excessive regenerative braking energy (referred to herein as parameter MaxMWh) may be pre-determined based on the train start/stop schedules around the substation. Parameter MaxMWh represents the maximum amount of excessive regenerative braking energy that may be scheduled for each time interval.

Energy Supplies from AC Power Supply Feeders

In an example implementation, energy supplies from the AC power line feeders at a substation where an energy storage asset such as a battery is installed can be used as another power source. The energy supplies from the AC power line feeders can be used in addition to, or instead of, the excessive regenerative braking energy, to charge the energy storage asset when it is economic to do so (i.e., net-energy related revenue may be derived).

The energy supplies from the AC power line feeders can be used as another controllable variable in optimizing the operating schedules for demand response energy and regulation services. A non-limiting example of a supply contract model is included as a table in the "Example Implementation" section hereinbelow.

Electric Batteries

Electric batteries are examples of controllable energy asset and their charge and discharge operations can be optimized to determine the most economic utilizations of the battery storage capabilities to provide energy and regulation services to the wholesale electricity market as a demand resource.

Non-limiting examples of model attributes for battery static parameters and battery time-based parameters are included as tables in the "Example Implementation" section hereinbelow.

Math Formulation for Optimizing Regenerative Braking Energy Utilization

Following is a non-limiting example methodology of optimizing the regenerative braking energy utilizations, in conjunction with the electric battery storage capabilities, to provide economic demand response energy and/or regulation services to the wholesale electricity markets. A non-limiting example of an "objective cost function" (also referred to as a "objective function") is defined to express net energy-related benefits, based on a variety of possible energy-related costs and energy-related revenues in connection with scheduling and operation of controllable energy assets in a transportation system environment. An optimization procedure determines a suggested operating schedule for the controllable energy assets that maximizes the objective function defining the net energy-related benefits.

It should be appreciated that in the mathematical formulation discussed below, an objective function may be alternatively expressed as a "net energy-related cost" rather than a net energy-related benefit. Using such an alternative expression for the objective function, an optimization procedure would then determine a suggested operating schedule for the controllable energy assets that minimizes the objective function defining the net energy-related costs.

A number of energy-related costs and energy-related expenses may be taken into consideration in the formulation of an objective function (expressed either as a net energy-related benefit or a net energy-related cost). Examples of energy-related costs include, but are not limited to, the retail supply cost to an energy customer (a "retail customer") from purchasing electricity from a retail electricity supplier, the cost of operating and maintaining one or more energy storage assets (e.g., batteries), and an emission cost associated with causing various emissions as a result of operating controllable energy assets. Examples of energy-related revenues include an economic demand response revenue from the wholesale energy market, e.g., as a result of voluntary curtailment of energy use relative to a customer baseline or CBL based on business as usual or BAU conditions, as well as an economic demand response revenue from the wholesale regulation market.

It should be appreciated, however, that in various implementations, not all of the above-identified energy-related costs and energy-related revenues need to be included in a particular objective function for a particular application. For example, in one implementation, a suggested operating schedule for controllable energy assets may be determined by maximizing an objective cost function representing a net energy-related benefit (or alternatively by minimizing an objective cost function representing a net energy-related cost), wherein the objective cost function considers only demand response revenue from a wholesale regulation market and battery operation and maintenance costs, and does not consider costs or revenues associated with a demand response energy market, retail supply costs, and emission costs (e.g., in connection with some implementations of one or more energy storage assets associated with transportation operations, an objective function in a given application may be only concerned with revenue from regulation markets and costs associated with the energy storage asset(s)). An objective cost function also may include a "convenience cost" representing an economic value corresponding to a willingness of the energy customer to change energy-related behavior by choosing to adopt a suggested operating schedule for the purposes of earning revenues from one or more wholesale electricity markets. Such a convenience cost also may be considered as an "indirect" energy-related cost.

In sum, the discussion below relating to definition and utilization of an objective function so as to determine suggested operating schedules for controllable energy assets (e.g., one or more energy storage assets associated with transportation operations) is provided primarily for purposes of illustration, and is not intended to be limiting, as other objective functions are suitable in other example implementations of the concepts disclosed herein.

Modeling the Objective Function

An example objective function is described hereinbelow in connection with optimizing regenerative braking energy. The various expressions for determining the objective function can be implemented using a processing unit executing machine-readable instructions.

Optimizing regenerative braking energy utilizations to provide demand response (DR) services to wholesale electricity markets could maximize the overall financial benefits from energy and regulation services provided to wholesale electricity markets, minimize the retail energy supply costs, and minimize $CO_2$, $SO_2$ and NOx emissions, according to the expressions below:

$$\text{maximize}\left\{\begin{array}{l}DREnergyRevenue + DRRegRevenue - \\ RetailSupplyCost - EmissionCost - BatteryOMCost\end{array}\right\} \quad (1)$$

where the parameters are described as follows

DREnergyRevenue: The total revenue for providing DR energy to the wholesale electricity market over the scheduling horizon (solution variable);

DRRegRevenue: The total revenue for providing DR regulation to the wholesale electricity market over the scheduling horizon (solution variable);

RetailSupplyCost: The total retail supply cost over the scheduling horizon (solution variable);

EmissionCost: The total cost of causing CO2, SO2 and NOx emissions over the scheduling time horizon (solution variable);

BatteryOMCost: The total cost of operating and maintaining the battery over the scheduling time horizon (solution variable). It may include the loss of battery life cost component.

These terms are defined below:

$$DREnergyRevenue = \sum_t [DRMW_t * (LMP_t - GRate)] \quad (2)$$

$$DRRegRevenue = \sum_t [RegMW_t * RegMCP_t] \quad (3)$$

$$RetailSupplyCost = \sum_t [RetailSupplyMW_t * RetailRate_t] \quad (4)$$

$$EmissionCost = \sum_t \begin{bmatrix} CO2CostRate * CO2Produced_t + \\ SO2CostRate * SO2Produced_t + \\ NOxCostRate * NOxProduced_t \end{bmatrix} \quad (5)$$

$$BatteryOMCost = \sum_t [BatteryOMCostRate_t * DischargeMWh_t] \quad (6)$$

where $DRMW_t$: The DR energy MW offered to the wholesale electricity market at time interval t (solution variable);

$LMP_t$: The Wholesale electricity market LMP at the DR zone at time interval t;

GRate: The generation rate part of the retail rate;

$RegMW_t$: The DR regulation MW offered to the RTO market at time interval t (solution variable);

$RegMCP_t$: The RTO market regulation market clearing price for the DR zone;

$RetailSupplyMW_t$: The retail supply MW projected to meet the load at time interval t (solution variable);

$RetailRate_t$: The power supply contract price at time interval t.

CO2CostRate: The $/lbs (or ton) of CO2 emission;

$CO2Produced_t$: The amount of CO2 emission caused for time t (solution variable);

SO2CostRate: The $/lbs (or ton) of SO2 emission;

$SO2Produced_t$: The amount of SO2 emission caused for time t (solution variable);

NOxCostRate: The $/lbs (or ton) of NOx emission;

$NOxProduced_t$: The amount of NOx emission caused for time t (solution variable);

BatteryOMCostRate: The $/MWh of battery discharge;

$DiscahrgeMWh_t$: The scheduled discharge MWh for time t (solution variable).

The $DRMW_t$ is the difference between the CBL and the actual total load:

$$DRMW_t = \max(0, CBL_t - LoadMW_t - BatteryCharge_t) \quad (7)$$

where $CBL_t$: Customer baseline load;

$LoadMW_t$: Total fixed load to serve at the DR registered metering location at time interval t;

$BatteryCharge_t$: Scheduled charge MW of the battery at time interval t (solution variable).

The Optimization Constraints

The optimal regenerative braking energy utilization scheduling problem is maximized subject to the following operational limit constraints.

A. Demand-Supply Balance Constraints

The power demand plus battery charging load may be met with the retail supply, battery discharge and regenerative braking power, expressed as follows:

$$LoadMW_t + BatteryCharge_t = RetailSupplyMW_t + BatteryDischarge_t + GenMW_t + RegenBrakingMW_t \quad (8)$$

where $BatteryDischarge_t$: Scheduled discharge MW of the battery at time interval t (solution variable);

$RetailSupplyMW_t$: Scheduled retail supply MW at time interval t (solution variable);

$GenMW_t$: Virtual generation MW from the excessive regenerative braking energy at time interval t (solution variable);

$RegenBrakingMW_t$: Pre-scheduled regenerative braking MW to serve the fixed load at time interval t.

B. Supply Contract Constraints

The supply contract constraint can be applied to ensure that the scheduled supply MW value does not exceed the physical limitation that may be delivered to the substation:

$$RetailSupplyMW_t \leq RetailSupplyMax_t \quad (9)$$

C. Virtual Generator Constraints for Excessive Regenerative Braking Power

The virtual generator output may be scheduled between 0 MW and the maximum MW amount representing the pre-determined range of available excessive regenerative braking power at any time:

$$MinGen_t \leq GenMW_t \leq MaxGen_t \quad (10)$$

where $MinGen_t$: Minimum generation output of the virtual generator; typically set to 0;

$MaxGen_t$: Maximum generation output of the virtual generator; set to the maximum possible MW value of the excessive regenerative braking power for time interval t;

The total amount of energy that can be supplied from the virtual generator is constrained to the maximum total amount of available excessive regenerative braking energy pre-determined based on the train schedules, starts/stops, and the voltage conditions on the traction power lines at the substation where the battery is installed. Therefore, the generation MW variable is further constrained with the maximum available excessive regenerative braking energy during time interval t, as follows:

$$GenMW_t * IntervalDuration(t)/60 \leq MaxMWh_t \quad (11)$$

where $MaxMWh_t$: Maximum of available excessive regenerative braking energy during time interval t;

D. Regulation and Battery Operational Constraints

Battery charge and discharge must be within its charge and discharge rate limits:

$$MinChargeRate \leq BatteryCharge_t * IntervalDuration(t)/60 \leq MaxChargeRate$$

$$MinDischargeRate \leq BatteryDiharge_t * IntervalDuation(t)/60 \leq MaxDischargeRate \quad (13)$$

Battery storage levels are determined based on initial battery storage level, charge and discharge operations:

$$StorageLevel_t = \qquad (14)$$
$$StorageLevel_{t-1} * (1 - LossRate) * IntervalDuration(t) +$$
$$BatteryCharge_t - \frac{BatteryDischarge_t}{Efficiency}$$

Since regulation services are to be provided from the battery, the battery storage level is maintained at a value that can meet the specifications to provide the scheduled regulation services in both the upward and downward directions:

StorageLevel$_t$+RegDnDeployFactor$_t$*RegMW$_t$*RRT/ 60≤MaxCapacity

StorageLevel$_t$−RegUpDeployFactor$_t$*RegMW$_t$*RRT/ 60≥MinCapacity

Where RegUpDeployFactor$_t$: Regulation Up deployment factor representing the amount of the deployed upward regulation relative to the regulation assignment;
RegDnDeployFactor$_t$: Regulation Down deployment factor representing amount of the deployed downward regulation relative to the regulation assignment;
RRT: Regulation response time, which is typically 5-minutes.

Further, the regulation capability in 5 minutes are also constrained with the max and min discharge rates:

MinDischargeRate≤RegMW$_t$*RRT/60≤MaxDischargeRate (17)

E. Battery Charge and Virtual Generator Scheduling Constraints

Since the virtual generator represents the excess regenerative braking energy, this amount of available excess regenerative braking energy is emitted as waste heat when the battery is not charging. Therefore, the schedule of utilizing the excessive regenerative braking energy is dependent of the charging operations of the battery.

A. The virtual generator and the battery charging operation dependency can be expressed as follows:

GenMW$_t$≤BatteryCharge$_t$ (18)

Traction Power Line Voltage Security Constraints

In an example, the traction power line voltage security constraints may be included. For example, the DC power flow models of the traction power system may be implemented so that the traction power line voltages is modeled as part of the optimization and the optimization model includes the algorithm to determine the regenerative braking energy capture in conjunction with the voltage conditions on the traction power lines.

CBL Approaches for a Transportation System

In an example, the historical load data may be used to project the CBL. In another example, the CBL may be derived by registering the battery as a behind-the meter generating resource. In this example, the battery discharge operations are metered and used for settlements of the energy and regulation services provided to the wholesale electricity market.

In another example, the CBL may be derived based on actual metered loads that are adjusted using the actual metered battery charge and discharges after the fact, and the adjusted historical load data that is used to compute DR energy and regulation services actually delivered to the wholesale electricity market.

Solution Data to SCADA

The solution data by the optimizer module can be transferred to the SCADA for communicating with the PCS for real-time operations of the energy storage asset to provide the economic DR and regulation services to the wholesale electricity market.

Market Demand Resource Solution Data

Non-limiting example of demand resource solution data is provided in the table below.

| Data Item | Description | Destination of Data |
| --- | --- | --- |
| 1) MktDRName | Market demand resource name or ID | Simulation |
| 2) IntervalID | Interval name or ID | Simulation |
| 3) DRCapability | Projected MW amount of power available for offering to the RTO market, in MW | Simulation to SCADA |
| 4) TotalGen | Total generation of the market demand resource, in MW | Simulation |
| 5) TotalLoad | Total load of the market demand resource, in MW | Simulation |
| 6) SupplyContract_MW | Total MW schedule by supply contract | Simulation |
| 7) OperationCost | Cost to achieve the demand resource load reduction | Simulation |
| 8) Penalty | Penalty due to deviating from target temperature or violating operating limits. | Simulation |
| 9) DRValue | Demand resource forecasted market value | Simulation |
| 10) DRValueAccrual | Market demand resource forecasted market value accrual, penalty cost excluded | Simulation |
| 11) BAUCBL | Business as usual CBL simulation results | Simulation to SCADA |
| 12) Emission | Produced emission in kg (or lb) | Simulation |
| 13) MktDRIndex | Carry-thru from input | Simulation |
| 14) IntervalIndex | Carry-thru from input | Simulation |
| 15) Cox | Produced COx emission of the Market Demand Resource | Simulation |
| 16) NOx | Produced COx emission by the Market Demand Resource | Simulation |
| 17) Sox | Produced COx emission by the Market Demand Resource | Simulation |

Generator Solution Data

Non-limiting example of general solution data is provided in the table below.

| Data Item | Description | Destination of Data |
|---|---|---|
| 1) ClientName | Client name or ID | Simulation |
| 2) PhysicalGeneratorName | Physical generator name | Simulation |
| 3) GeneratorName | Logical generator name or ID | Simulation |
| 4) IntervalID | Time interval ID | Simulation |
| 5) Status | 1: Generator is running<br>0: Generator is offline | Simulation |
| 6) GenOutput | Generation output in MW, MBtu or other unit | Simulation to SCADA |
| 7) GenCost | Generation cost of producing GenOutput for the given interval | Simulation |
| 8) FuelConsumption | Fuel consumption | Simulation |
| 9) Emission | Produced emission | Simulation |
| 10) ClientIndex | Carry-thru from input | Simulation |
| 11) PhysicalGeneratorIndex | Index for PhysicalGeneratorName in Simulation | Simulation |
| 12) GeneratorIndex | Carry-thru from input | Simulation |
| 13) IntervalIndex | Carry-thru from input | Simulation |
| 14) COx | COx emission in lbs (ton, etc) produced by the generator | Simulation |
| 15) NOx | NOx emission in lbs (ton, etc) produced by the generator | Simulation |
| 16) SOx | SOx emission in lbs (ton, etc) produced by the generator | Simulation |

Storage Solution Data

Non-limiting example of storage solution data is provided in the table below.

| Data Item | Description | Destination of Data |
|---|---|---|
| 1) ClientName | Client name or ID | Simulation |
| 2) StorageName | Unique storage name or ID | Simulation |
| 3) IntervalID | Interval ID | Simulation |
| 4) StorageLevel | Storage energy storage level | Simulation to SCADA |
| 5) ChargeMW | MW energy consumption of charging the storage | Simulation to SCADA |
| 6) DischargeMW | MW energy produced due to storage discharge | Simulation to SCADA |
| 7) ClientIndex | Carry-thru from input | Simulation |
| 8) StorageIndex | Carry-thru from input | Simulation |
| 9) IntervalIndex | Carry-thru from input | Simulation |

Other Data from SCADA to Simulation

As part of the DR operations and settlement for the actual implementation of a suggested operating schedule, the following data may be sought from the SCADA which in turn may be acquired from the PCS:

The actual real-time load at the main feeder location at which the DR is registered for the RTO market.

The actual total amount of regenerative braking energy.

The total amount of excessive regenerative braking energy.

Other Data for the Optimization

The following data can be used for the optimization:

Wholesale electricity market LMPs for the optimization horizon.

Regulation market clearing prices for the optimization horizon.

Projected total load demand for the defined DR footprint.

Acronyms

AC Alternating Current
A Ampere
ARCOM ARCOM Control Systems
BMS Battery Management System
DC Direct Current
DNP3 Distributed Network Protocol Version 3
ES Energy Storage
ESS Energy Storage System
EST Eastern Standard Time
FAT Factory Acceptance Test
HMI Human-Machine Interface
HVAC Heat Ventilation Air-Conditioning
IBC International Building Code
IEEE Institute of Electrical and Electronics Engineers
IP Internet Protocol
kW Kilowatt
kWh Kilowatt-hour
LLC Limited liability corporation
LES Load Serving Entities
MW Megawatt
MWh Megawatt-hour
PCS Power Control System
PECO PECO Energy Company
PEDA Pennsylvania Energy Development Authority
PHEV Plug-In Hybrid Electric Vehicles
PJM PJM Interconnection LLC, the Regional Transmission Organization
PQ Power Quality
PS Peak Shaving
RFQ Request for Quote
RTO Regional Transmission Organization
SAT Site Acceptance Test
SCADA Supervisory Control and Data Acquisition
SOC State Of Charge
TPSS Traction Power Substation
UL Underwriters Laboratories Inc.
USDOT United States Department of Transportation
V Volt
VDC Volts Direct Current
Simulation Optimization machine readable instructions Example Implementation Example Train Schedule & Headways An example train schedule of arrival and headways into a train station is described. The number of trains passing by a TPSS and stopping at the adjacent passenger stops can be used to compute the number of braking events to occur for any given day. The amount of recoverable regenerative braking energy can vary with the distance between the trains, affecting the impedance of the conductors between the trains, which is proportional to the headway. The headway can result in a reduction of the amount of the regenerative braking energy that can be used to charge the energy storage asset.

| Week Days | Saturday & Sunday |
|---|---|
| From 5:00 to 6:17 am: 9 trains | From 5:00 to 6:16 am: 5 trains |
| From 6:24 to 9:12 am | From 6:31 to 7:31 am |
| Headway: 4 minutes (each direction) | Headway: 15 minutes (each direction) |
| From 9:17 am to 1:35 pm: | From 7:44 am to 8:44 am: |
| Headway: 6 minutes (each direction) | Headway: 12 minutes (each direction) |
| From 1:40 pm to 3:29 pm: | From 8:55 am to 8:35 pm: |
| Headway: 5 minutes (each direction) | Headway: 10 minutes (each direction) |
| From 3:32 pm to 5:40 pm: | From 8:44 pm to 9:20 pm: |
| Headway: 4 minutes (each direction) | Headway: 12 minutes (each direction) |
| From 5:45 pm to 6:05 pm: | From 9:35 pm to midnight: |
| Headway: 5 minutes (each direction) | Headway: 15 minutes (each direction) |
| From 6:11 pm to 6:26 pm: | |
| Headway: 8 minutes (each direction) | |
| From 6:35 pm to 8:45 pm: | |
| Headway: 10 minutes (each direction) | |
| From 8:56 pm to midnight: | |
| Headway: 12 minutes (each direction) | |
| Total trains per day, both directions: Weekdays: 378; Saturday and Sunday: 204 | |

Virtual Generator

A generator model can be used to model the regenerative braking energy as a virtual generator. As non-limiting examples, virtual generators can be developed from a generator model based on the generator static data and the generator tie dependent data in the following two tables.

Generator Static Data

| Generator Attributes | Definitions | Applicable to the virtual generator for excessive regenerative braking | Sources of Data |
|---|---|---|---|
| 1) GeneratorName | Generator name or ID | Yes | Modeling |
| 2) IncrCost | Incremental energy cost, in $/MWh | Yes. may set to 0. Static data | Modeling |
| 3) UpRampLimit | Up ramp rate limit, MW/hr | Yes. May set to very large value | Modeling |
| 4) DnRampLimit | Down ramp rate limit, MW/hr | Yes. May set to very large value | Modeling |
| 5) MinRunTime | Minimum run time, in hr | No, Set to 0. Static data | |
| 6) MinDownTime | Minimum down time in hr | No, set to 0. Static data | |
| 7) StartupTime | Time to start in hr | No, set to 0. Static data | |
| 8) InitialOnHours | Initial hours online (+) or offline (−) | No, set to 0. Static data | |
| 9) StartupCost | Cost per startup, in $ | No. Static data | |
| 10) OpMaintCost | Operation & maintenance cost in $/h | Yes. Static data | Modeling |
| 11) FuelConsumptionRate | In Gal/MWh or Gal(ton)/MBtu | No. Static data | |
| 12) COx_Rate | Decimal in lbs (tons, etc)/ Gal (cfm, ton, etc) of fuel. | No. Static data | |
| 13) NOx_Rate | Decimal in lbs (tons, etc)/ Gal (cfm, ton, etc) of fuel. | No. Static data | |
| 14) SOx_Rate | Decimal in lbs (tons, etc)/ Gal (cfm, ton, etc) of fuel. | No. Static data | |
| 15) MaxRunTime | Maximum run-time, in hr | No. Static data | |

Generator Time Dependent Data

| Data Item | Description | Applicable to the virtual generator for excessive regenerative braking | Sources of Data |
|---|---|---|---|
| 1) GeneratorName | Generator name or ID | Yes | Modeling |
| 2) IntervalID | Time interval ID | Yes | Modeling |
| 3) Available | 1: Generator is 100% available to generate electricity 0: Generator is not available to | Yes. Flag indicating whether there is any excess regenerative braking energy in | SCADA to Modeling |

| Data Item | Description | Applicable to the virtual generator for excessive regenerative braking | Sources of Data |
| --- | --- | --- | --- |
| | generate electricity 0< and <1: the generator is partially available | MW to capture | |
| 4) MinGen | Minimum generation capacity, in MW | Yes. Minimum amount of excess regenerative braking energy in MW to capture | SCADA to Modeling Manual entries or EDSA to Modeling |
| 5) MaxGen | Maximum generation capacity, in MW | Yes. Maximum amount of excess regenerative braking energy in MW that may be captured | SCADA to Modeling; Manual entries or EDSA to Modeling |
| 6) FixedGen | 1: Generator is in fixed generation mode 0: Generator is dispatchable | Yes. Fixed amount of excess regenerative braking energy in MW to capture | SCADA to Modeling; Manual entries |
| 7) FixedGenMW | Fixed generator generation MW, used when FixedGen = 1 | Yes. Flag indicating whether there is a fixed amount of excess regenerative braking energy in MW to capture | SCADA to Modeling; Manual entries |
| 8) MeteredGenMW | Metered actual charge/ discharge MW values | No. | |
| 9) MeteredGenMW_Quality | 0/1: 0—Bad; 1—Good | No. | |
| 10) MaxMWh | Maximum MWh of production | Yes. Set to the maximum MWh value of the excessive regenerative energy for a scheduling interval. This is a new generator attribute. Interval data | SCADA to Modeling; Manual entries or EDSA to Modeling |

Energy Supplies Contract Model

A non-limiting example of a supply contract model is 30 shown in the following table.

| Contract Attributes | Definitions | Sources of Data |
| --- | --- | --- |
| 1) ClientName | Client name or ID. It may map to the Substation for which the power supply contract may differ from those in other substation feeders in one of the following numerical attributes | Simulation |
| 2) IntervalID | Interval ID string | Simulation |
| 3) BlockID | Block ID string | Simulation |
| 4) BlockMWBreakPoint | MW break-point of multiple block supply contract curve | Simulation |
| 5) BlockPrice | Supply contract block price in $/MWh | Simulation |
| 6) SupplyContractIndex | Index for the supply contract in Simulation denoted with ClientName and IntervalID | Simulation |
| 7) COx_Rate | Decimal in lbs (tons, etc)/MWh. The carbon emission rate of the supply contract | Simulation |
| 8) NOx_Rate | Decimal in lbs (tons, etc)/MWh. The nitrogen emission rate of the supply contract | Simulation |
| 9) SOx_Rate | Decimal in lbs (tons, etc)/MWh. The sulfur emission rate of the supply contract | Simulation |

Battery Model Attributes for Electric Batteries 50

Example battery model attributes are shown in the following table for battery static parameters and battery time-based parameters.

Battery Static Parameters

| Battery Attributes | Definitions | Sources of Data |
| --- | --- | --- |
| 1) ClientName | Client name or ID. It may map to the Substation for which the supply contract may differ from those in other substation feeders | Simulation |
| 2) StorageName | Unique storage (battery) resource name or ID | Simulation |
| 3) MinCapacity | Minimum storage capacity, in MWh | SCADA to Simulation; Simulation default |
| 4) MaxCapacity | Maximum storage capacity, in MWh | SCADA to Simulation; Simulation default |
| 5) LossRate | Storage energy storage loss rate in percent per hour (%/hr) | Simulation |

-continued

| Battery Attributes | Definitions | Sources of Data |
|---|---|---|
| 6) Efficiency | Efficiency factor associated with charging and discharging, value in [0, 1] | Simulation |
| 7) MinChargeRate | Minimum charge rate, in MWh/hre | SCADA to Simulation; Simulation default |
| 8) MaxChargeRate | Maximum charge rate, in MWh/hr | SCADA to Simulation; Simulation default |
| 9) MinDischargeRate | Minimum discharge rate, in MWh/hr | SCADA to Simulation; Simulation default |
| 10) MaxDischargeRate | Maximum discharge rate, in MWh/hr | SCADA to Simulation; Simulation default |
| 11) InitialStorageLevel | Initial (current) storage level of the storage, in MWh | SCADA to Simulation; Not sure if the storage level is directly measurable. If not, SCADA needs calculations to track the storage level. |
| 12) FixEndStorageLevel | 0: End storage level is not enforced 1: fix end storage level, enforced as minimum end storage level | SCADA to Simulation; Simulation default |
| 13) EndStorageLevel | End storage level, required only if FixEndStorageLevel = 1, in MWh | SCADA to Simulation; Simulation default |
| 14) EndStorageDeficitPenalty | Penalty cost applied when storage end storage level is below EndStorageLevel under the condition that FixEndStorageLevel = 1 | Simulation |
| 15) ExceedCapacityPenalty | Penalty cost associated with storage level exceeding capacity, in $/MWh | Simulation |
| 16) BelowMinCapacityPenalty | Penalty cost associated with storage storage level below minimum capacity, in $/MWh | Simulation |
| 17) SimultaneousChargeDischarge | 0: Simultaneous charge and discharge option is off 1: Simultaneous charge and discharge option is on | Simulation |
| 18) StorageIndex | Index for StorageName in Simulation | Simulation |
| 19) TypeOfStoredEnergy | Electric: Input/Output is electricity (MW) Thermal: Input/Output is thermal energy | Simulation |
| 20) BHMStorage | 0/1: 0—Storage resource is in front of the meter for the total load by client location; 1—Storage resource is behind the meter | Simulation |
| 21) OMCost | $/MWh of discharge, used to reflect the loss of battery life and other battery operation & maintenance related costs.This is a new attribute to be added | Simulation |
| 22) TimeOnCharge | +/−numeric value. Number of minutes that the battery is on charging (+) or discharging (−) mode | SCADA to Simulation. SCADA may needs to track the time that the battery has been on charging or discharging mode. |

Battery Time Based Parameters

| | | Sources of Data |
|---|---|---|
| 1) StorageName | Unique storage (battery) name or ID | |
| 2) IntervalID | Interval string for each study period | Simulation |
| 3) Available | 0: Storage is not available for the given interval 1: Storage is 100% available for the given interval 0< and <1: the storage is partially available | SCADA to Simulation; Simulation default |
| 4) FixedCharge | 0: Storage charge rate is not fixed; 1: Storage charge rate is fixed | SCADA to Simulation; Simulation default to non-fixed |
| 5) FixedChargeRate | Fixed storage charge rate, in MWh/hr | SCADA to Simulation |
| 6) FixedDischarge | 0: Storage discharge rate is not fixed; 1: Storage discharge rate is fixed | SCADA to Simulation; Simulation default to non-fixed |
| 7) FixedDischargeRate | Fixed Storage discharge rate, in MWh/hr | SCADA to Simulation |

-continued

| | | Sources of Data |
|---|---|---|
| 8) MinCapacity | Minimum storage capacity by time, in MWh. | SCADA to Simulation; Simulation default |
| 9) MaxCapacity | Maximum storage capacity by time, in MWh. | SCADA to Simulation; Simulation default |
| 11) MeteredChargeMW | Metered actual charge MW | SCADA to Simulation |
| 12) MeteredChargeMW_Quality | 0/1: 0—Bad; 1—Good | SCADA to Simulation |
| 13) MeteredDischargeMW | Metered actual discharge MW | SCADA to Simulation |
| 14) MeteredDischargeMW_Quality | 0/1: 0—Bad; 1—Good | SCADA to Simulation |

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy disks, compact disks, optical disks, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a regulation market and/or a wholesale electricity market, the apparatus comprising:

at least one communication interface;

at least one memory to store processor-executable instructions and a mathematical model for the at least one energy storage asset, wherein the at least one energy storage asset comprises at least one electric vehicle and/or at least one hybrid electric vehicle, wherein the mathematical model facilitates a determination of the operating schedule for the controller of the at least one energy storage asset based at least in part on an operation characteristic of the at least one energy storage asset, an energy-generating capacity of at least one energy generating asset in communication with the energy storage asset, and (i) a regulation price associated with the regulation market and/or (ii) a forecast wholesale electricity price associated with the wholesale electricity market; and at least one processing unit, communicatively coupled to the at least one communication interface and the at least one memory, wherein upon execution of the processor-executable instructions, the at least one processing unit:

A) determines the operating schedule for the controller of the at least one energy storage asset based on an optimization process using the mathematical model; and B) controls the at least one communication interface to transmit to the energy customer the operating schedule for the controller of the at least one energy storage asset determined in A), and/or controls the at least one memory so as to store the determined operating schedule for the controller, wherein the operating schedule for the controller of the at least one energy storage asset specifies a first time interval within the time period T for use of the energy storage asset in the regulation market and a second time interval within the time period T for use of the energy storage asset in the wholesale electricity market.

2. The apparatus of claim 1, wherein the second time interval within the time period T for use of the energy storage asset in the energy market is specified when the forecast wholesale electricity price for the energy market is above a predetermined threshold value.

3. The apparatus of claim 1, wherein the at least one energy generating asset comprises at least one photovoltaic cell, at least one wind generator, or at least one diesel generator.

4. The apparatus of claim 1, wherein the operation characteristic of the at least one energy storage asset is at least one of a state of charge, a charge rate, a degree of non-linearity of charge rate a discharge rate, a degree of non-linearity of discharge rate, a round trip efficiency, and a degree of life reduction.

5. The apparatus of claim 1, wherein the energy storage asset is at least one battery, and wherein the at least one battery is a lithium ion battery, a lead acid battery, a flow battery, or a cell battery.

6. An apparatus for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a regulation market and/or a wholesale electricity market, the apparatus comprising:
- at least one communication interface;
- at least one memory to store processor-executable instructions and a mathematical model for the at least one energy storage asset, wherein the at least one energy storage asset comprises at least one electric vehicle and/or at least one hybrid electric vehicle, wherein the mathematical model facilitates a determination of the operating schedule for the controller of the at least one energy storage asset based at least in part on an operation characteristic of the at least one energy storage asset, an energy-generating capacity of at least one energy generating asset in communication with the energy storage asset, and (i) a regulation price associated with the regulation market and/or (ii) a forecast wholesale electricity price associated with the wholesale electricity market; and
- at least one processing unit, communicatively coupled to the at least one communication interface and the at least one memory, wherein upon execution of the processor-executable instructions, the at least one processing unit:
- A) determines the operating schedule for the controller of the at least one energy storage asset based on an optimization process using the mathematical model; and
- B) controls the at least one communication interface to transmit to the energy customer the operating schedule for the controller of the at least one energy storage asset determined in A), and/or controls the at least one memory so as to store the determined operating schedule for the controller,
- wherein, upon execution of the processor-executable instructions, the at least one processing unit determines the operating schedule for the controller of the at least one energy storage asset using the mathematical model in A) by minimizing a net energy-related cost over the time period T, wherein the net-energy related cost is based at least in part on:
- an amount of energy accumulated in the energy storage asset based on the energy-generating capacity of the energy generating asset;
- electricity generation by the at least one energy storage asset; and
- electricity consumption by the at least one energy storage asset; and
- wherein the energy-related revenue available to the energy customer is based at least in part on the minimized net energy-related cost.

7. The apparatus of claim 6, wherein the net energy-related cost is specified as a difference between an electricity supply cost and an economic demand response revenue over the time period T.

8. The apparatus of claim 6, wherein the mathematical model facilitates a determination of the operating schedule for the controller of the at least one energy storage asset based at least in part on a replacement cost for the at least one energy storage asset.

9. An apparatus for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a regulation market and/or a wholesale electricity market, the apparatus comprising:
- at least one communication interface;
- at least one memory to store processor-executable instructions and a mathematical model for the at least one energy storage asset, wherein the at least one energy storage asset comprises at least one electric vehicle and/or at least one hybrid electric vehicle, wherein the mathematical model facilitates a determination of the operating schedule for the controller of the at least one energy storage asset based at least in part on an operation characteristic of the at least one energy storage asset, an energy-generating capacity of at least one energy generating asset in communication with the energy storage asset, and (i) a regulation price associated with the regulation market and/or (ii) a forecast wholesale electricity price associated with the wholesale electricity market; and
- at least one processing unit, communicatively coupled to the at least one communication interface and the at least one memory, wherein upon execution of the processor-executable instructions, the at least one processing unit;
- A) determines the operating schedule for the controller of the at least one energy storage asset based on an optimization process using the mathematical model; and
- B) controls the at least one communication interface to transmit to the energy customer the operating schedule for the controller of the at least one energy storage asset determined in A), and/or controls the at least one memory so as to store the determined operating schedule for the controller,
- wherein the operating schedule for the controller of the at least one energy storage asset specifies a first time interval within the time period T for use of the energy storage asset in the regulation market and a second time interval within the time period T for charging the at least one energy storage asset.

* * * * *